(12) United States Patent
Buese

(10) Patent No.: US 12,311,309 B1
(45) Date of Patent: May 27, 2025

(54) COUPLABLE CLOSED EXTRACTORS AND METHODS FOR THEIR USE

(71) Applicant: BREVETS, LLC, Lewes, DE (US)

(72) Inventor: Mark A Buese, Fleming Island, FL (US)

(73) Assignee: BREVETS, LLC, Lewes, DE (US)

( * ) Notice: Subject to any disclaimer, the term of this patent is extended or adjusted under 35 U.S.C. 154(b) by 0 days.

(21) Appl. No.: 18/815,374

(22) Filed: Aug. 26, 2024

(51) Int. Cl.
*B01D 5/00* (2006.01)
*B01D 11/02* (2006.01)

(52) U.S. Cl.
CPC ......... *B01D 5/0039* (2013.01); *B01D 5/0009* (2013.01); *B01D 5/006* (2013.01); *B01D 5/0072* (2013.01); *B01D 11/0219* (2013.01); *B01D 11/028* (2013.01); *B01D 11/0296* (2013.01)

(58) Field of Classification Search
CPC .... B01D 5/0072; B01D 5/006; B01D 5/0039; B01D 5/0009; B01D 11/0296; B01D 11/028; B01D 11/0219
USPC ..................................................... 423/658.5
See application file for complete search history.

(56) References Cited

U.S. PATENT DOCUMENTS

2020/0054963 A1* 2/2020 Buese ................ B01D 11/0284
2022/0233971 A1* 7/2022 Buese ................ B01D 11/0269

* cited by examiner

*Primary Examiner* — Anita Nassiri-Motlagh
(74) *Attorney, Agent, or Firm* — SALIWANCHIK, LLOYD & EISENSCHENK

(57) ABSTRACT

A closed couplable extractor has a plurality of tubes that function as extracting chamber tubes and/or solution receiver tubes where the tubes are fixed or reversibly connected. Tubes from two closed couplable extractors can be placed in proximal contact to exchange heat between tubes in coupled extractors. Adjacent pairs of tubes in an extractor are connected by at least two transfer conduits, allowing positioning the pair of tubes a higher and lower tubes for distilling vapor through vapor conduits to higher tubes and draining extract solution through solution conduits to lower tubes. The extractor has at least one valve to isolate the extractor from ambient and optional valves to isolate tubes within the extractor. Valves can be couplable valves that permit one or more tubes to enter and exit the system without removal of air or loss of liquid to the environment during these steps while performing extraction processes.

25 Claims, 32 Drawing Sheets

COUPLABLE CLOSED EXTRACTORS AND METHODS FOR THEIR USE

BACKGROUND OF THE INVENTION

The extraction process has been used for millennia for the isolation of desirable materials from plants. The process involves the mixing of a solvent with plant material, separation of the solution formed, and, as desired, isolation of the dissolved solutes by the removal of the solvent. The ability to extract material and retain and reuse all solvent is desirable.

For small scale, researchers often employ a Soxhlet extractor, which is an open system where extraction occurs at atmospheric pressure with most units limited to use of about a kilogram of extractable material or less. The solvent is a liquid at standard temperature and pressure (STP) and external heating and cooling sources promote transfer of solvent from a hot pot to a cooled condenser to drip solvent to an extraction thimble containing the extractable material. The resulting extract solution is subsequently returned to hot pot. Solvent recovery is a subsequent process to extraction and typically, but not necessarily, requires additionally heating the extract solution.

Steam distillation is a process that employs high extraction temperatures, which imposes high energy costs for steam generation. Many natural products can be degraded because of the hot steam. Water or another cooling source used for condensation, imposes additional processing costs. The contacting with water requires subsequent product processing and water processing with accompanying costs.

A simple method of extraction is a contact extraction with a solvent followed by a filtration and a distillation of the solvent. In a typical laboratory, distillation is carried out using a rotary evaporator with the requirement of a cooled trap, to prevent the venting of solvent.

An extraction device that can be used safely by an amateur extractor is desirable that provides extracts for personal needs with little water or power requirements and without mechanical devices for transfer of solvents, heating, and cooling. It is desirable to carry out extraction and separation of the extract solution at or near ambient temperatures in the absence of oxygen to retain the essence of the extract in its most natural state. A "Closed Rotatable Extractor System", US20220233971A1, discloses a system for extraction that allows recycling of a host of different solvent types quantitatively, is cost effective, energy efficient, and can permit an effectively safe operation near ambient conditions in a closed system where a conduit allow transfer of gas and liquid between portions of the closed system.

It is desirable to have a system that simultaneously allows transfer of gas and liquid simultaneously within an extractor and have a geometry conducive to the transfer of heat between two or more extractors during their simultaneous use to minimize energy requirements. An extractor allowing repeated extraction without requiring a rotation or otherwise reorientation to conduct for repeated extraction of a loaded extractable matter can be advantageous as the volume of plant matter increases. It is also desirable that a plurality of extraction chambers can be situated within a single extractor.

BRIEF SUMMARY OF THE INVENTION

An embodiment is directed to a closed couplable extractor, where two or more tubes are fixed or reversibly connected and function as an extracting chamber and/or as a solution receiver. Adjacent tubes are connected by at least two transfer conduits and allow each pair of adjacent tubes to be positioned as a high extracting chamber and a low solution receiver. At least one transfer conduit allows solution transfer between adjacent tubes one transfer conduit allows vapor transfer between tubes. The transfer conduits permit proximal contacting of at least one tubes of at least two closed couplable extractors Two or more closed couplable extractors are coupled to have an extracting chamber of one extractor in proximal contact with a solution receiver of the other extractor. The closed couplable extractor has least one valve for inclusion of solvent and to isolate from ambient. Optionally, that valve and/or additional valves isolate one or more of the tubes in the closed couplable extractor. At least one of the tubes of the closed couplable extractor functions as an extracting chamber and has a sealable port or cap for accepting plant matter or other extractable material. The solution transfer conduit can be curved where the top of the curved conduit is above a low point of the higher tubes and at or below a high point of the higher tube of a pair of adjacent tubes. A portion of the vapor transfer conduit can reside within the solution transfer conduit or a portion of the solution transfer conduit can reside within the vapor transfer conduit.

The transfer conduits can include isolations valve to isolate the pair of adjacent tubes or control the transfer of fluid through the transfer conduits. The isolation valve can be a ball valve, plug valve or needle valve, and can be a pair of valves that are connectable via a connector or can be a pair of connectable valves that are directly connectable without a connector without infusion of air or loss of fluid from the closed couplable extractor. The connector includes at least one valve for removing air before connecting the tubes or fluid before disconnecting tubes of the closed couplable extractor. The pair of valves can be a pair of quick-connect valves, couplable ball valves, couplable plug valves, or couplable needle valves. The couplable ball valves, couplable plug valves, or couplable needle valves have facing surfaces for contacting balls of the ball valves, plugs of the plug valves or needles of the needle valves and a sealing feature to maintain contact of the facing surfaces with exclusion of fluid.

In an embodiment, coupled extractors are formed from two or more closed couplable extractors where one or more of the solution receivers of one of the closed couplable extractors proximal contacts one or more of the extracting chambers of an adjacent closed couplable extractors. The coupled extractors can be coupled by stacking, with one or more solution receiver tubes of a first closed couplable extractor residing above one or more extracting chamber tubes of a second closed couplable extractor to allow proximal contact of pairs of the solution receivers and the extraction chambers where heat transfers from the extraction chamber tubes to the solution receiver tubes promoting phase change of a solvent in each of the tubes in proximal contact. In this manner the external energy input is significantly diminished for the extraction of any given mass to be extracted.

Another embodiment is to a method of extraction employing one or more of the closed couplable extractors. Two or more of the closed couplable extractors can be coupled by proximally contacting at least one extracting chamber tube of at least one closed couplable extractor to at least one solution receiver tube of at least one adjacent closed couplable extractor where extraction occurs simultaneously in each of the closed couplable extractors. The method involves loading the one or more closed couplable extractors with extractable material, such as plant matter, and evacuating the at least one closed couplable extractor. Solvent is transferred to the at least one extracting chamber tube from: at least one solvent reservoir connected within the closed couplable extractor as a vapor or liquid by distilling or dispensing respectively; or at least one solvent receiver tube of a second closed couplable extractor by distilling a vapor or liquid transfer of the solvent as a component of an extract solution. Soaking the extractable material in an extracting chamber tube with the solvent forms an extract solution or for purposes of the method based on the nature of the solvent and extractable material employed a stable or unstable emulsion, or a suspension. Transferring the solution is carried out from the at least one extracting chamber tube into a connected solution receiver tube through at least one solution transfer conduit. Subsequently, all or part of the solvent is distilled from the extract solution in the solution receiver tube, with condensing of liquid solvent in an extracting chamber tube, where, when all volatiles are distilled, the steps of soaking, transferring, and distilling are repeated one or more times until distilling is to a solvent receiver. Alternatively, the solution in the solution receiver tube can be drained to an extract isolator that, optionally, is a portion of a solution receiver or a solvent receiver tube, where isolating the extract involves removal of the solvent. The method can be carried out singularly in individual closed couplable extractors or simultaneously in coupled extractors. Loading can be of extractable material into one to all of the tubes of the closed couplable extractors. Distilling occurs by heating at least one solution receiver tubes and/or by cooling at least one extracting chamber tubes.

In coupled extractors, proximally contacting of the extracting chamber tube of at least one closed couplable extractor and the solution receiver tube of at least one adjacent closed couplable extractor enables the transfer of the heat of condensation from the extracting chamber tube to the proximally contacting solution receiver tube to promote evaporation of its solvent. Proximal contacting can be enhanced through a fluid in a bath containing the proximally contacting tubes, by contacting at least one heat pipe, and/or any other heat conducting means, with the extracting chamber tube of at least one closed couplable extractor and the solution receiver tube of at least one adjacent closed couplable extractor. Transferring the extract solution can be siphoning from a filled extracting chamber to a connected solution receiver. One of the at least one solvent reservoir containing solvent at an extracting temperature can be connected to the top of an ensemble of tubes that sequentially function as extracting chamber tubes and solution receiver tubes, where solvent and then solution are sequentially transferred to a base solution receiver tube, where all tubes are maintained at a desired temperature for extracting.

DETAILED DESCRIPTION OF THE INVENTION

Figure 1A:
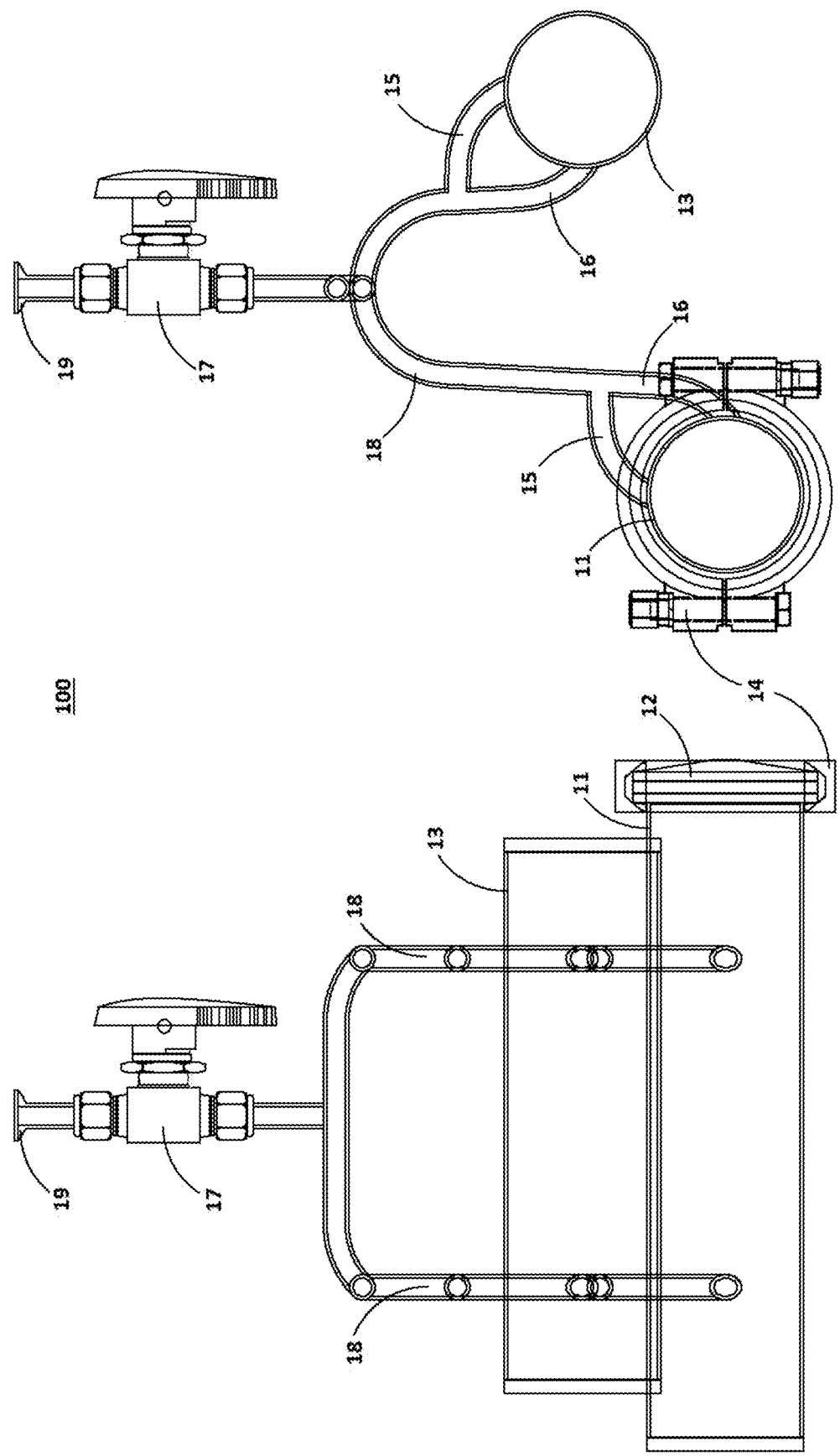
FIG. 1A shows an exemplary closed couplable extractor (100), according to an embodiment, where two parallel tubes are employed as an extracting chamber tube (11) and extract solution receiver tube (13) with branched fluid transfer conduits (15), with a portion that is a vapor transfer tube (15) and portion that is a solution transfer conduit (16), and a valve (17).

In embodiments of the invention, a closed couplable extractor maintains a gas atmosphere over the extraction solvent, extraction solution, and extractable matter that is primarily the solvent vapor with very little, or no, air or other gases. The extractable matter can be any plant matter, or, in some embodiments, the extractable matter is simply washable matter such as processed threads, yarns, plastic, ceramic or metal components where processing fluids are to be removed. The closed couplable extractor comprises an extracting chamber and an extract solution receiver in the form of tubes or their functional equivalent that are in fluid communication via conduits between the tubes such that one or more first conduits can be employed to transfer gas and one or more second conduits to transfer liquid between the extracting chamber and an adjacent extract solution receiver. In some embodiments, the relative orientation and relative position of these tubes of the extractor can be changed throughout the extraction process to promote solution flow. In some embodiments, the relative orientation and relative position of these tubes of the extractor can be maintained throughout the extraction process. During liquid transfer, a state of vapor lock is inhibited or is not possible. In some embodiments, the plurality of conduits can be a plurality of connections through branches of a single conduit, but the plurality of connections to a tube allows unrestrained liquid flow. Herein, most exemplary embodiments are shown where the conduits between tubes are smaller diameter tubes, disclosed in embodiments as transfer tubes, where one or more are designated as solution transfer tubes and one or more are designated as vapor transfer tubes. Alternatively, the conduit can be a pipe, hose, or any other functional equivalent to a tube. In embodiments, the closed couplable extractor's tubes are combined as a multiple closed couplable extractor, according to embodiments, with three or more tubes that are fixed or by using connectable extracting chamber and/or solvent receiver tubes. Tubes of individual closed couplable extractors can be thermally coupled by stacking or in any other modes into a coupled extractor where heat transfer between proximal contacting tubes of different closed couplable extractors promotes evaporation and condensation in these two proximal contacting tubes. Within a multiple closed couplable extractor, a cascade of extractions can be carried out allowing the use of little solvent relative to the quantity of extractable matter, generally, but not necessarily, plant matter.

In an embodiment, an extracting chamber tube of one closed couplable extractor is proximally contacted to a solution receiver tube of another closed couplable extractor over a significant portion of the length of the tubes, generally aided by placement in a common bath, or by coupling using heat pipes, thermally conductive coverings, or any equivalent that enables transfer of latent heat due to condensation in one tube to effect solvent vapor transfers simultaneously in the proximal contacting tube. The solution receiver tube can be of greater, equal, or lesser volume than the extracting chamber, but advantageously of sufficient volume to receive the entire extract solution formed in one or more extracting chamber tubes. The closed couplable extractors allow performance of steps for extraction, removing the extract solution from the extracted matter, and removal of the solvent from the extract solution without disturbing the solvent atmosphere within the system.

Solvent can be introduced or removed from the closed couplable extractor prior to and after extraction, which can occur while a closed couplable extractor is in the orientation for coupling, or in an alternate orientation. Generally, but not necessarily, changing the orientation of the closed couplable extractor is readily carried out manually with small, lower mass closed couplable extractors, but reorientations during an extraction process, particularly with larger closed couplable extractors, can be assisted mechanically using hoists, pulleys, jacks, or any other means. By appropriate orientation of the closed couplable extractor, either fixed or variable, the extract can be isolated in an extract isolator that is: a separate component within the closed couplable extractor; a portion of a solution receiver tube; or a separate vessel that is connected through any valve of the closed couplable extractor. The closed couplable extractor's extract isolator can be disconnected or otherwise emptied after completion of one or more extraction batches to remove the isolated extract from the closed couplable extractor. The separate extract isolator can be filled after completion of one or more extraction batches and carried out within a solvent reservoir if desired.

The tubes are of dimensions suited to their function of extracting the extractable matter in the extracting chamber and receiving, returning, or removing solutions and solvents to sites internal to or external to the closed couplable extractor. The extracting chamber has a cap or port to allow the inclusion of extractable matter, and removal of spent matter after completion of an extraction process. The extract that is removed can contain some solvent or be free of solvent. When a portion of the extract is a solid that precipitates, or the extract is a viscous liquid, acting like a tar or dough, small retention of some of the extracting solvent can be desirable. The inclusion of a small amount of a second solvent that is effectively non-volatile at the pressure of the process within the closed couplable extractor allows a solution of sufficiently low viscosity to readily flow after removal of the extracting volatile solvent.

The tubes need not be cylindrical in shape. The tube's cross-section may be circular, oval, square, rectangular, hexagonal, or any other shape that can readily house a desired amount of an extractable material and solvent or solution. The cross-section of the extracting chamber tube is of a size that includes the extractable matter and the solvent and can be of dimensions with little or no additional volume for gas, however, the extracting chamber can be of a volume than is more than the combined volume of extractable matter and solvent employed. The closed couplable extractor has an internal volume that allow for a gas to be in equilibrium with the solution, and allow a solvent transfer in the gas phase and liquid transfer. The initial condition has at least one tube with little or no condensed solvent and is in an open connected condition with any tubes that are effectively filled with condensed phase material. In this manner, any increase in temperature does not impose a hydraulic stress on any portion of the closed couplable extractor. The solution receiver tube can have a volume that is smaller than the extracting chamber tube. In an embodiment, the solution receiver tube may be a tube that does not have a cap or any other mode for addressing the tube other than the transfer conduits through which fluid can be transferred to the extracting chamber tube. In an embodiment, at one end of the solution receiving tube, a cap can be reversibly attached, where the cap includes a desired volume to function as an extract isolator. In other embodiments the solution receiver tube has a sealable cap, with or without volume for isolating an extract, and contains extractable matter yet acts as a solution receiver tube from an adjacent extracting chamber tube and then function as an extracting chamber tube for an adjacent tube that can function as a solution receiver tube. This extracting chamber/solution receiver tube can function in either mode as selected during an extraction. A valve may be attached to one or both of the extraction chamber tube and solution receiver tube or may be attached within a conduit for fluid flow between tubes. In an embodiment, the closed couplable extractor contains a single valve, in other embodiments a plurality of valves may be used.

Fluid communication between the extracting chamber tube and the solution receiver tube is through one or more transfer conduits between the tubes. Depending upon the orientation of the closed couplable extractor, a portion or all of the transfer conduits can be available for gas or liquid transfer, or one or more transfer conduits can be for gas transfer while one or more of the other transfer conduits can be liquid blocked, otherwise closed, or undergo liquid flow. The tubes can be fixed in a geometry that allows the entire closed couplable extractor to be reoriented by its rotation or inversion to achieve different orientations that may be required for liquid transfer and gas transfer. In embodiments of the invention, the conduits are connected and oriented to allow coupling of closed couplable extractors into a coupled extractor such that heat transfer between two closed couplable extractors occurs during a simultaneous vapor transfer within the coupled extractor. In this manner, the energy input required is reduced by the coupling of the closed couplable extractors.

The closed couplable extractor includes at least one valve through which: air can be removed prior to and/or after solvent introduction; solvent can be placed within or withdrawn from the closed couplable extractor; and/or a solution or extract can be removed from the closed couplable extractor. Closure of the valve enables retention of the solvent atmosphere within the closed couplable extractor during the extraction process.

In some embodiments, valves of the closed couplable extractor can be connected via a coupler, including an external valve, conduits, and sealing features that allows connection of a solvent reservoir, the solute isolator, a vacuum pump, a trap, or any other ancillary component for the removal or addition of air, solvent, solution, or extract from the closed couplable extractor as desired. Couplers can also be used to couple components of a closed couplable extractor, for example, to couple transfer conduits between tubes with formation of a closed couplable extractor from these components.

In other embodiments, the valve may be quick-disconnect valve that seals upon disconnecting allowing manipulation without a step to remove air during connecting of a closed couplable extractor's components. The quick-disconnect can be in combination with other valves, for example, but not limited to, a ball valve connected to a quick-disconnect valve. Valves that can be used in addition or alternatively to the quick-connect are ball valves, plug valves, needle valve, or any other valve capable of use under vacuum and pressure.

In some embodiments, connection can be between paired ball, cylindrical, or plug valves where the two valves can be connected and fixed to each other with complementary matching surfaces to allow to components to be connected and disconnected with introduction of extremely little or no air to the closed couplable extractor.

In embodiments, at least one screen, filter, or combination thereof is included in the system. Although the nature of some extractable material, although with components to be washed or some non-friable plant matter, filtration may not be required, generally, filtration is desirable. The screen or filter can be supported in a portion of the system to retain plant material or other extractable material in a tube. The filter can be at the exit of the tube in a cap or within the conduit connected to the tube. The filter can be a paper filter, a plastic filter, a glass filter, a metal filter, a metal screen, or any combination thereof. The filter can be a paper or plastic filter sandwiched between metal screens and sealed with gaskets. The filter can be a housing in the form of a bag, cup, or other shape that can isolate the extractable matter from flow throughout the conduit between tubes. The filter can be machined holes of small dimensions, for example microholes fabricated using drill bits or lasers that is a portion of the tubes of the extracting chamber. The porosity can vary depending upon the nature of the extractable material employed, as a finely ground material requires a finer filter than does, for example, freshly cut plant matter. One of skill in the art can determine the proper porosity with little experimentation or one may use a sufficiently fine filter that would be appropriate for nearly any material. Different filter bags or tube insertable housings can be used for different extractable matter.

In an embodiment, a pressure relief valve can be included in one or more tubes, or can be in a bung, cap, or conduit such hat the solvent gas can escape if the pressure exceeds a limit for the closed couplable extractor(s). As a typical extraction is not a process that typically generates or requires significant heat, the volume of a closed couplable extractor, because at least one tube is not liquid filled when used at appropriate temperatures, has significant gas volume to moderate pressure increases and avoid hydraulic effects. The temperature of the system is easily controlled to lessen the necessity of the pressure relief particularly in small closed couplable extractors. The pressure relief valve can be matched to the solvent that the operator intends to employ. For example, the pressure relief valve can be one like those internal and external valves employed with a propane cylinder if a desired solvent is propane. The system can be constructed to withstand any pressures anticipated for a variety of solvents under normal use as the closed couplable extractor is not liquid filled during proper use.

In embodiments, the closed couplable extractors can be equipped with temperature sensors, pressure sensors, level sensors or any other sensors that provide information on the state within one or more portions of the closed couplable extractors. In embodiments, the extracting chambers may be equipped with mechanisms for enhancing the rate of extraction. For example, the extracting chamber can have piezoelectric transducers to cause a cavitation in the extracting chamber, promoting more rapid extraction. Ultrasonic actuators or vibrators, microwave sources, or other sorts of agitating devices may be employed in this manner.

In embodiments, the tubes may be equipped with heat pipes, where heat pipes exterior to two adjacent tubes can be employed for transfer of heat from a coupled extracting chamber tube to a coupled solution receiver tube. Heat pipes may be employed within an extracting chamber tube to transfer heat from the tubes surface to the volume occupied by an insulating plant matter. Heat pipes can be constructed with a volatile solvent employed for extraction. Het pipes can be fabricated as linear, curved, looped, spiral or any appropriate shape for inclusion in a tube. The heat pipe may have an included check valve to bias the fluid flow within the heat pipe. The heat pipe may be constructed of a magnetic steel, such as used in many syringe needles, to facilitate removal of the heat pipes from the plant matter when removing spent extractable material.

An embodiment of the invention is directed to a method of extraction where two or more closed couplable extractors form a coupled extractor. An extractable material is placed in the closed couplable extractors' extracting chamber tubes and after imposing a vacuum in the closed couplable extractor, a solvent is included for extraction of components of the extractable material and provide at least the majority of the gas that constitutes the atmosphere within the closed couplable extractor. After soaking the extractable material for a sufficient period of time to partition at least part of the extractable components from the extractable material to the solvent and form an extract solution; the solution is poured, drained, siphoned or otherwise moved to a solution receiver tube. Subsequently, it is often advantageous to distill the solvent from the extract solution in the solution receiver tube back to the extracting chamber tube to make a second extraction or a washing of the once extracted extractable material to form a second extract solution that can be different in composition than the first extract solution. To transfer the solvent from the first extract, heat is provided to the solution receiver tube to vaporize the solvent. This heat of evaporation can be provided by a heating source, such a heated bath, conveniently, but not necessarily, a warm water bath, or any other controllable heating source. This heat, which causes solvent evaporation in a first closed couplable extractor, can be coupled through a second bath, or any functionally equivalent device, such as, but not limited to, heat pipes, to transfer the heat generated by condensation of the solvent in the first closed couplable extractor's extracting chamber tube to a proximal contacting solution receiver tube of a second closed couplable extractor where the absorbed heat results in the evaporation of solvent from a second extract solution therein. The solvent vapor released in the second solution receiver tube, is condensed in a cooler bath, such as, but not limited to a water bath, an ice-water bath, or any functional equivalent. To facilitate the rate of transfer between solution receiver tubes and their connected extraction chamber tubes, a small pressure differential imposed by a small temperature differential of the adjacent baths is generally sufficient. Hence, the common bath for the first closed couplable extractor's extracting chamber tube and the second closed couplable extractor's solution receiver tube can have an intermediate temperature to that of the warm bath heating the first closed couplable extractor's solution receiver tube and the cool bath cooling the second closed couplable extractor's extracting chamber tube. The temperature differential between baths can be small, for example, no greater than that needed to provide a sufficient rate of gas transfer for efficient condensation of solvent liquid on surfaces within the extracting chamber tube. This temperature differential can be as little as two degrees Fahrenheit or less, but larger temperature differences can be employed. The number of extraction chambers that can be coupled in this manner is limited only by the ultimate temperatures of the warm and cool baths and the desired temperature differential between baths. Hence two, three, four, five, six, or more closed couplable extractors can be coupled with temperatures that can contact an operator without risk of temperature induced injury.

In an embodiment, as shown in FIG. 1A with a side view (left) and end view (right), the closed couplable extractor 100 consists of a pair of tubes that constitute the extracting chamber tube (11) and the solution receiver tube (13) connected by a plurality of liquid and vapor transfer conduits (18) where a portion (15) allows vapor and a second portion (16) permits transfer of solvent and solutions between the extracting chamber tube 11 and solution receiving tube 13, respectively. This easily avoids a vapor lock that prevents liquid flow upon orientation because each transfer conduit 18 is branched, with a top portion 15 and a side portion 16 connection to each tube 11 and 13. The tubes 11 and 13 are oriented parallel to each other and can be positioned as illustrated with the extracting chamber tube 11 residing at a lower elevation than the solution receiver tube 13. Extracting chamber tube 11 contains a cap (12) and a sealing clamp (14) to allow placement of the extractable material. In FIG. 1A, the cap 12 and sealing clamp 14 is shown as a tri-clamp ferrule cap, with a gasket, and high-pressure clamp, which are common for food and pharmaceutical processing, however many other sealing methods can be used, and depending upon the diameter of the tubes employed and the pressures employed, other modes of sealing can be preferable. Tri-clamp sealing permits the entire extracting chamber tube's 11 diameter to be accessed for filling with plant matter. These seals are available of tubing with diameters of one to twelve inches or more. The extract solution is formed by solvent inclusion via transfer tubes 15 to the extracting chamber tube 11 from a non-illustrated external solvent reservoir, where transfer of the fluid occurs as a vapor or as a liquid. These transfer tubes 18 allows extract solution to be transferred from the extracting chamber 11 into the solution receiver 13 when closed couplable extractor 100 is rotated clockwise to a perpendicular orientation to that of the end view (right) illustrated in FIG. 2A. Subsequently, the solvent can be distilled from the extract receiver tube 13 when placed in a warm bath, with the extracting chamber tube 11 residing in a cool bath for condensate collection for additional extraction of the extractable material. Ultimately, distilled through valve (17) which ends in a connectable port (19) from the closed couplable extractor 100 to the solvent reservoir leaves an extract in solution receiver tube 13. This extract can be drained upon inversion of the closed couplable extractor 100.

Figure 1B:
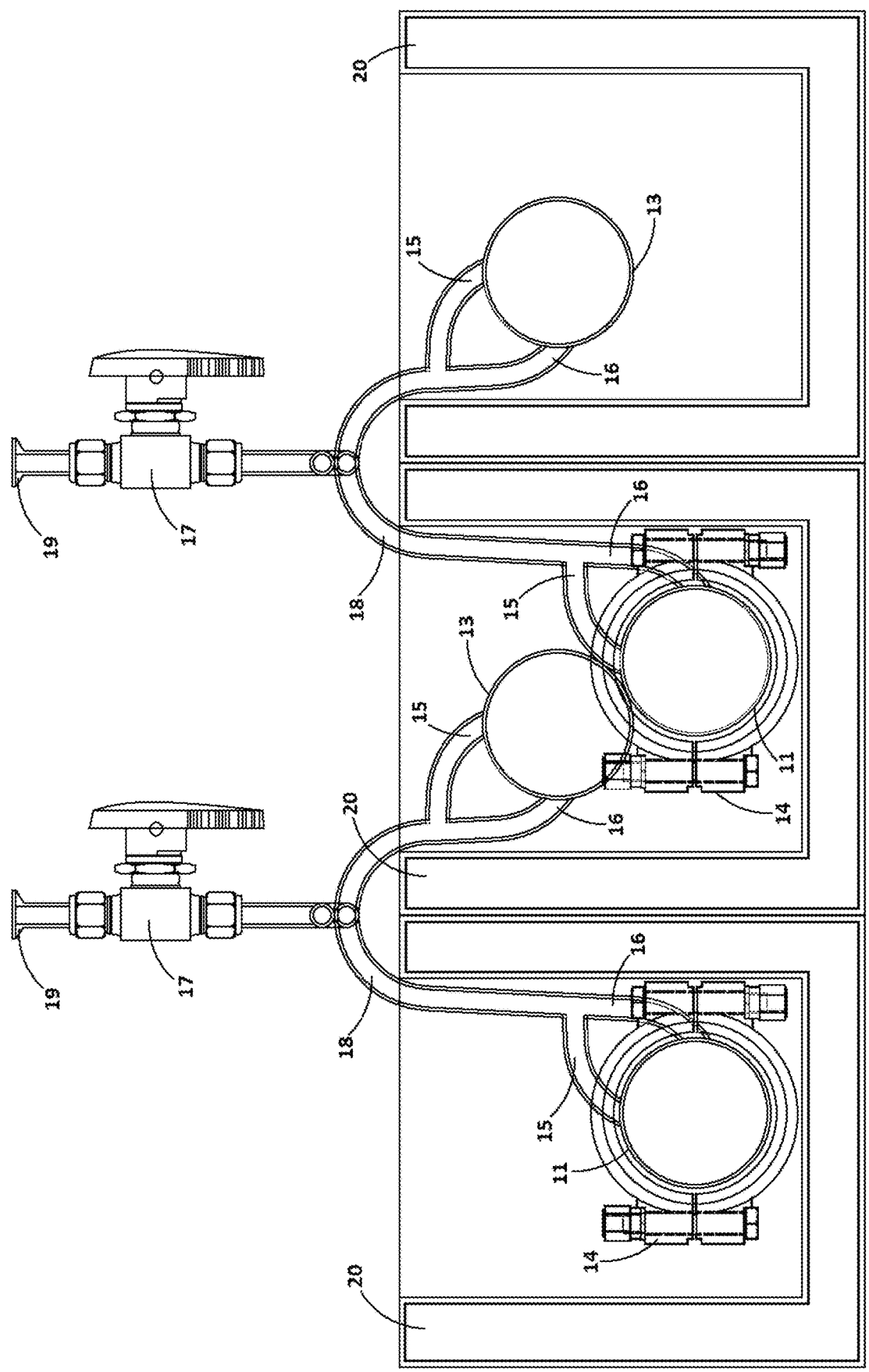
FIG. 1B shows a pair of coupled extractors 100 of FIG. 1A within three baths for coupling their latent heat, according to an embodiment.

FIG. 1B illustrates a coupled extractor consisting of two closed couplable extractors 100 where the solvent from the solution in right solution receiver tube 13 evaporates when placed in the right heated bath (20), which distills through the transfer tubes 15/18 and condenses in the extracting chamber tube 11 in intermediate bath 20. The latent heat of condensation in extracting chamber tube 11 is transferred via common bath 20, providing the heat of evaporation for the left closed couplable extractor's solution receiver tube 13 causing the distillation of the solvent from that solution receiver tube 13 to the left extracting chamber tube 11 residing in a left cool bath (20). The intermediate bath 20 can be at ambient temperature, while the cooled bath 20 and the heated bath 20 can be maintained at temperatures that are only a few, for example about 1 to about 10° F., below and above ambient temperatures, respectively, although temperatures that are greater than 10° F. above or below ambient can be employed. The intermediate bath can be at a temperature that is not ambient and no bath needs to be at ambient as long as the intermediate bath 20 is intermediate in temperature.

Figure 2:
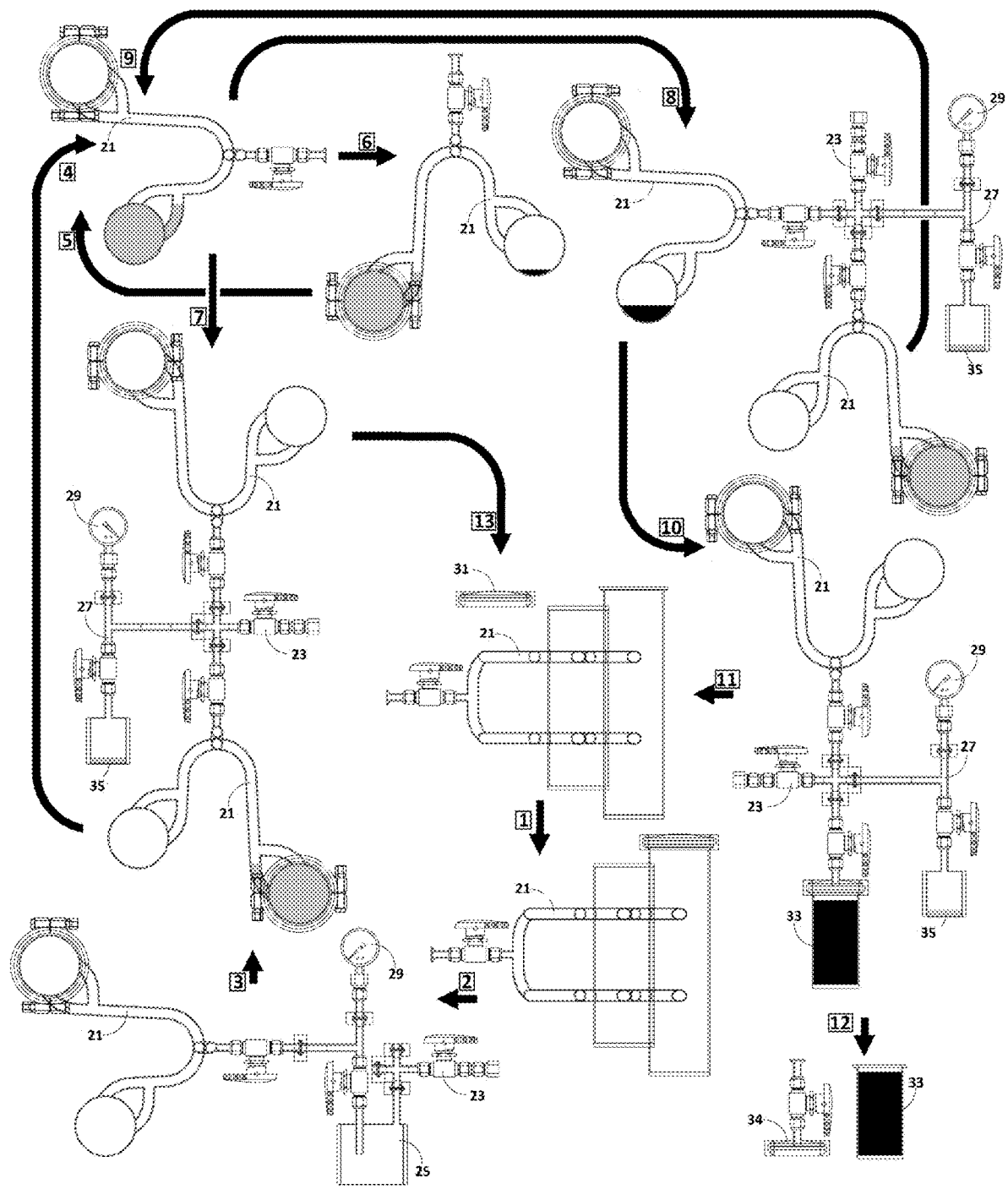
FIG. 2 illustrates an exemplary process, according to an embodiment, for performing a continuous batch process employing a multiplicity of closed couplable extractors 100.

In an embodiment, as illustrated in FIG. 2, the closed couplable extractors 21, which is 100 of FIG. 1A can be employed in a process of extraction where retention of all solvent is achieved. Plant matter is placed in a plurality of extracting chamber tubes 11 to allow continuous batch extractions. In step 1 an empty closed couplable extractor 21 has its extracting chamber tube's cap and sealing clamp 31 removed to fill the extracting chamber. The cap and clamp 31 are sealed to the extracting chamber tube 11 and, in step 2 the closed couplable extractor 21 is connected via a connector (23), to a trap (25) and evacuated to vacuum as indicated on the vacuum\pressure gauge (29). The illustrated valves and gauges are not intended to be an illustration of their appropriate alignments but only their placement in the component. Though not illustrated, at process startup, at least one closed couplable extractor 21 is connected to a solvent reservoir for an initial filling with solvent. The connector 23 can be used as a portion of the conduit between the closed couplable extractor 21 and a solvent reservoir.

During the process, evacuated closed couplable extractors 21 can be connected through the connector 23 for solution transfer, in step 3 where an evacuated closed couplable extractor 21 is introduced into the process with receiving of solution from a closed couplable extractor 21 exiting the process. This step can be carried out while the solution has not achieved a state of concentration that would inhibit further extraction or overfill the entering closed couplable extractor 21. As indicated by pressure gauge 29, after pulling a vacuum through the connector 23 and closing its valve to isolate these components, a residual solvent collecting tube (27), containing residual solvent (35) removed from a previous exiting closed couplable extractor 21 is transferred to the evacuated closed couplable extractor 21. Solution from the exiting closed couplable extractor 21 is drained to the entering closed couplable extractor 21, which is then sealed by closing of its valve 17. The solvent collecting tube 27 is then chilled to a temperature where all solvent 35 within the exiting closed couplable extractor 21 is condensed to a state where a vacuum results.

In step 4, the entering closed couplable extractor 21 is introduced where alone or with other coupled closed couplable extractors 21, as illustrated in FIG. 1B, at process (step 6), has solvent vapor transferred from its solution receiver tube 13 and condensed into its extracting chamber tube 13 and held for sufficient time to achieve an extract solution. In step 5, closed couplable extractor(s) 21 are oriented to transfer the solution from the extracting chamber tube(s) 11 into the solution reservoir tube(s) 13. The closed couplable extractor 21 is then reoriented for distillation of solvent to the extracting chamber tube 11 at step 6. Steps 5 and 6 can be repeated as desired for each closed couplable extractor to complete extraction and wash wetting extract from the plant matter. The solvent condensation step 6 is optionally repeated at least once to assure that extract from residual extract solution wetting the plant matter is washed into the solution reservoir tube 13 after no additional extract partitions from the plant matter. For a closed couplable extractor 21 exiting the process, where the concentration of the extract is a sufficiently low volume of the solution in the solution receiver, after step 5, in a step 7, that exiting closed couplable extractor 21 can be coupled with an evacuated closed couplable extractor 21 to be introduced to the process at step 3. Alternatively, or as required when the volume of extract in the solution exceeds an acceptable amount for additional extraction, an exiting closed couplable extractor 21 is coupled in step 8 to an evacuated closed couplable extractor 21 from step 2 through connector 23 for transfer of the solvent from the solvent collecting tube 27 and the exiting closed couplable extractor 21 as a vapor to the extracting chamber of the evacuated closed couplable extractor 21, which is returned to the extraction process in step 9.

The concentrated extract in the exiting closed couplable extractor 21 is drained to an extract receiver (33) is step 10. After draining, cooling the closed couplable extractor 21 using a chilled gas stream, a cold cloth or spung, or a controlled cold liquid, closed couplable extractor 21, residual extract is washed into extract receiver 33. The connected solvent collecting tube 27 and a pressure gauge 29 can be used for removing the residual solvent from the extract and to indicate when most if not all solvent has been removed from the extract. Ultimately, in a step 12, extract can be removed from the extract receiver 33, illustrated as opening the extract receiver by removal of a valved cap and sealing clamp (34). Other modes can be employed to remove extract via valves or other mechanisms.

Figure 3A:
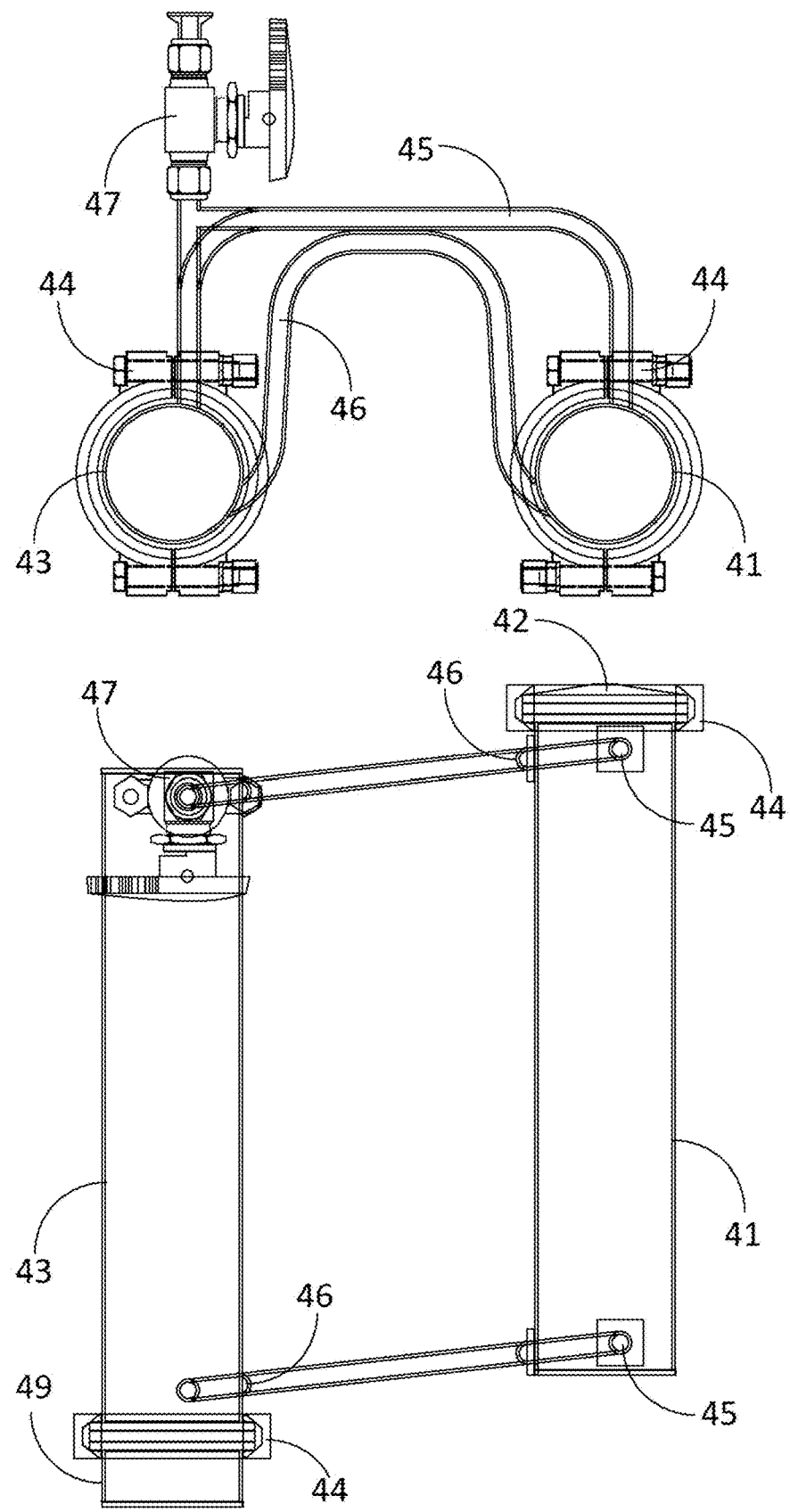
FIG. 3A shows an end view and a top view for an exemplary closed couplable extractor (400), according to an embodiment, where two parallel tubes are employed as an extracting chamber tube (41) and extract solution receiver tube (43) that are connected by vapor transfer tubes (45) and solution transfer tubes (46).

In another embodiment, as shown in end and top views in FIG. 3A, the closed couplable extractor 400 has an extracting chamber tube (41) and a solution receiver tube (43) connected by two vapor transfer tubes (45), one of which is connected to a valve (47), which permit transfer of solvent vapor and simultaneous liquid solution transfer between the extracting chamber tube 41 and solution transfer tube 43. The extracting chamber tube 41 is equipped with a cap (42) and sealing clamp (44). As shown, although this feature may be absent in alternative modes of isolating the extract, an extract receiver (49) rather than a cap 42 is coupled via a clamp 44 to an end of the solution receiver tube 43. From the illustrated orientation, the closed couplable extractor 400 can be tilted approximately 45° to cause a siphon of extract solution through solution transfer tubes 46 from the extracting chamber tube 41 to the solution receiver 43. After collection of a combined solution from a plurality of extractions, the solvent can be distilled from the solution receiver tube 43 through valve 47 to a connected solvent reservoir, not shown, and the extract can be collected in the extract receiver 49 and a final removal of residual solvent can be carried out for recycling of all solvent in a subsequent extraction.

Figure 3B:
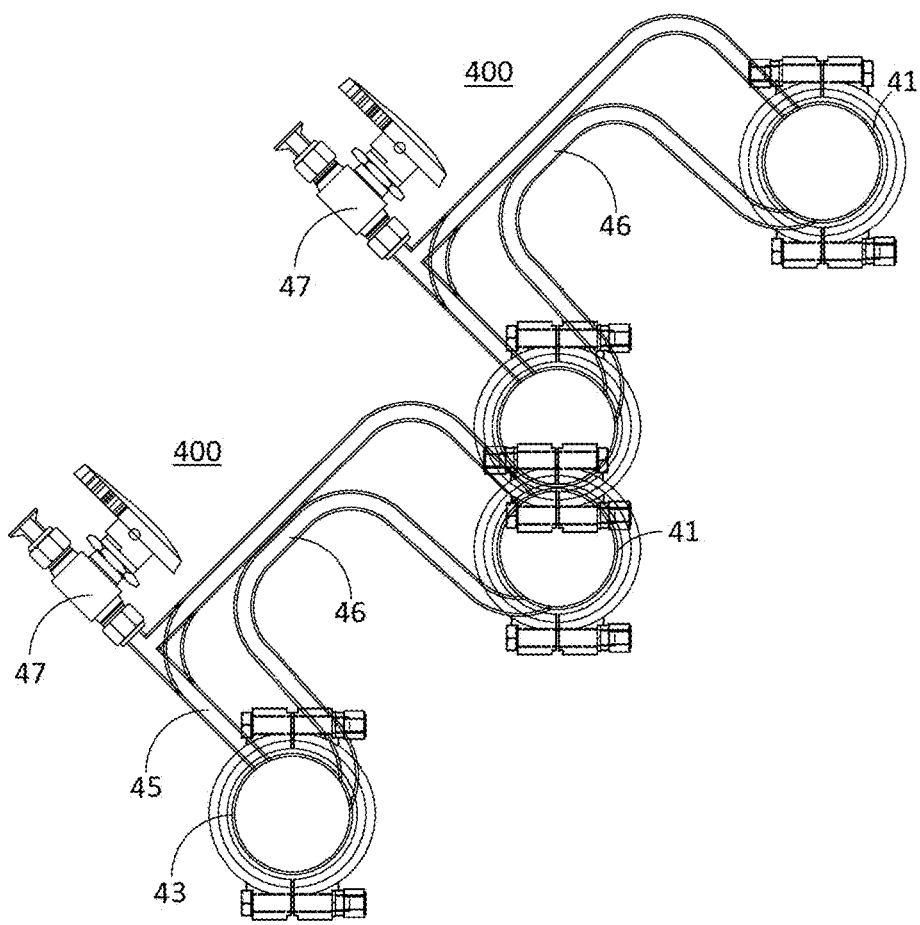
FIG. 3B shows an end view of pair of coupled extractors 400, according to an embodiment, each rotated 45° where heat transfer from a lower extraction chamber tube 41 to a solution receiver 43.

As shown in FIG. 3B, coupled extractor can be formed by proximally contacting a first and second closed couplable extractors 400. By tilting the tubes at a 45° pitch with the extracting chamber tube 41 elevated above the solution receiver tube 43. Though not shown, the closed couplable extractors 400 can be placed in three baths that can accommodate passage of the vapor transfer tubes 45 and solution transfer tubes 46. With the lowest bath providing heat to a first solution receiver tube 43, the top bath providing cooling to the second extracting chamber tube 41, and a central bath containing the first extracting chamber tube 41 in proximal contact with the second solution receiver tube 43 at ambient or other intermediate temperature. In this orientation, the top surface of the extracting chamber tube 41 is at or above the height of the top of the connected solution transfer tubes 46. In this orientation, the solution of the extraction chamber tubes 41 siphons to the solution receiver tubes 43 once the solution level in the solution transfer tubes 46 exceeds the height in the extraction chamber tube 41. Once siphoned, the solvent is again distilled from the solution receiver tubes 43 through the vapor transfer tubes 45 to the extracting chamber tubes 41 where it condenses to fill the extracting chamber tubes 43 and the process of siphoning and distilling repeats. The heat of condensation released from the lower first extracting chamber tube 41 transfers to the higher second solution receiver tube 43 where absorption of heat causing solvent to distill from the upper solution receiver tube 43 with condensation in the second higher extracting chamber tube 41. In this manner, by maintaining the heat in a lowest first bath and the cooling in the highest last bath, two, three, four, or more closed couplable extractors 400 can be coupled with little or no change in temperature of the intermediate baths when the amount of solvent in each closed couplable extractor 400 is nearly equal. A continuous vapor and solution flow allows two or more extractions of the plant matter and separation of the extract constituents from the plant matter.

Figure 3C:
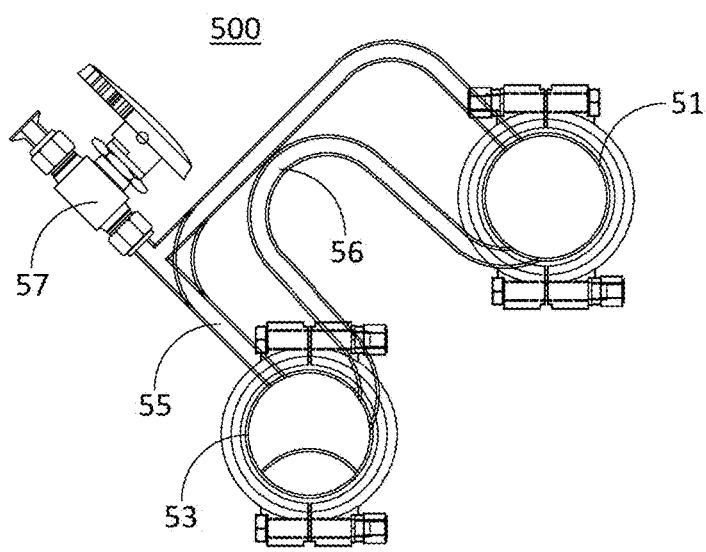
FIG. 3C shows an end view of a modified closed couplable extractor (500), according to an embodiment, having an inversion of a portion of the solution receiver (53).

As shown in FIG. 3C, according to an embodiment, a closed couplable extractor 500 has a solution receiver tube (53) that has a portion of the tube inverted to form a complementary surface for enhanced direct contact, proximal contacting, between a portion of the solution receiver tube 53 of one closed couplable extractor 500 and a portion of an extracting chamber tube (51) of a coupled second closed couplable extractor 500. This permits a large surface area of contact, where the length of the tube and the proportion of the tube inverted is determined to allow complete containment of the solution in the solvent receiver tube 53 of the closed couplable extractor 500. In other embodiments, the shape of the tube can be of a square, rectangle, hexagon or other polygon to provide complementary surfaces for greater contacting area during proximal contacting. Closed couplable extractors 500 can be coupled to allow simultaneous processing of a plurality of closed couplable extractors when oriented to allow a siphon through solution transfer tubes (56).

Figure 4A:
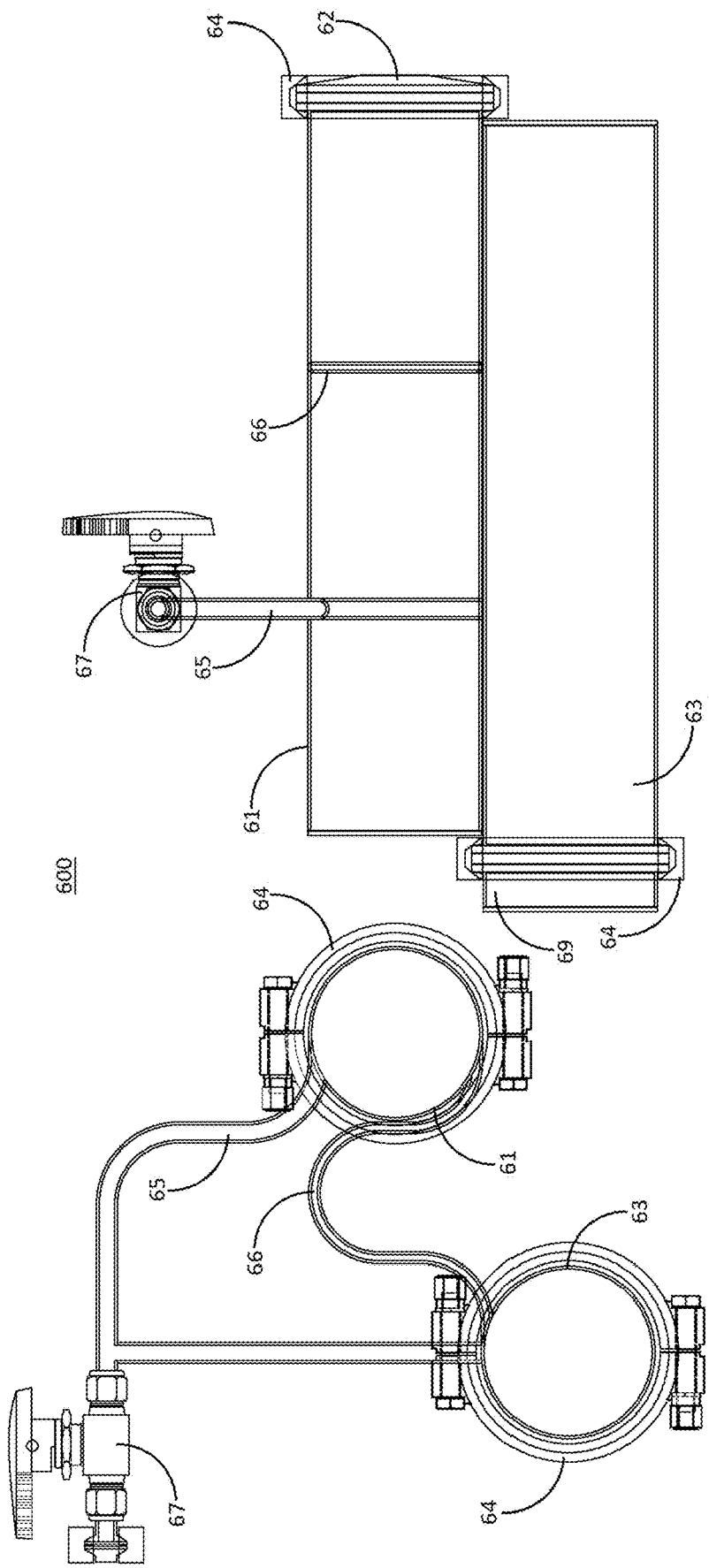
FIG. 4A shows an end view and a side view for an exemplary closed couplable extractor (600), according to an embodiment, where two parallel tubes are employed as an extracting chamber tube (61) and extract solution receiver tube (63) with vapor transfer tube (65) and solution transfer tube (66).

In another embodiment of the invention, as shown in FIG. 4A, closed couplable extractor 600 is shown in side and end views where the extracting chamber tube (61) is connected to solution receiver tube (63) through a single vapor transfer tube (65), across the tops of the tubes and via a single solution transfer tube (66) connected from the base of the extracting chamber tube 61 to the top of the solution receiver tube 63. The solution transfer tube 66 is shown as a narrower tube than the vapor transfer tube. This optional smaller diameter solution transfer tube 66 reduces the rate of solution flow, which can be advantageous in some circumstances to increase contact time for bathing plant matter in the solution. In other embodiments, the solution transfer tubes 66 can be of equal or greater in cross-section that the vapor transfer tubes 65. The shown orientation of the transfer tubes allows the top surface of extracting chamber tube 61 to be at the same level as the top of the curved solution transfer tube 66, such that upon filling of the extracting chamber tube 61 a siphon forms to transfer the solution to the solution receiver tube 63. The extracting chamber tube 61 is shown with a port that is sealed with a cap (62) and sealing clamp (64) for filling and emptying the extractable and extracted plant matter. In this manner, the extraction can be repeated until acted upon by an operator or if automated with appropriate sensors and mechanical or electronic actuators. As shown, the solution receiver tube 63 has a port that is sealed with an extract receiver (69) and sealing clamp (64) for isolation of the extract upon completion of extraction. Alternatively, the extract receiver 69 can be replaced with a cap 62 and the extract can be isolated through the valve (67) for isolating the closed couplable extractor 600 in a manner illustrated in FIG. 2. The shape of the vapor transfer tube 65 allows a coupled second closed couplable extractor's 600 solution receiver 63 to be placed onto the extraction chamber 61 of the first closed couplable extractor 600.

Figure 4B:
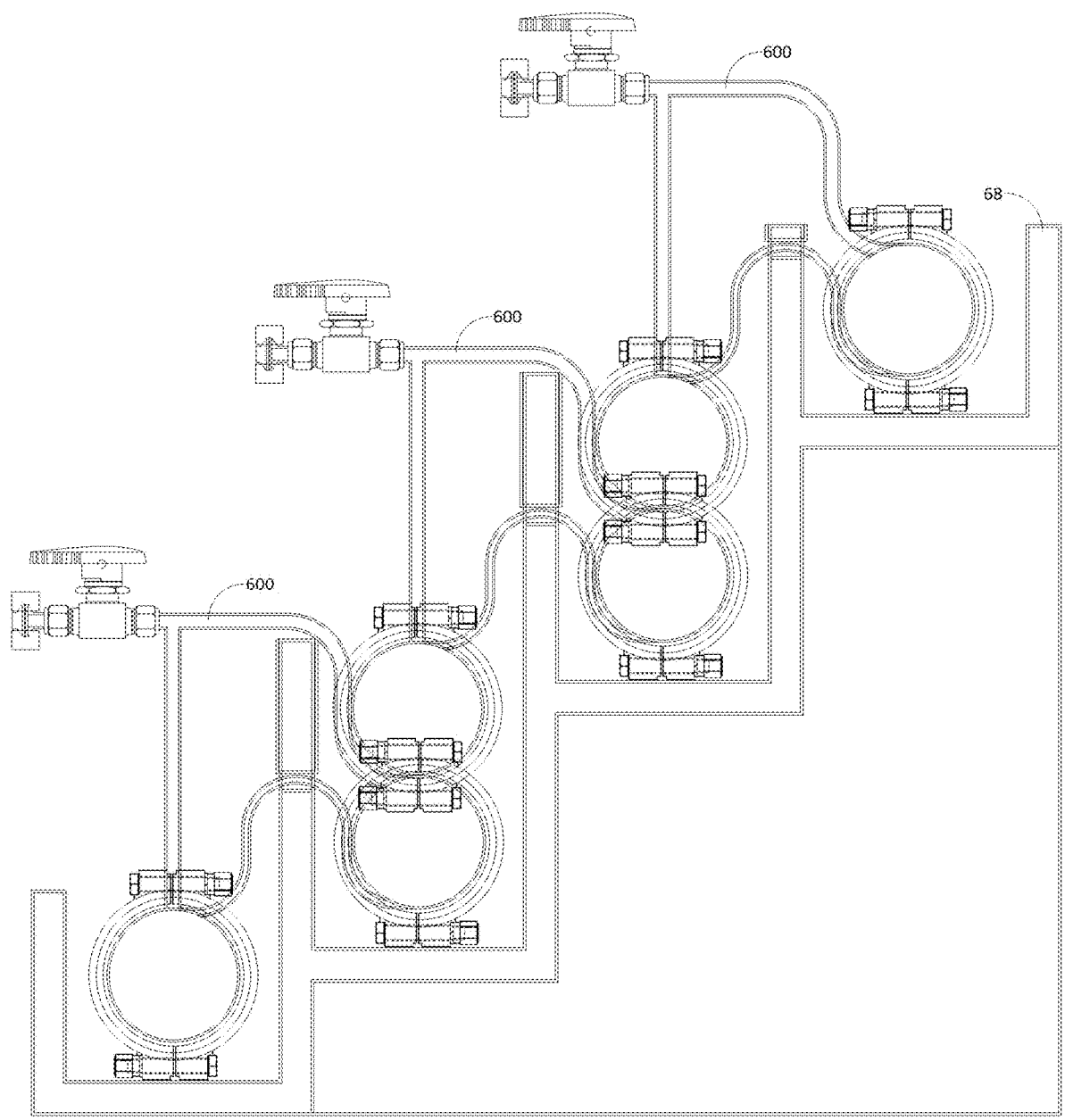
FIG. 4B shows an end view of three closed couplable extractors 600, as shown in FIG. 4A, to form a coupled extractor, where the solution receiver tube and extracting chamber tube of a central closed couplable extractor 600, couples heat transfer by proximal contacting a base extractor's extracting chamber tube and a top extractor's solution receiver tube.

FIG. 4B shows a multistage bath (68) having four baths to couple three closed couplable extractors (600) as shown in FIG. 4A. Multistage bath 68 allows placement of tubes from two closed couplable extractors 600 in a common bath while maintaining the orientation of the closed couplable extractors as in FIG. 4A. Cooling the top bath and heating the base bath of the multistage bath 68 allows automatic fluid transfer for multiple extractions in multiple closed couplable extractors 600 simultaneously when the temperatures in the central baths are intermediate to that of the top and base baths. Generally, the temperature of the baths range from coolest to hottest with a descent in altitude.

Figure 5A:
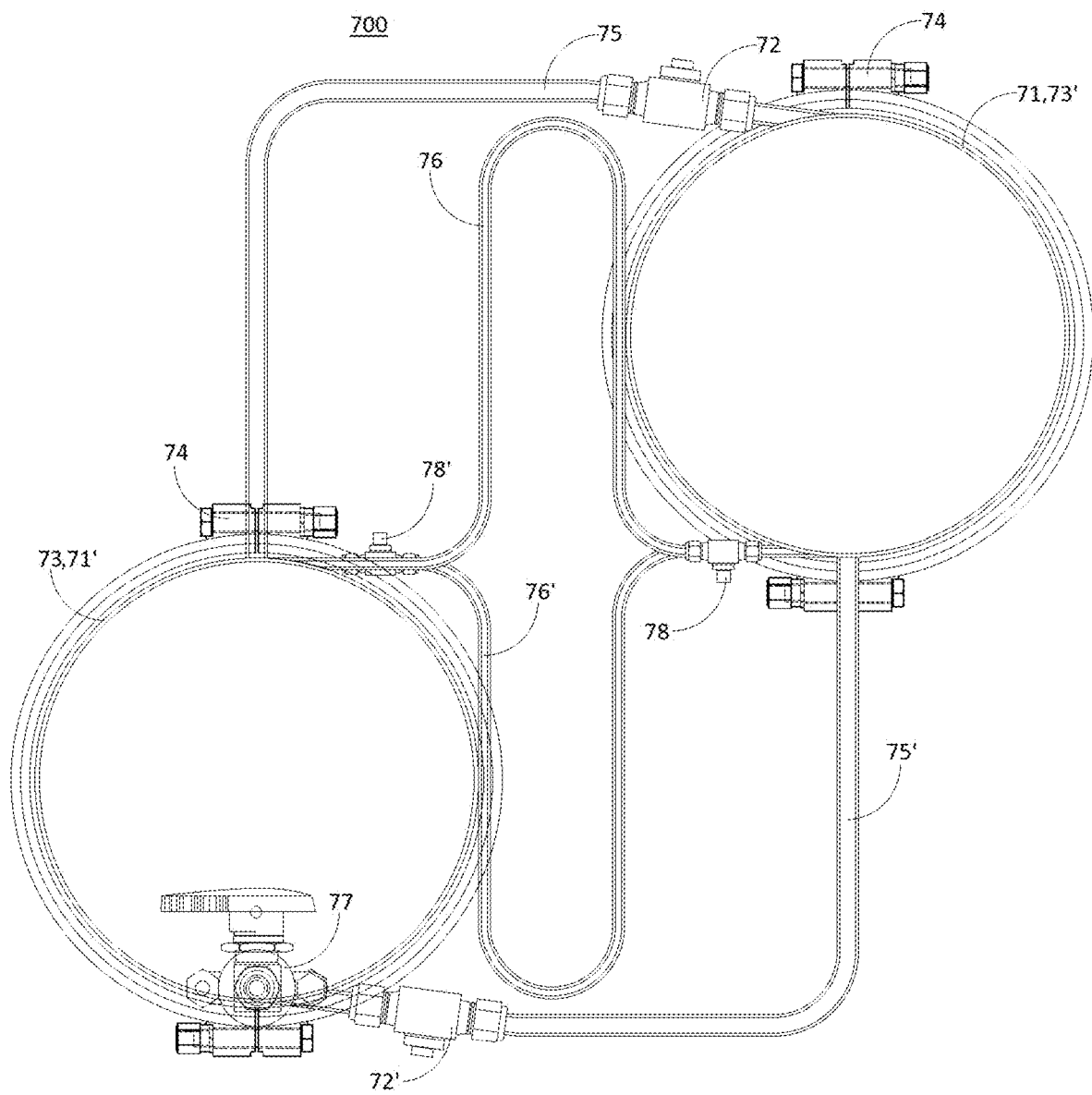
FIG. 5A shows an end view of a closed couplable extractor (700), according to an embodiment, where extracting chamber/solution receiver tubes (71/73') and (73/71') are connected with selectively assignable vapor transfer tubes (75 and 75') and solution transfer tubes (76 and 76').

FIG. 5A shows a closed couplable extractor 700 according to an embodiment of the invention where either tube acting as the extracting chamber tubes (71/71') can be positioned above the solution receiver tube (73/73'). The tube employed as the final solution receiver tube 73 allows extract isolation trough a main valve (77), which resides at the base of the tube. The valve can be connected at almost any portion of the closed couplable extractor 700. The closed couplable extractor 700 can be rotated about a central axis parallel to the tubes with the lower tube designated the solution receiver 73 or 73'. A pair of vapor transfer tubes (75'75') and a pair of curved solution transfer tubes (76/76') connect the two tubes 73/71' and 71/73' at approximately a central plane that contains the extractor's central axis and is tangent to the two tubes, with the vapor transfer tubes 75 also attached to the distal side of the tubes 71 and 73 from the central axis. These vapor transfer tubes 75/75' and solution transfer tubes 76/76' contain isolation valves (72/72') and (78/78'), allowing the opening of that pair on the same side of the central plane and elevated to permit fluid transfer while the pair of transfer tubes 75' and 76' on the opposite side of the central plane are closed to allow the lower tube to act as the solution receiver tube 73. In this manner both tubes 71/73' and 73/71' are filled with plant matter, typically, but not necessarily, with nearly identical quantities, by removal of a cap and sealing clamp (74). The extraction can be carried out by applying heat to the lower tube configured as the solution receiving tube 73 or 73' and/or cooling the higher tube configured as the extracting chamber 71 or 71'. Upon full extraction of the plant matter the extract and solvent can be removed via valve 77.

Figure 5B:
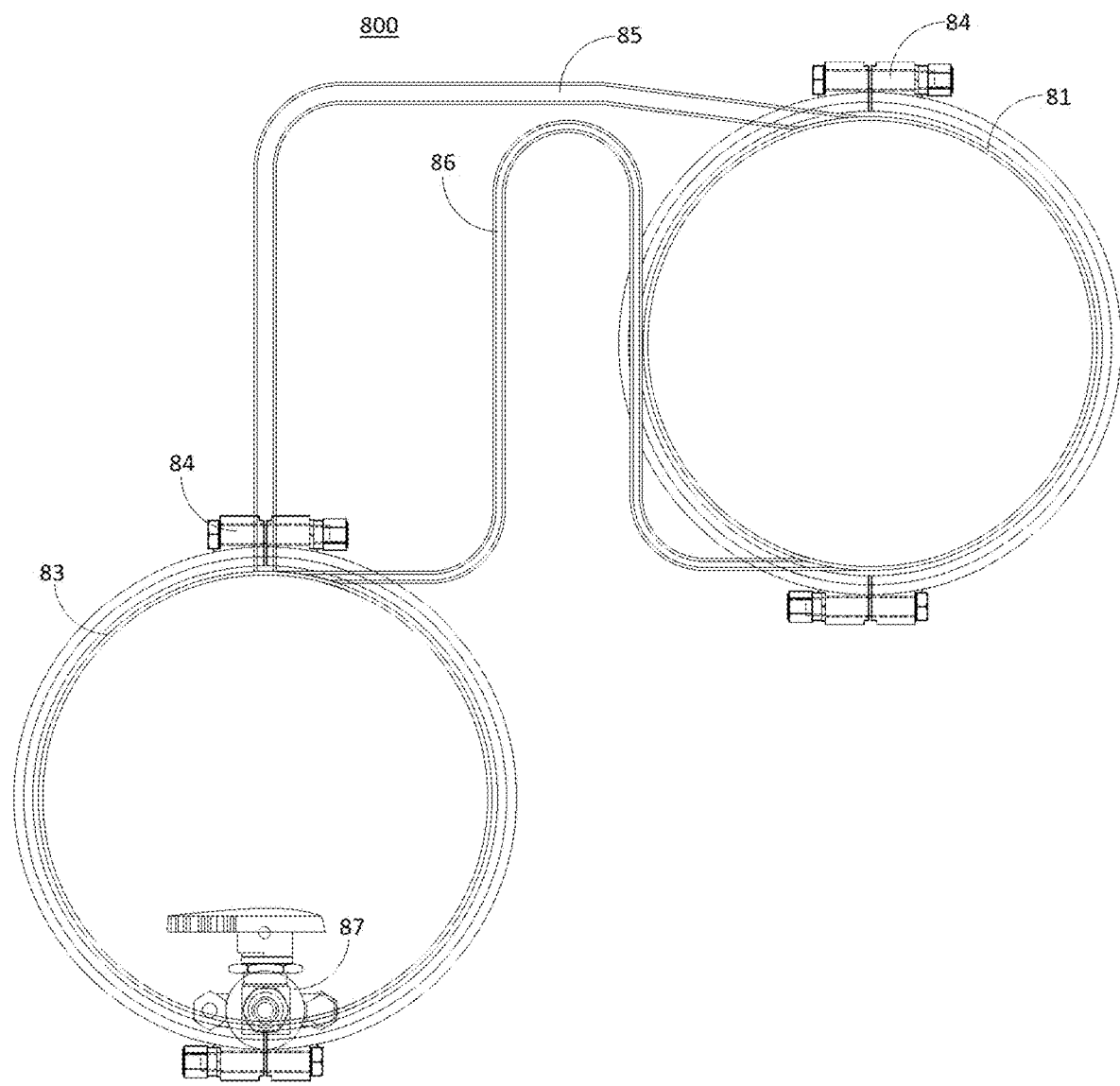
FIG. 5B shows an end view of a closed couplable extractor (800), according to an embodiment, where extraction chamber tube (81) and solution receiver tube (83) are fluidly accessible through a valve (87) at the base of the solution receiver tube 83.

In another embodiment, as shown in FIG. 5B, n closed couplable extractor 800 has an extraction chamber (81) positioned above the solution receiver (83) where both can be filled with plant matter, as facilitated by caps and sealing clamps (84). The solvent in the extracting chamber tube 81 is filled from the solution receiver tube 83 via the vapor transfer tube (85) and siphons via the solution transfer tube (86) back into the solution receiver tube 83. The final extract solution can be drained through valve (87) to a solvent reservoir/extract isolator (not shown) with distillation of solvent from the solvent reservoir/extract isolator into closed couplable extractor 800 to wash any residual extract from the closed couplable extractor with solution receiver tube 83 functioning in the manner of an extracting chamber tube during this final removal of extract.

Figure 5C:
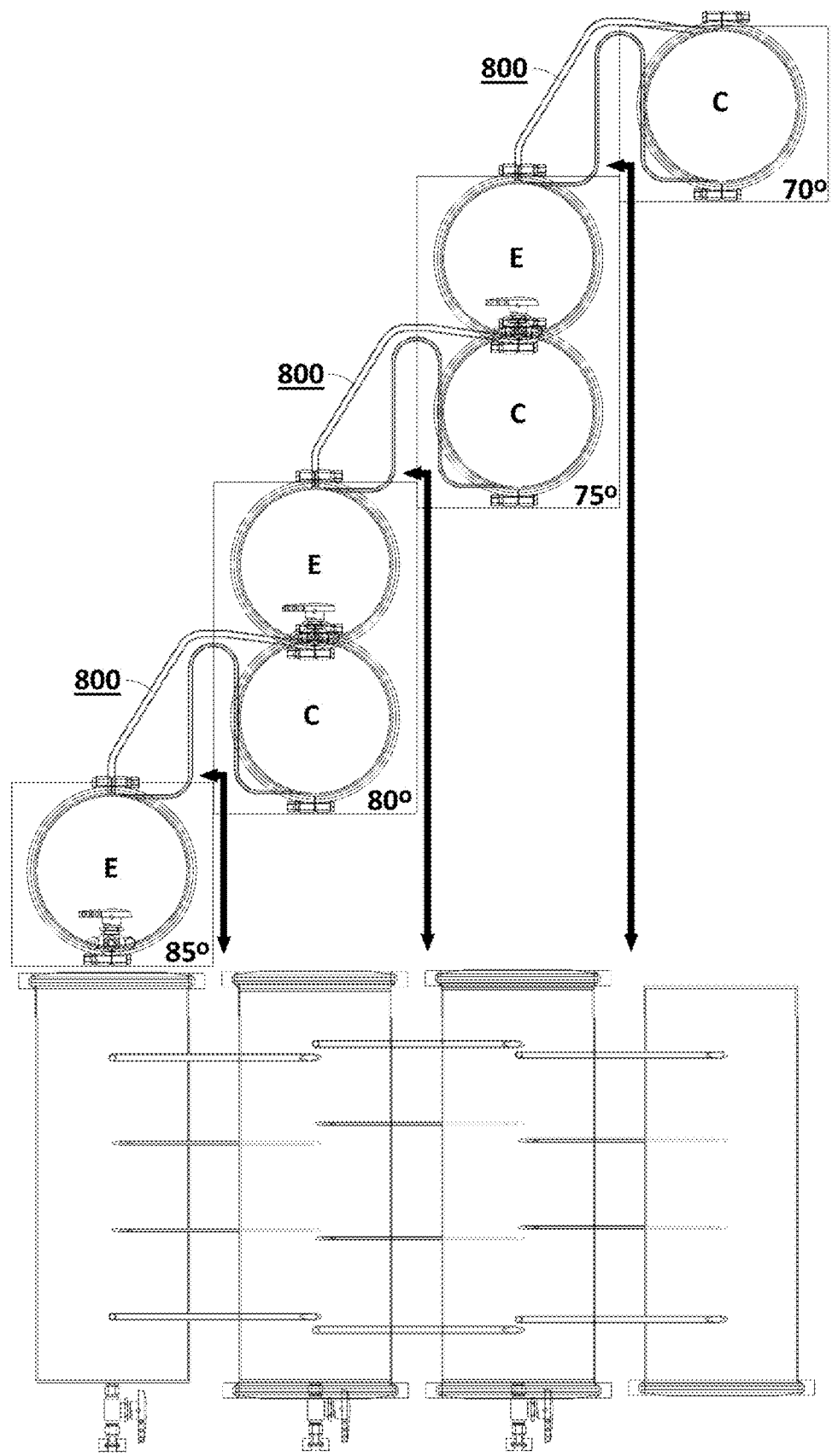
FIG. 5C illustrates a coupled extractor, according to an embodiment, for performing simultaneous extraction employing a multiplicity of closed couplable extractors 800 as shown in FIG. 6B.

In an embodiment, as shown in FIG. 5C with end and top views, two, three (as shown in end and top view) or more closed couplable extractors 800 can be coupled by stacking, where the solution receiver 83 of the higher closed couplable extractors 800 proximally couples to the extracting chamber 81 of the lower closed couplable extractors 800. In this manner, when using a volatile solvent, small temperature differences between a closed couplable extractor's 800 solution receiver tube 83 to its extracting chamber tube 81 promotes distillation of the solvent with the heat of evaporation is provided when heating the lowest solution receiver tube 83 and cooling the highest extracting chamber tube 81. Exemplary temperatures vary from 85 to 70° F. though lower and higher temperatures can be employed. The temperature differential can be established at the beginning of the extraction with no heating or cooling, or very little heating and cooling, required to maintain the temperature of the coupled tubes throughout the process. The tubes of the closed couplable extractors 800 are shown as horizontal tubes, although the orientation of the tubes can be vertical or otherwise oriented. Horizontal tubes allow the height of the coupled closed couplable extractor system to be minimized and allow the surface area to volume of the solution to be optimal for heat transfer during evaporation and condensation relative to that when tubes are vertical through most of the process within the closed couplable extractor 800. The syphoning from the extracting chamber tubes 81 to the solution receiver tubes 83 results in very little cooling of the coupled tubes. For example, using a bath that is about ten percent greater in width and length, and five percent greater in height than the tubes thereinthe fluid in the baths has approximately twice the thermal mass of the solution draining into the closed couplable extractor 800 therein. In this manner, a repetition of distillation and siphoning can occur until an operator decides to end this portion of the extraction process. Subsequently, the equivalent of steps 10 through 12 of the process illustrated in FIG. 2 can be carried out with each closed couplable extractor 800.

Figure 5D:
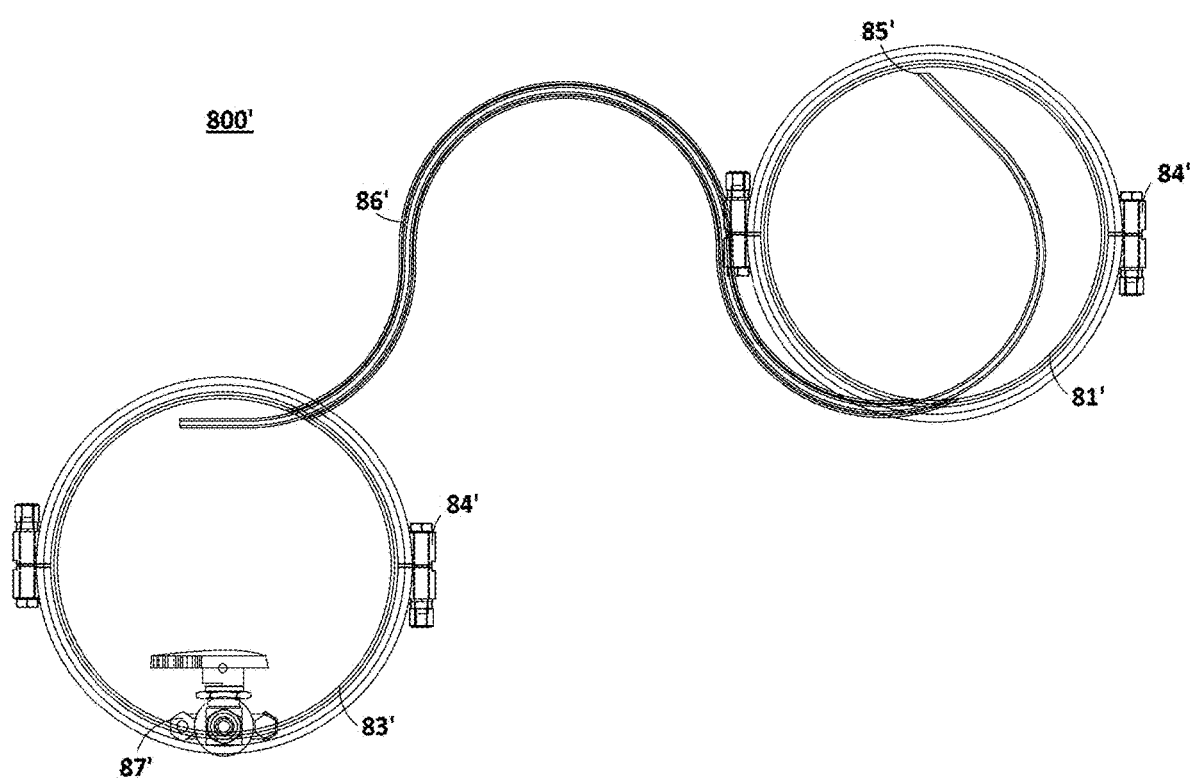
FIG. 5D shows an end view of a closed couplable extractor (800'), according to an embodiment, are fluidly accessible through a valve (87') where the vapor transfer tube (85') resides within a solution transfer tube (86').

FIG. 5D shows a side view of a closed couplable extractor (800'), according to an embodiment, where extraction chamber tube (81') and solution receiver tube (83') are connected via one or more vapor transfer tube(s) (85') that resides within one or more solution transfer tube(s) (86'). Alternatively, vapor transfer tubes can be internal to solution transfer tubes. Air can be removed and solvent can be introduced through valve (87) as a vapor or as a liquid.

Figure 5E:
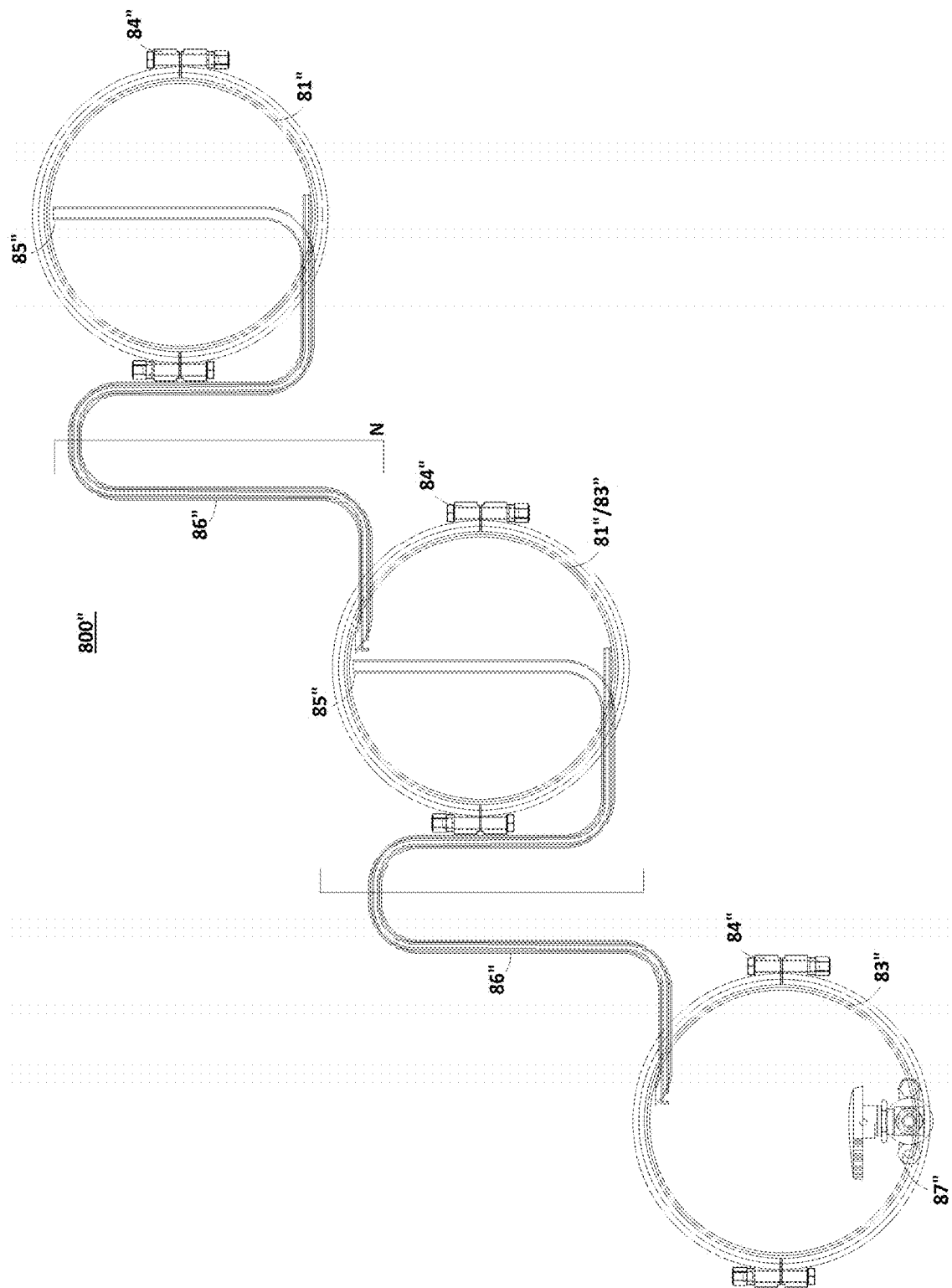
FIG. 5E shows an end view of a multiple closed couplable extractor (800"), according to an embodiment, where extracting chamber tube (81") and solution receiver tube (83") are coupled with N extracting chamber/solution receiver tubes (81"/83") that are fluidly accessible through a valve (87) where the solution transfer tubes (86") reside within the vapor transfer tubes (85").

FIG. 5E shows a side view of a multiple closed couplable extractor (800"), according to an embodiment, where a top extracting chamber tube (81") and a base solution receiver tube (83") are coupled with N extracting chamber/solution receivers (81"/83"), with flexible solution transfer tubes (86") can be inserted through rigid vapor transfer tubes (85") as the solution transfer tubes 86" are not required to maintain structural integrity under vacuum or pressure conditions. In this connectivity, solvent can be distilled from the base solvent receiver tube 83" through the N connected extraction chamber/solution receivers 81"/83" to the top extracting chamber 81". After filling the top extracting chamber 81" a sequence of siphoning into successively lower extracting chamber/solution receivers 81"/83" can be carried out until the combined extract solution resides in the base solvent receiver 83", from which the solvent can be distilled back to the top extracting chamber 81" and the siphoning repeated until it is desired to drain the solution into a solvent reservoir/extract isolator (not shown) from which the extract can be isolated.

Figure 6A:
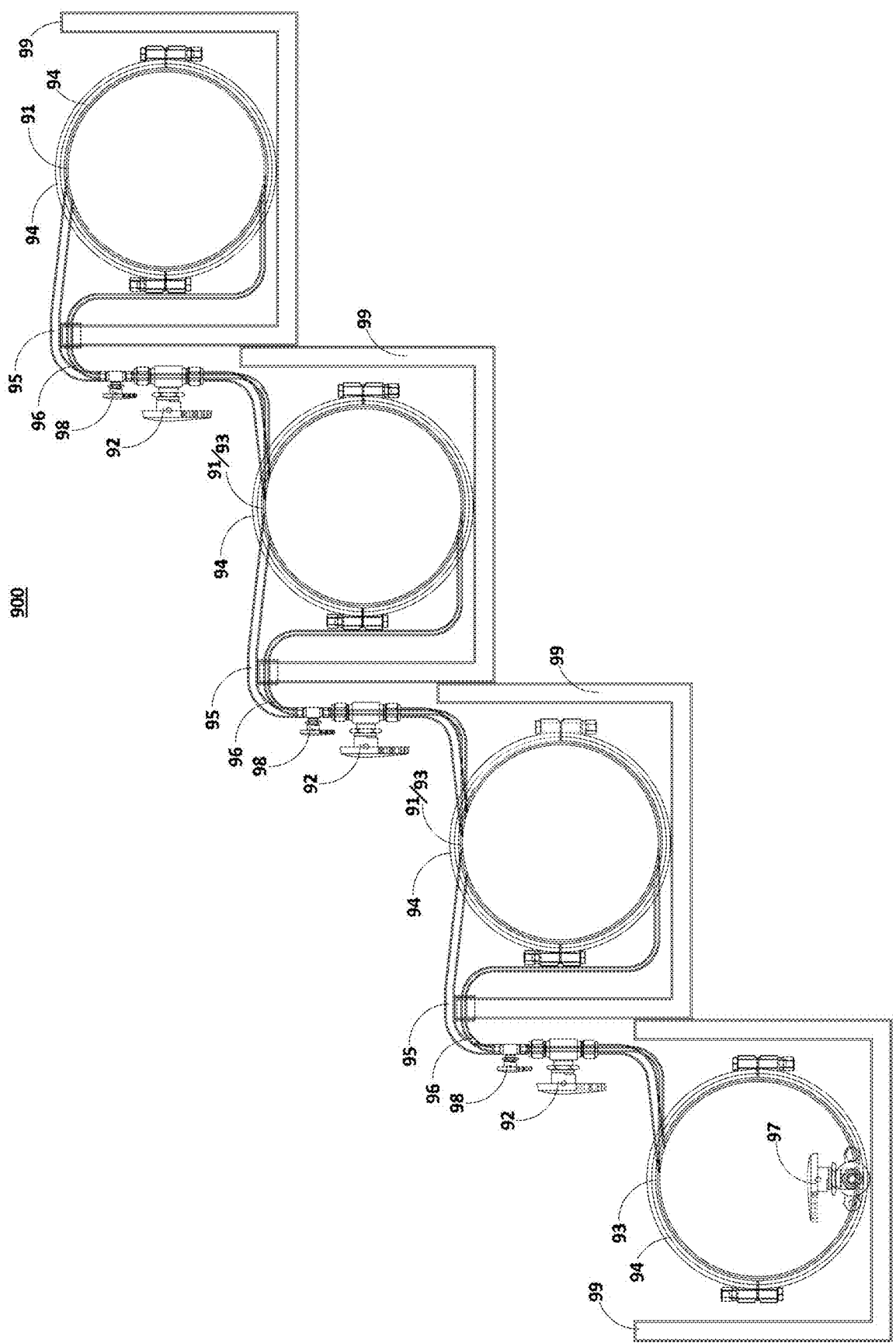
FIG. 6A shows and end view of multiple closed couplable extractor (900), according to an embodiment, where extracting chamber/solution receiver tubes (91/93) include isolation valves (92) and (98) to allow selective addressing of the extracting chamber/solution receiver tubes 91/93.

As shown in FIG. 6A, in an embodiment, the multiple closed couplable extractor (900) has a multiplicity of tubes that include a plurality of extracting chamber/solution receiver tubes (91/93) a top extraction chamber tube (91) and a base solution receiver tube (93) where all can be filled with plant matter facilitated by a cap and sealing clamps (94). Between adjacent tubes, vapor transfer tubes (95) and solution transfer tubes (96) contain isolation valves (92) and (98), respectively, allow any individual pair of adjacent tubes to act as an isolated lower solution receiver tube 93 higher extracting chamber tube 91. A multiplicity of baths (99) can be used to promote the vapor transfer. The closed couplable extractor 900 permits solvent condensation in the top tube, an extracting chamber tube 91, and the solution formed can sequentially fill and extract lower tubes until the solution with combined extract is received in the base solution receiver tube 93, which can be at a highest temperature to promote vapor transfer of the solvent into the highest extracting chamber tube 91 that is cooled to a temperature lower than any of the other tubes. Ultimately, valve (97) can be used to transfer solution to a solvent reservoir/extract isolator (not shown) without reorienting the multiple closed couplable extractor 900. In an embodiment, two or more, up to all but one of the tubes of the closed couplable extractor 900, can be filled with solution. In an embodiment, the isolation valves 92 and 93 need not be present and the temperatures of the baths 99 can control which tube(s) acts as the extracting chamber 91.

Figure 6B:
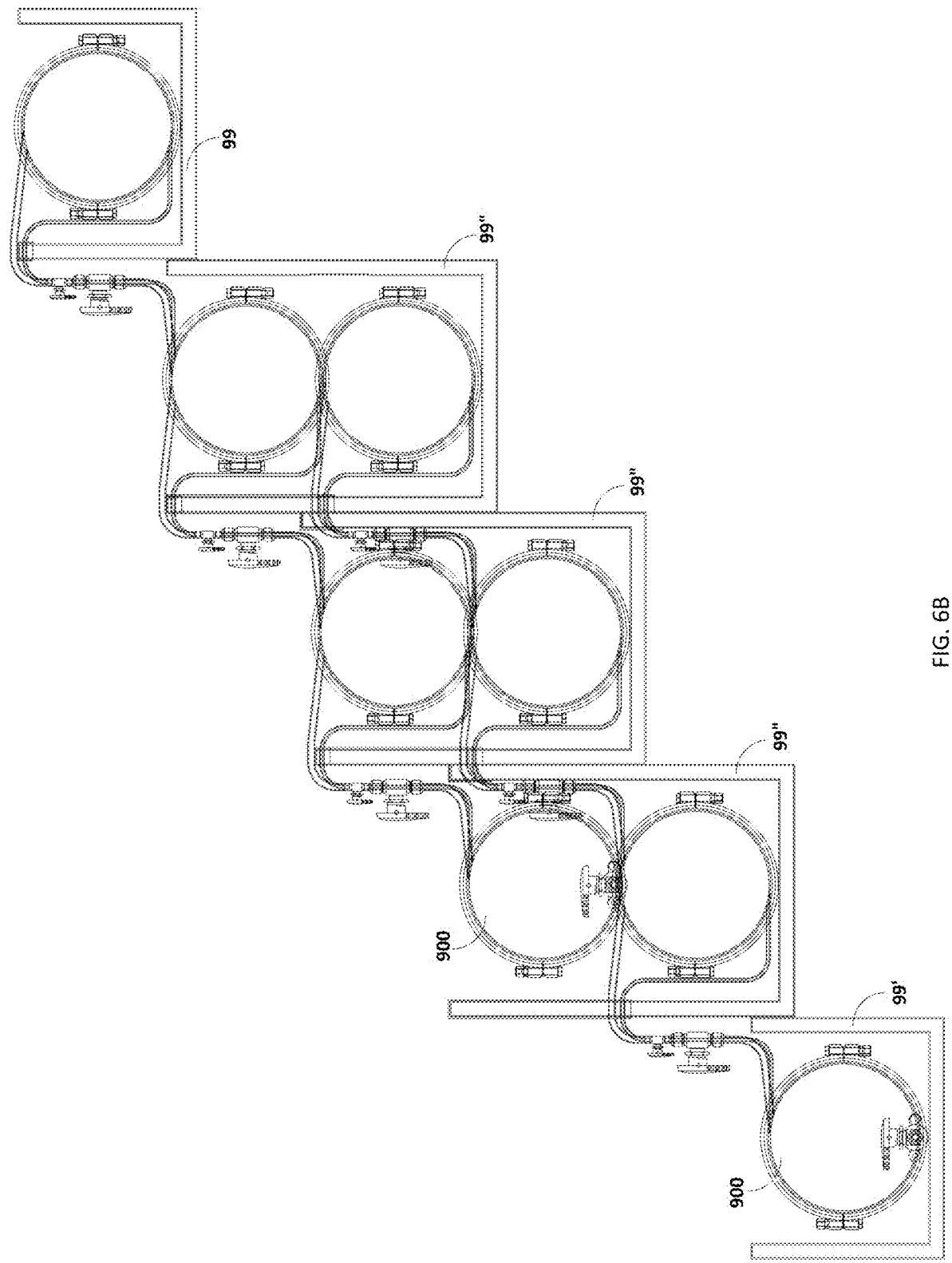
FIG. 6B shows and end view of a coupled extractor, according to an embodiment, for coupling of heat transfer between pairs of extracting chamber/solution receiver tubes (91/93) of the two multiple closed couplable extractors 900.

FIG. 6B illustrates an embodiment, where a coupled extractor is formed from two, as shown, or more multiple closed couplable extractors 900. Alternating tubes can be filled with solution that are stacked or otherwise coupled, for example end to end or side to side with modified connectivity of transfer tubes. The base tube of a lower closed couplable extractor 900 resides in a warmest bath (99') where vapor transfer to its adjacent higher tube and the highest tube in the higher closed couplable extractor 900 is in the coolest bath (99) of the coupled system while coupling baths (99''') promote heat transfer between successive pairs of tubes of the coupling baths 99". In this manner, the heat from the lowest tube in the lowest multiple closed couplable extractor 900 is step-wise transferred through the coupled baths to the highest tube of the highest closed couplable extractor 900, requiring that any significant input of heating and cooling occurs in only two baths of the system, regardless of how many closed couplable extractors 900 are included in the extraction system.

Figure 7A:
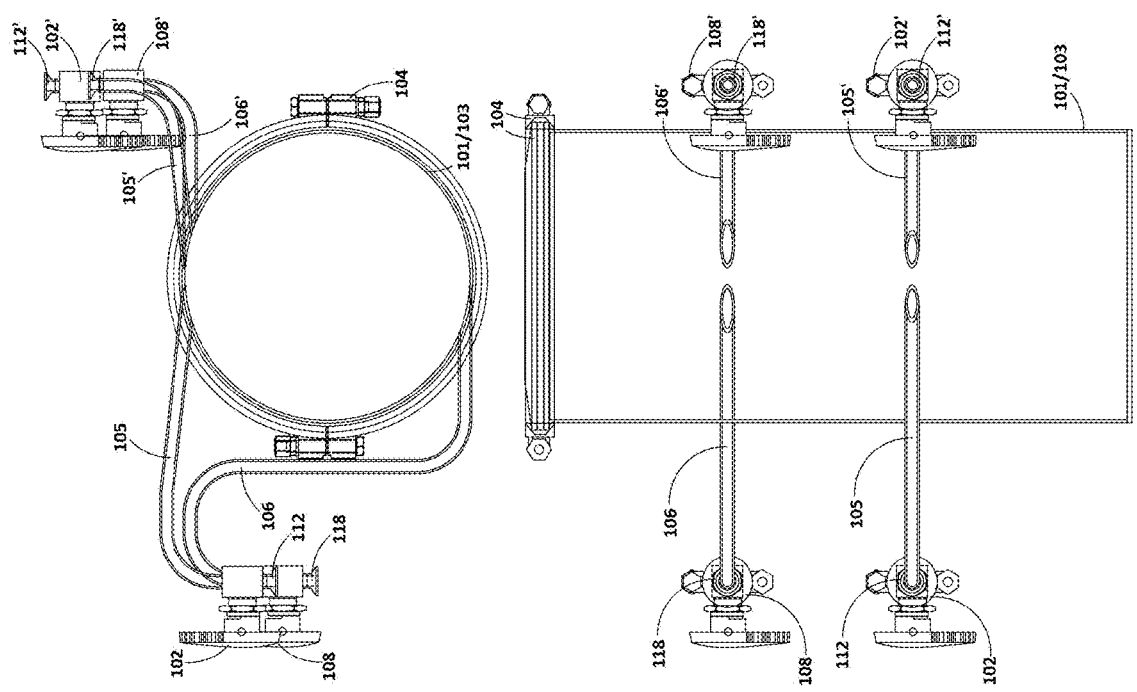
FIG. 7A shows and view and a top view of a connectable extracting chamber/solution receiver tube (101/103), according to an embodiment, with descending and ascending vapor transfer tubes (105, 105') with isolation valves (102, 102') and with descending and ascending solution transfer tubes (106, 106') with isolation valves (108, 108').

In an embodiment, a closed couplable extractor shown in an end and top view, is constructed from a plurality of connectable extracting chamber/solution receiver tubes (101/103), as shown in FIG. 7A, each having: a descending vapor transfer tube (105) with an isolation valve (102) and connector port (112); an ascending vapor transfer tube (105') with an isolation valve (102') and connector port (112'); a descending solution transfer tube (106) with an isolation valve (108) and connector port (118); and an ascending solution transfer tube (106') with an isolation valve (108') and connector port (118'). Each extracting chamber/solution receiver tube 101/103 includes a cap and sealing cap and clamp (104) to permit plant matter loading and unloaded before and after use of the closed couplable extractor to generate an extract.

Figure 7B:
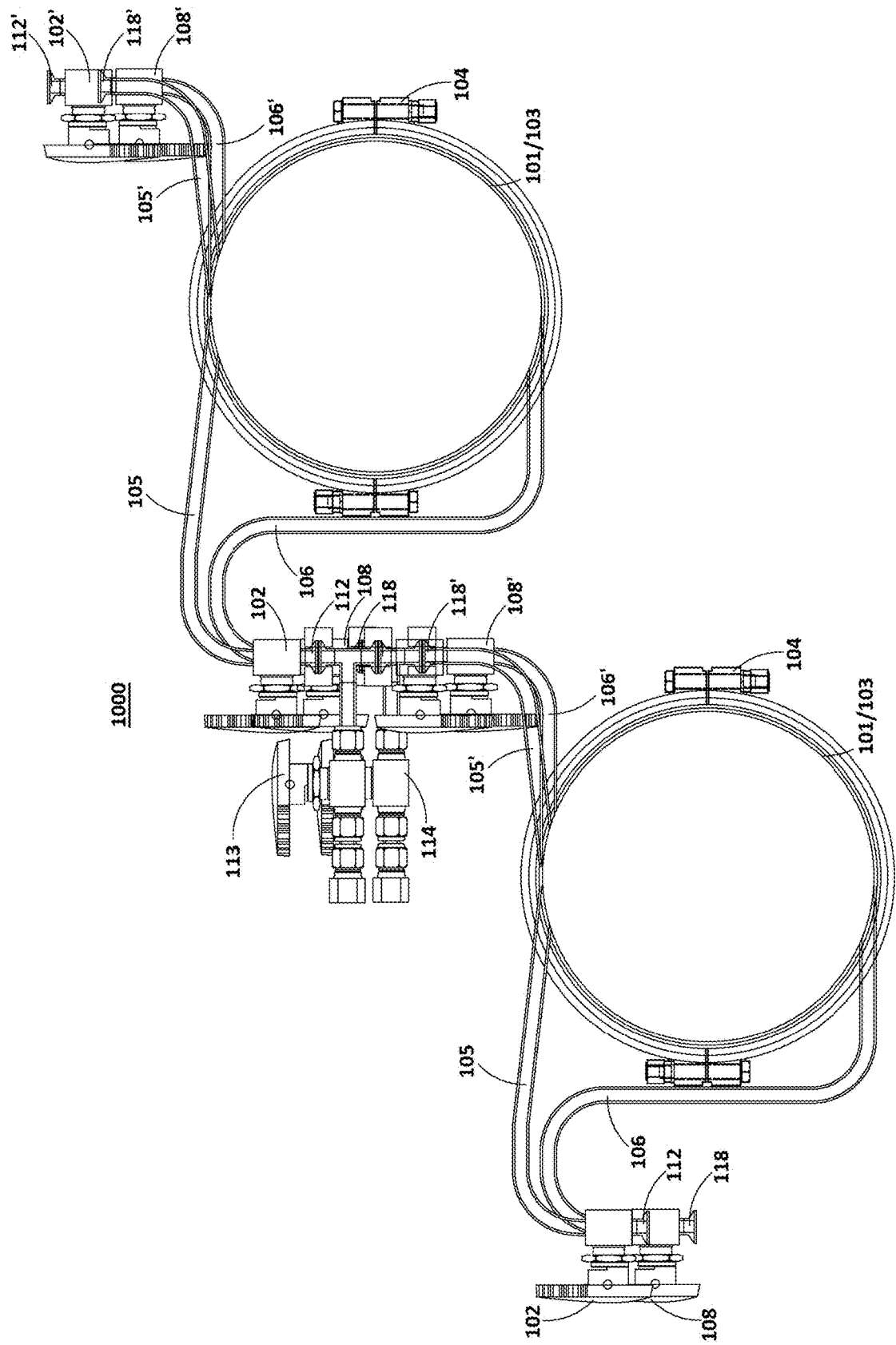
FIG. 7B shows an end view of closed couplable extractor (1000), according to an embodiment, constructed from a pair of couplable extracting chamber/solution receiver tubes 101/103 that are connected via connectors (113 and 114).

As shown in FIG. 7B, in an embodiment, connecting the extracting chamber/solution receiver tubes 101/103 of FIG. 7A, via a vapor connector (113) and a solution connector (114) results in closed couplable extractor 1000 where the tubes 101/103 reside in an ascending manner to allow a solution siphon through the solution connector 114 and solvent vapor distillation through the vapor connector 113 when the valves are appropriately aligned. Connectors 113 and 114 include two sealing portions with couplable ports and clamps, exemplary illustrated as connected using a T-tube to a ball valve, though other types of connectors or other types of valves can be used. These connectors 113 and 114 allow the connection of the extracting chamber/solution receiver tubes 101/103, where, with their isolation valves 102, 102', 108, and 108' closed, evacuation of the connectors 113 and 114 through the open connector's valve to removed are from the connected volume. Upon closing the connector's valves and opening the isolation valves 102, 102', 108, and 108' extraction can be carried out. Although shown with two extracting chamber/solution receiver tubes 101/103, three or more tubes can be used.

Figure 7C:
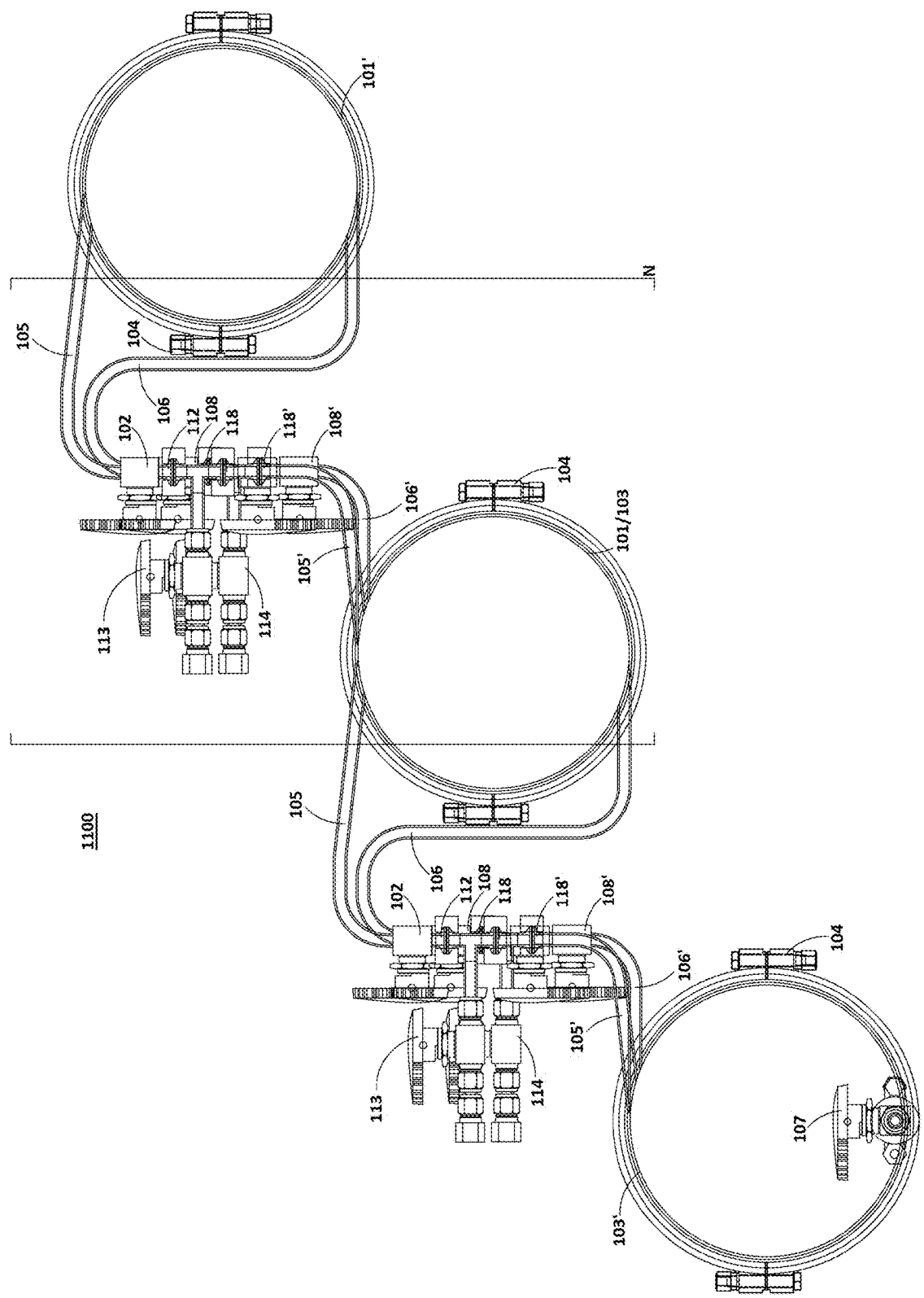
FIG. 7C shows an end view of a multiple closed couplable extractor (1100), according to an embodiment, constructed from N couplable extracting chamber/solution receiver tubes 101/103 with a low solution receiver tube (103') and a high extracting chamber (101').

In an embodiment, the connectable extracting chamber/solution receiver tubes 101/103 of FIG. 7A can be modified by removing of transfer tubes to form a connectable extracting chamber tube (101') and to form a connectable solution receiver tube 103', which can be connected at the ends of a series of tubes to yield a multiple closed couplable extractor 1100, as shown in FIG. 7C. With this connectivity, a top extracting chamber tube 101' and a base solution receiver tube 103' can be used with or without inclusion of plant matter where solution receiver 103' is shown with an optional valve (107) for removal of extract solution without reorientation of the multiple closed couplable extractor 1100 or a separated solution receiver tube 103'. The number, N, of extracting chamber/solution receiver tubes 101/103 of 1000 components, can range from 0 to 20 or more tubes depending upon the amount of extract per plant matter to be included relative to the capacity of the chamber/solution receiver tubes 101/103 and the dimensions of the site where a multiple closed couplable extractor is employed.

As illustrated in FIG. 7C, the connectors 113 and 114, must be evacuated before opening of the isolation valves 102, 102', 108, and 108' and, if the solvent is to be fully preserved, after closure of these isolation valves, connectors must be connected to a solvent trap before the extracting chamber/solution receiver tubes 101/103, 101', and/or 103' can be disconnected when the disassembly before final solvent vapor removal is desired. To avoid these additional steps required during connection or disconnection, isolation valves that can be sealed with very little if any infusion of air or loss of solvent can be employed with no need for connectors 113 and 114. The substituted valves can be quick connect couplers, as commercially available. These couplers are two complementary valves, male and female, that rely on poppet valves for their on-off mechanism where coupling or decoupling. These valves are open when connected and closed when disconnected with no capability of attenuating the fluid flow. These quick-disconnedt valves contain fluid exposed springs and O-rings and/or gaskets. These quick connectors are generally difficult to clean, can be adversely affected by solvent, and can be easily fouled with solid particulates, which may be carried by the solution. Although filters can be employed to reduce quick connector fouling by particles, any effect by solvent swelling are not avoided. Catastrophic affects by solvent and particles can be partially alleviated by using a backing valve, such as, but not necessarily, a ball valve, that is significantly less sensitive to solvent and particles, but the inclusion of air and loss of solvent within the volume between the ball valve and quick-disconnect face occurs during connection and disconnection.

Figure 8A:
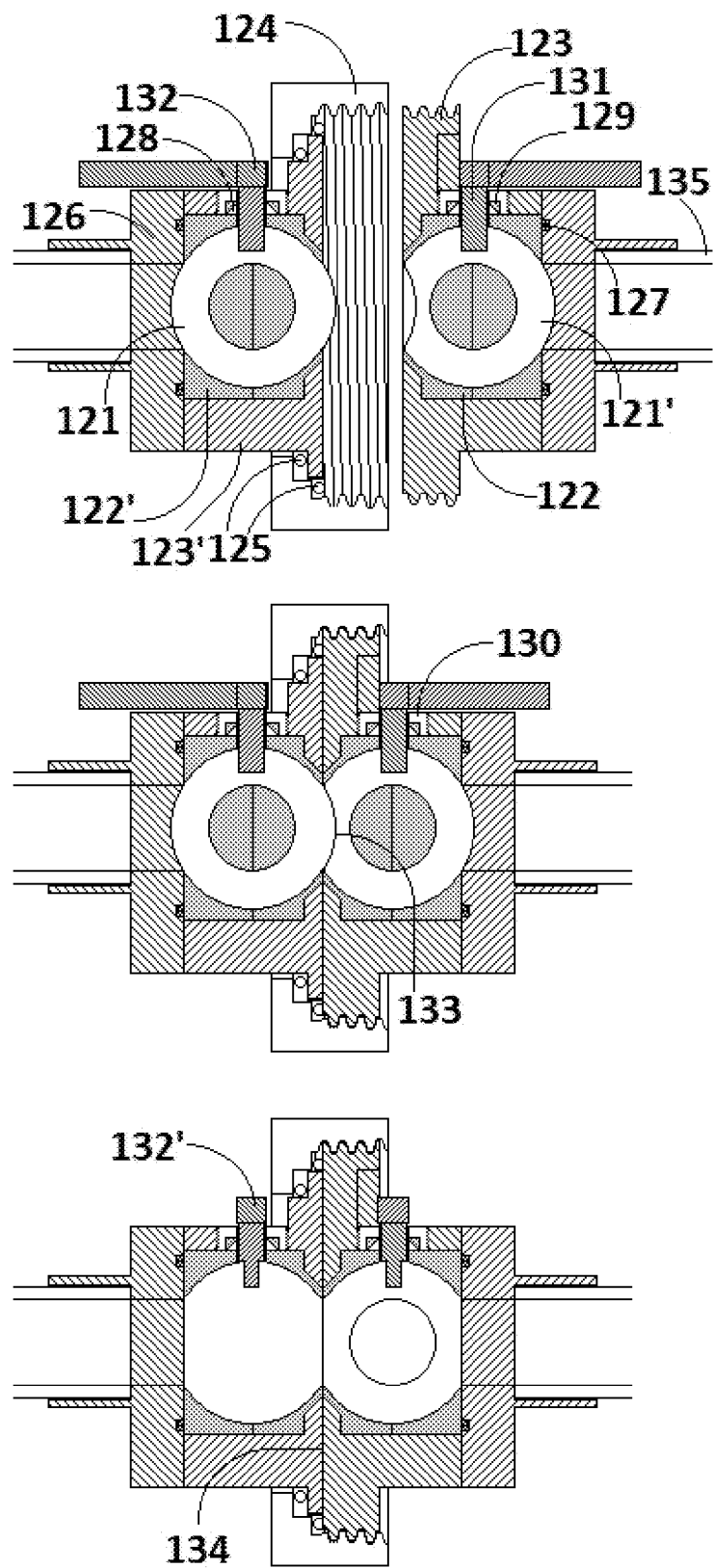
FIG. 8A shows cross-sections of top (left) and side (right) views of connectable ball valves (1200), according to an embodiment, in a disconnected state (top), a connected closed state (mid), and a connected open state (bottom), which allows control of flow transfer and allows connection and disconnection of extractor components without infusion of air or loss of solvent vapor.

Alternatively, according to an embodiment, a connection without residual air incursion and disconnection without solvent loss can be carried out by employing a pair of connectable valves that have a connectable surface without the use of poppet valves or requirement of elastomers within the fluid flow path. In an embodiment, the connection can be via connectable ball valves. FIG. 8A shows connectable ball valves (1200) in their unconnected, connected closed, and connected open states. These valves share common components except that one has a male ball (121) and the other has is a female ball (121') and one has a face housing with a threaded end (123) and the other employing a threaded collar (124) on a face housing (123') to connect, seal, and disconnect the connectable ball valves 1200 where upon connection effectively no air is included. The balls can be stainless steel or of a plastic or resin that are resistant to all solvents and extracts, such as Teflon®, ultrahigh density polyethylene (UHDPE), polypropylene, or any other appropriate metal, plastic, resin, glass, or ceramic. The balls can be the same or different in composition than the valve housing front and back portions 123, 123', and (126). The balls reside within a face surface front sealing gasket (122) that is complementary to a back sealing gasket (122'). These gaskets are shown to completely encase the ball with the exception of stem (131) which is also sealed by the face sealing and back sealing gaskets 122 and 122'. Additionally, the stem 131 is shown to be sealed by a pair of compression seals 128 and 129 that are compressed by a threaded collar 130. Alternatively, to that illustrated, the inlet tube (135) can address the ball perpendicular to the front sealing face on one or both of the connectable ball valves.

The female ball valve 121' has a face perpendicular to the fluid channel that is machined or molded to have a spherical dimple that closely accepts the spherical surface perpendicular to the flow channel of the male ball 121. The male ball 121 and the dimpled female ball 121' have surfaces that are matched to oblige intimately contact (133), as do opposing surfaces of the sealing gaskets 122 and the valve's front housing's 123 and 123' that contact when connected and sealed. The non-ball contacting surfaces, are shown as flat although any otherwise complementary surfaces are possible and non-flat features can be advantageous for alignment. When these facing surfaces are in intimate contact, air is absent when sealed, for example, as shown by sealing threaded housing 123 with threaded collar 124 with a pair of O-rings (125), or gaskets, that compress against the flat connecting surfaces of the front housing 123 such that effectively no air resides between the internal surfaces of coupled ball valves 1200 when fixed by the collar 124. Flat surfaces of the front bodies 123 and 123' are convenient, though not necessary, to allow any relative rotational orientation of the two coupled ball valves 1200.

Handles (132) for actuation of the valves are shown aligned parallel to the closed couplable extractor's transfer tubes (135) that are sealed to the back housing 126 by welding or mechanical modes. The back housing 126 can contact back sealing gasket 122' and a seal can be assured with an optional back sealing O-ring (127), where well-matched surfaces between the back housing 126 and back sealing gasket 122' assures that the O-ring should have no exposure to solvent or solution. As illustrated, the parallel orientation of the handles 132 allows the transfer of the collar 124 over the handles to make the seal of the closed coupled ball valves 1200. In this embodiment, the male ball 121 must be rotated to the opened position prior to the opening of the female ball 121', with the inverse order of rotation required for closing. In the open orientation, the handles 132 is perpendicular to the flow path and inhibits unintentional loosening of the collar 124. The orientation of balls 121 and 121' allows the flow to be adjusted to a significant degree.

Figure 8B:
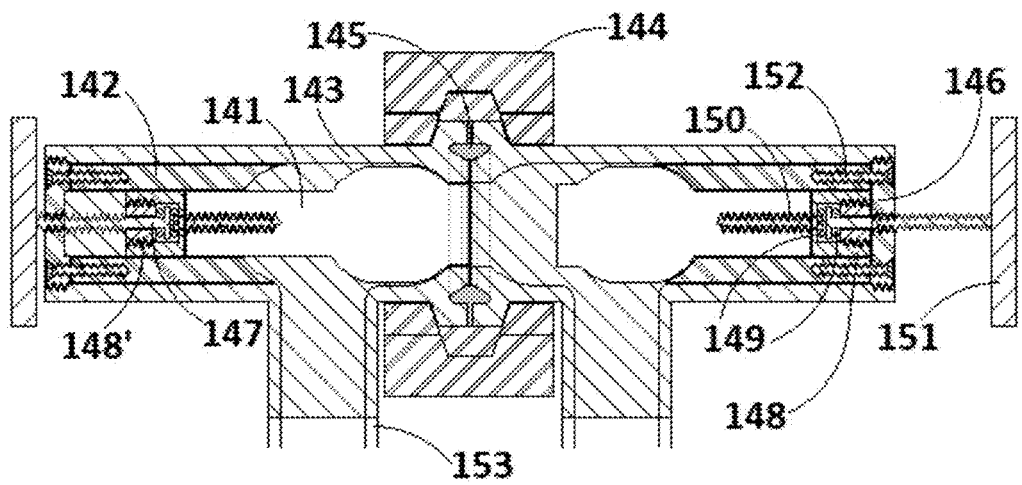
FIG. 8B shows a cross-section of two connectable needle valves (1400), according to an embodiment, connected via a clamp (144).

In another embodiment, the coupled valves are coupled needle valves (1400), as shown in FIG. 8B, where two identical needle valves, one shown in an open state and the other in a closed state, are coupled via a tri-clamp (144) and gasket (145), such as a Teflon® covered elastomer, although other elastomers or plastics can be substituted. The valve's housings (143) make intimate contact at their faces as do the blunt needles (141) that seal along with the front face of the housings 143 when both are in the closed state. The needle bodies 141, as illustrated, are connected to a screw actuator (147) via a screw (150) through a back plate (146) into a rotation decoupling housing (148) through a rotation decoupling housing seal (148'), where ball bearings (149) allow rotation of screw actuator 147 by handle (151) to open and close non-rotating needle 141 within a directing sheath (142). The closed couplable extractor's vapor transfer tubes or solution transfer tubes (153) attached via welds or mechanical means to the coupled needle valves 1400. The needle 141 and directing sheath 142 individually can be stainless steel, other metal, Teflon®, FEP, UHMPE, polypropylene, nylon, or any other plastic or resin that can seal upon contacting the internal front face of the housing 143, but do not adhere with an intimately contacting needle 141. The materials of the needles 141 and directing sheaths 142 can be selected to be different materials that avoids cohesion as well as adhesion. Although one branch for connection to a transfer tube 153 is shown, two, three, or more transfer tubes can be connected or off a single connection the transfer tube can be branched one or more times.

Figure 8C:
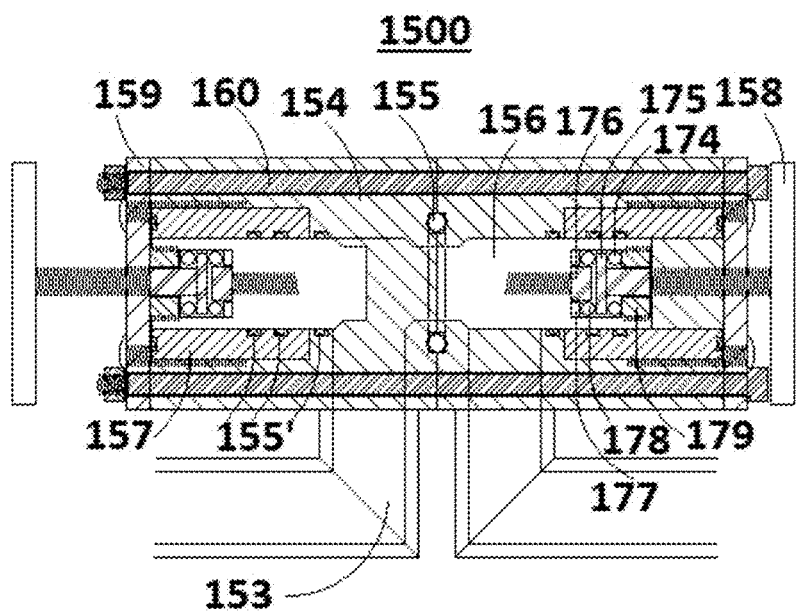
FIG. 8C shows a cross-section of two connectable needle valves (1400), according to an embodiment, connected via bolts (160).

As shown in FIG. 8C, the transfer tubes 153 of the coupled needle valves (1500) can be connected at various angles to the sealing front face or, with a bend or connectivity to allow the orientation of the transfer tubes at any angle relative to the needle (156), where the transfer tubes 153 are shown at 180° to each other. In FIG. 8C the housings (154) of the connected needle valves 1500 seal by the tightening of bolts and nuts (160), which also reinforces the sealing of the back screw 180 attached back plate (159) through which the handle (158) actuates the needle 156, which is rotationally decoupled using front ball bearings (178) around an aligning screw head (176) on a bearing seating plate (177), which protects the needle 156 surface, with a rotating front head of the actuating screw shaft (175) with back ball bearings (174) decoupling movement of the actuating screw shaft 175 with respect to a rotation decoupling housing seal (179) that has complementary treading to the back end of the needle 156. The needle translates without rotation through directing sheath (157) where sealing includes O-rings (155') are included.

Figure 8D:
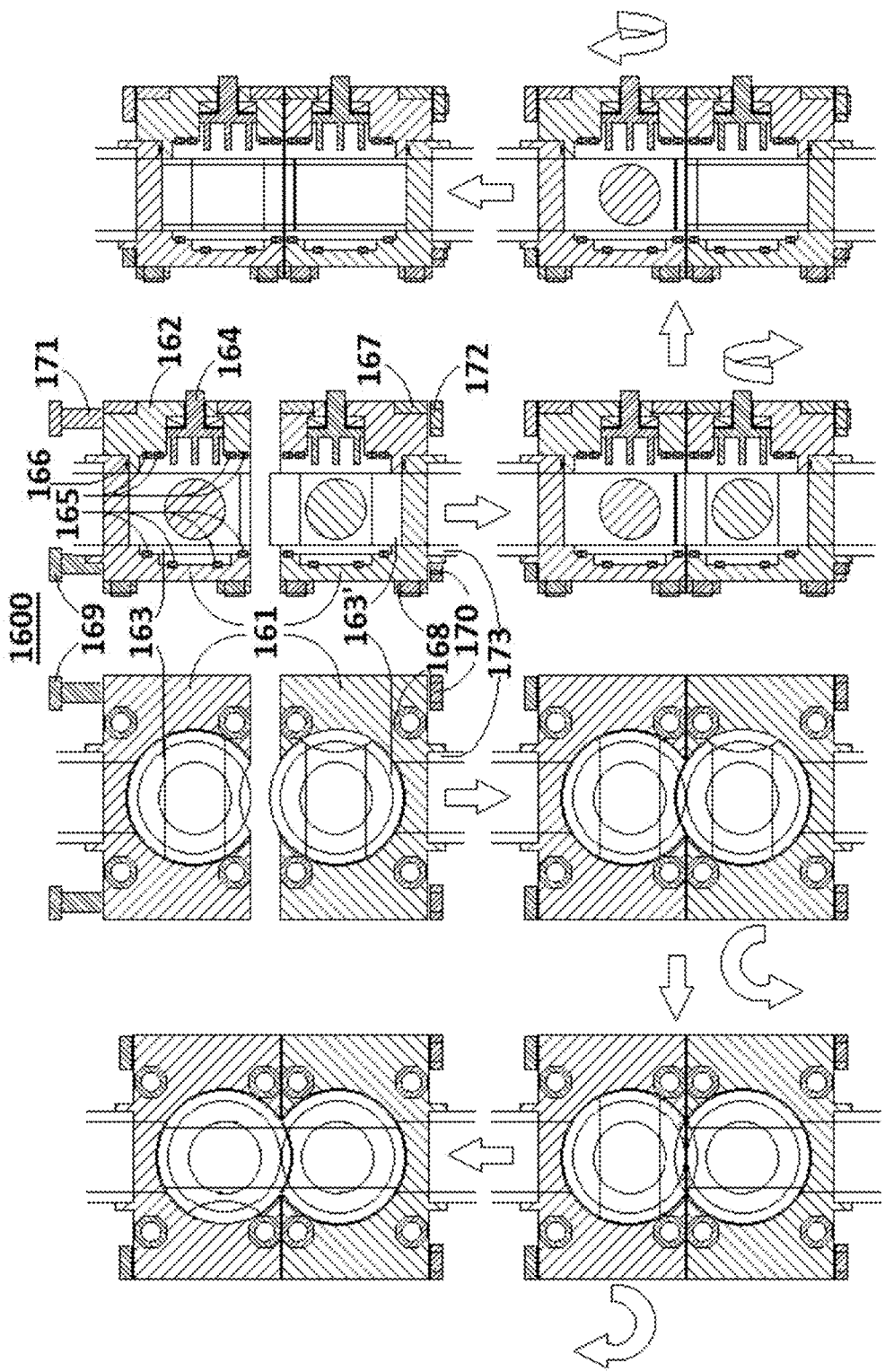
FIG. 8D shows cross-sections of top (left) and side (right) views and a flow pattern for connectable plug valves (1600), according to an embodiment, where unconnected valves (top interior) are connected to a closed state (bottom interior), half open state (bottom outer), and open state (top outer) by rotation of the valves' stems (164).

Another embodiment is shown in FIG. 8D, where top (left) and side (right) views indicate an uncoupled, coupled close, coupled half open, and coupled open states of connectable plug valves (1600). The cylindrical plugs (163 and 163') are formed to have a plurality of cylindrical sections with different diameters. A central cylindrical section of the plug 163 has a height of the flow channel, which is illustrated to be, but is not necessarily, the internal diameter of the transfer tubes (173). On one face of the central cylindrical section of the plug 163/163', an arc is defined by a cord to the central cylindrical section's base that is a tangent of one or more cylindrical sections of lesser diameter than the central cylindrical section of the plug 163/163', the central cylindrical section is machined, molded, or otherwise formed to invert the arc across the cord. To connect coupled plug valves 1600, a first plug 163 has the inverted arc residing in a fluid flow face and a complementary second plug 163' has the inverted arc on a face perpendicular to the fluid flow channel through the plug 163'. As illustrated in FIG. 9C, the smaller cylindrical sections residing on both sides of the central cylindrical section, whose tangent is the cord of the central cylindrical section. These adjacent cylindrical sections force the alignment and stability of the plug 163/163' within the top housing (162) and base housing (161). As illustrated, a third connected cylindrical section is distal to the central cylindrical section and extends into the top housing 162 for connection to a stem (164) for actuation of rotating the plug 163/163'. The stem can be attached to a handle (not shown) to actuate manually the plug valve 1600. A fourth cylindrical section extending into the base housing 161 is optional, but can aid in stabilization and alignment of the plug 163/163' where this fourth section can have the same or different diameter as the third cylindrical section. These non-central cylindrical portions of the plugs 163/163' can optionally include sealing O-rings (165) to assure sealing. The base housing 161 and top housing and the plugs 163/163' can be formed with features or can be matched to the plugs 163/163' with sufficient tolerance to seal absent the O-rings. Alternatively, the adjacent cylindrical sections can be in the shape of cones or any portion of a hemisphere rather than cylinders. The base housing 161 and top housing 163 are compressed to seal using bolts (167) and nuts (168), although other modes of applying the force can be employed. The plugs 163/163' and the base and top housings 161 and 162 can be stainless steel, Teflon®, UHDPE, polypropylene, or any other metal, plastic, glass, or ceramic that is compatible with the fluids employed and capable of containing pressures imposed by the systems in which coupled plug valves 1600 are employed. Different material can be used to inhibit cohesion or adhesion between the components of the valve while actuating.

In FIG. 8D unconnected plug valves 1600 are shown, top view (left) and side view (right) in the top central figures that are connected with a closed orientation in the figures (central bottom) where the inverted arc of plug 163 is filled by an arc of the central cylindrical portion of 163'. As illustrated, though other mechanism can be employed, bolt and nut pairs (169/170) and (171/172) make and maintain coupled valves. Rotation from the closed orientation (bottom outer) places plug 163' available for fluid flow, and ultimately rotation of plug 163 opens (top outer) the coupled plug valves 1600 in position for flow. Alternatively, the inlet tube can address the plug perpendicular to the front sealing face on one or both of the connectable plug valves.

Figure 9A:
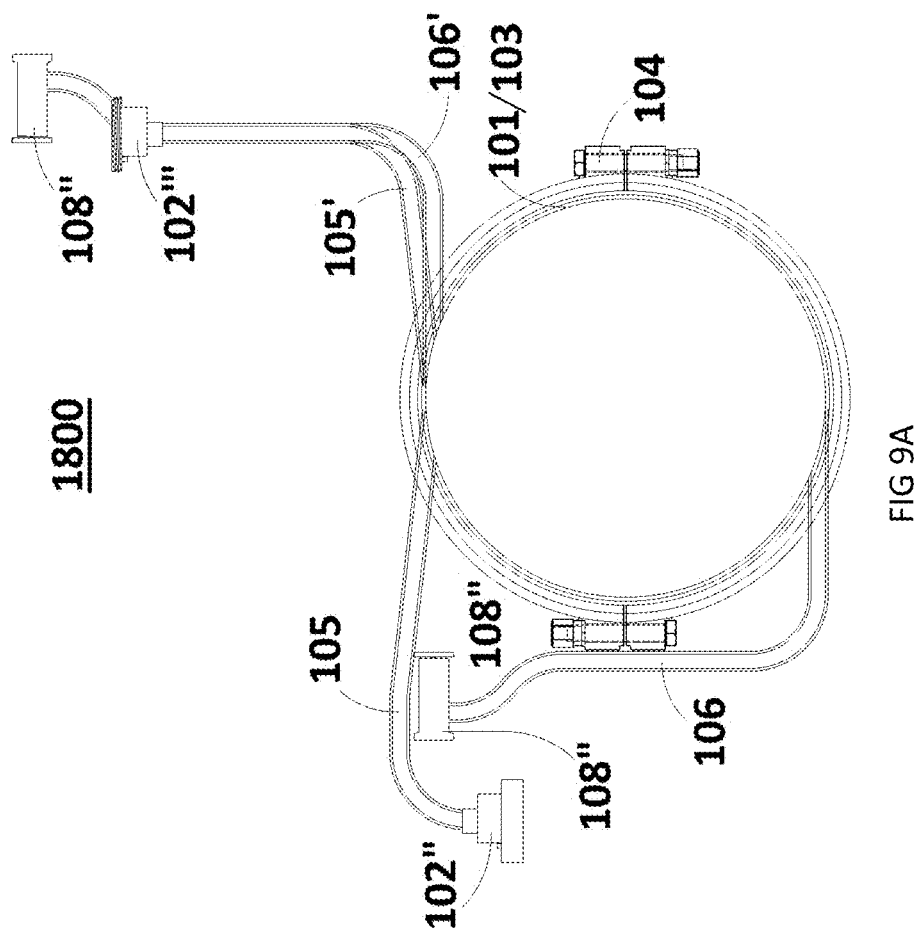
FIG. 9A shows an end view of a connectable extracting chamber/solution receiver tube (1800), according to an embodiment, with descending and ascending vapor transfer tubes (105, 105') with isolating connectable ball valves (102", 102''') and with descending and ascending solution transfer tubes (106, 106') with isolating connectable needle valves (108").

In an embodiment, FIG. 9A shows a functional equivalent to the extracting chamber/solution receiver tube 101/103 construction of FIG. 7A, where a connectable extractor tube 1800 has an extracting chamber/solution receiver tube 101/103 connected through: a descending vapor transfer tube 105 to an isolation connectable valve 102" having the structure of connectable ball valves 1200, as shown in FIG. 8A; an ascending vapor transfer tube 105' with an isolation valve 102''' having the structure of connectable ball valves 1200 as shown in FIG. 8A; a descending solution transfer tube 106 with an isolation valve 108" having the structure of connectable needle valves 1400, as shown in FIG. 8B; and an ascending solution transfer tube 106' with an isolation valve 108" having the structure of connectable needle valves 1400. As illustrated, the ascending solution transfer tube 106' and ascending vapor transfer tube 105' are sufficiently long such that the entrance to the top of a connectable extractor tube 1800 functioning as a solution receiver tube 101/103 is not immediately below the exit from a connectable extractor tube 1800 functioning as an extracting chamber tube 101/103, although other lengths of solution transfer tubes 106 are possible.

Figure 9B:
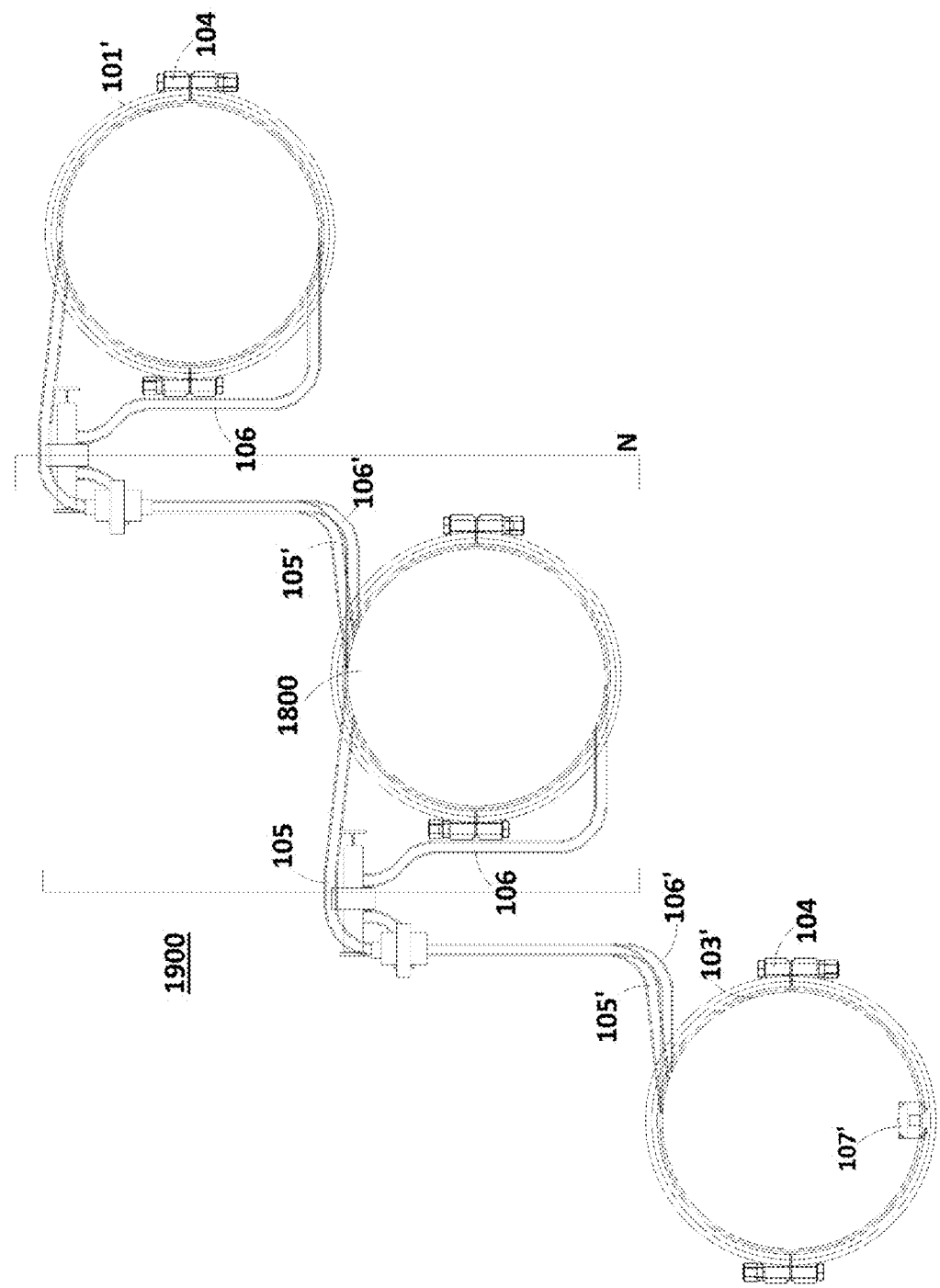
FIG. 9B shows an end view of a multiple closed couplable extractor (1900), according to an embodiment, constructed from N connectable extracting chamber/solution receiver tubes (1800), as shown in FIG. 9A, with a low solution receiver tube (103') and a high extracting chamber (101').
Figure 9C:
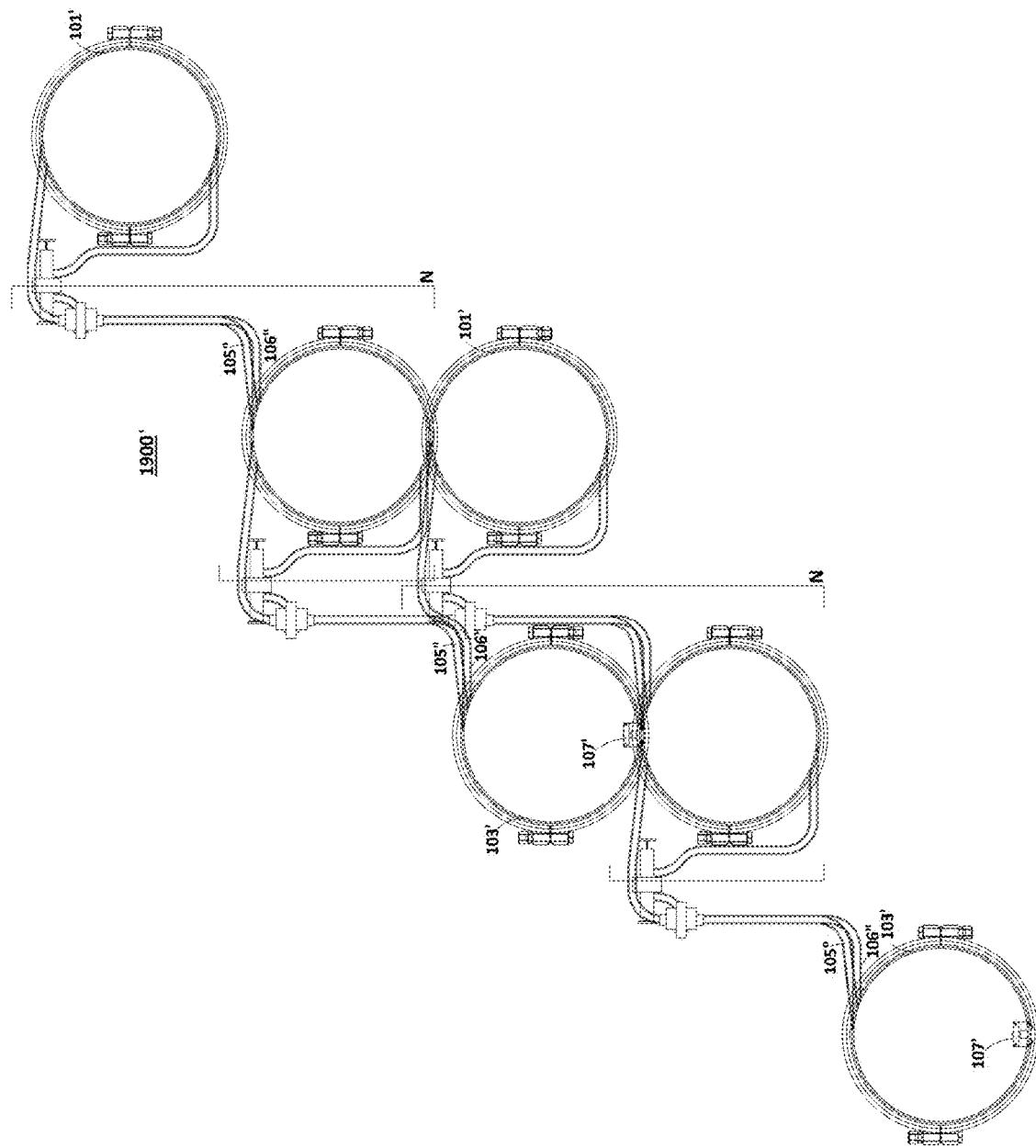
FIG. 9C shows an end view of a coupled extractor (1900') including multiple closed couplable extractors 1900, as shown in FIG. 9B, according to an embodiment.

In an embodiment, employing these connectable extractor tubes 1800, multiple closed couplable extractor 1900, as shown in FIG. 9B, can be constructed in an equivalent manner to that shown in FIG. 7C, with connectable equivalents extracting chamber tube 101' and solution receiver tube 103', which is shown with an optional valve (107'), illustrated as a portion of couplable plug valve 1600. Valve 107' allowing connection and subsequently transfer of solution to a solvent reservoir/extract recovery vessel (not shown) with distillation of solvent from a solvent reservoir/extract isolator to multiple closed couplable extractor 1900 for washing of residual extract from a multiple extractor. Additionally, any or all of the extracting chamber/solution receiver tubes 101/103 can have an optional valve 107' for removal of extract solution from the multiple extractor 1900 at any tube without any disassembly of the multiple extractor 1900. The rate of solution siphon from a higher extracting chamber/solution receiver 101/103 or extracting chamber 101' into a lower extracting chamber/solution receiver 101/103 or solution receiver 103' depends on the relative heights of these tubes and the diameter of the solution transfer tubes 106 and 106'. The degree of opening of the isolation valves 108" can be used to control the rate of solution flow during transfer as desired throughout the transfer, which can be augmented using isolation valves 102"/102". In one mode of extracting, according to an embodiment, solvent can be introduced into in the upper extracting chamber tube 101' of the multiple extractor 1900 and successively solution can be transferred into the lower extracting chamber/solvent receiver tubes 101/103 and/or solvent receiver tube 103'.

Multiple extractor 1900 can be employed for an extraction, in one embodiment, by having solvent to fill one of the extraction chamber/solution receiver tubes 101/103 such that pairs of these tubes can be sequentially extracted and solution extract concentrated from the highest extraction chamber 101' to the lowest solution receiver 103'. Alternatively, in an embodiment, multiple extractors 1900 can have extraction chambers 101' filled with plant matter and solvent where the top couplable valves 108" is closed until extraction has achieved complete extraction between plant absorbed extract and soluble extract. The couplable valves 108" are then opened such that solution drains to the lower solution receiver tubes 101/103 with one or both of its lower couplable valves 108" closed such that extraction is achieved in that extracting chamber/solution receiver tubes 101/103. Subsequent transfer to each lower extracting chamber/solution receiver tubes 101/103 and extraction therein ultimately results in an extraction solution with extract from all coupled extracting chamber/solution receiver tubes 101/103, extraction chamber tube 101' and solution receiver tube 103' residing in the solution receiver tube 103'. As needed to achieve additional extraction or washing of residual extract from the extraction chamber tube 101' and extraction chamber/solution receiver tubes 101/103, the solution receiver tube 103' can be heated and the solvent distilled to the cooled extraction chamber 101' such that, in like manner, an addition series of descending extractions or washings is sequentially carried out.

As shown in FIG. 9C a couped extractor formed by stacking a pair of multiple closed couplable extractor 1900' formed by connecting a multiplicity of connectable extractors 1900, in a mode similar to that shown in FIG. 6B. In this mode, when N is an even number, pairs of stacked proximal coupled tubes reside in a common bath or are otherwise equipped for heat transfer between the tubes with tubes of greater elevation at lower temperature, extraction chamber tube 101' can be cooled to a minimum temperature and solution receiver tube 103' heated to a maximum temperature. Connected valve 108" are open or closed such that pairs of liquid containing solution receivers 103/103' and extracting chambers tubes 101/101' are isolated through the connected valves 108" such that extractions can be carried out in pairs simultaneously with the only significant driving force being the heating of the solution receiver tube 103' and cooling of extraction chamber tube 101'. Ultimately, extract solution can be drained and washed from the multiple extractor 1900' at the lowest solution receivers 103' through valves 107', shown as one portion of the connectable plug valves 1600.

Figure 9D:
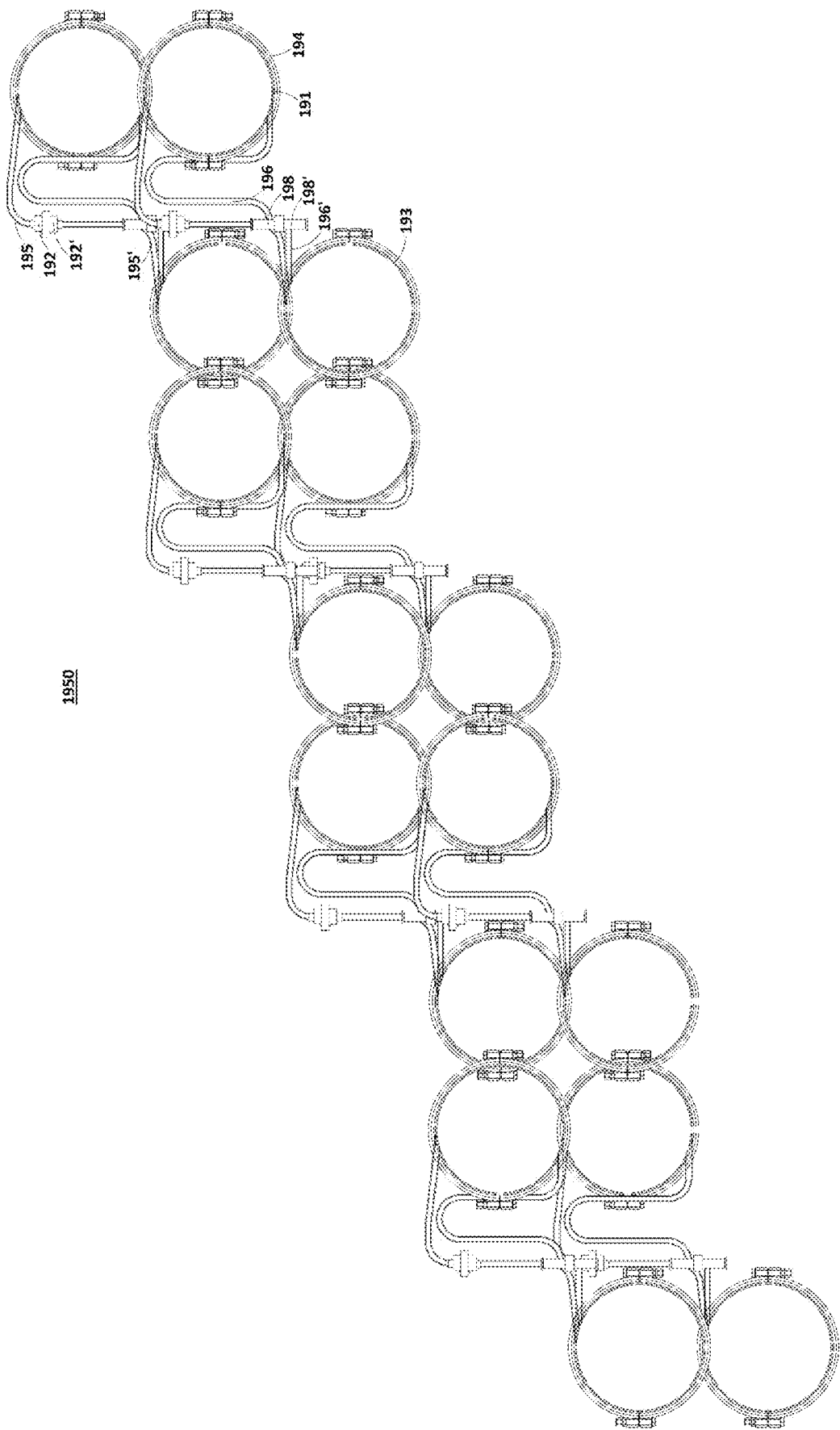
FIG. 9D shows coupled extractor (1950) where eight closed coupled extractors as in FIG. 9B where N=0, according to an embodiment, for vapor transfer between two low solution receivers (193) and two high extracting chambers (191) where heat transfer occurs between clusters of two solution receivers 193 and two extracting chambers 191 with side-to-side proximal contacting.

As shown in FIG. 9D coupled extractor (1950) is formed by coupling eight extractors. In this mode, the proximally contacting extracting chambers (191) and solution receivers (193) are situated right to left but can be associated in any manner that allows the proximal contacting, in this embodiment the tubes are touching although a bath (not shown) or other means can be employed to transfer heat over all tubes therein over a short distance of only a couple inches or less, but optimally directly contacting to have the greatest rate of heat transfer. Heat transfer can be over greater distance, although this requires more equipment that add cost and complexity to the coupled extractor. All solution receiver tubes 193, in addition to the extracting chamber tubes 191, can contain plant matter if desired, where the tubes can be filled by removing sealing caps and clamps (194). Solution is individually transferred from a cooler higher pair of extraction chamber tubes 191 through solution transfer conduits (196/196') with connectable valves (198/198'), illustrated as needle valves of 1400, to a warmer lower pair of solution receiver tubes 193 where the solvent is returned to the extraction chamber tubes 191 through vapor transfer conduits (195/195') containing connectable valves (192/192'), illustrated as ball valves of 1200. Any of the connectable valves 192, 192', 198, and/or 198' can be used to evacuate, load solvent, unload solvent or extract solution, and/or unload extract. Optionally, one or more pairs of the connectable valves, either 192/192' or 198/198' can be absent.

Figure 10A:
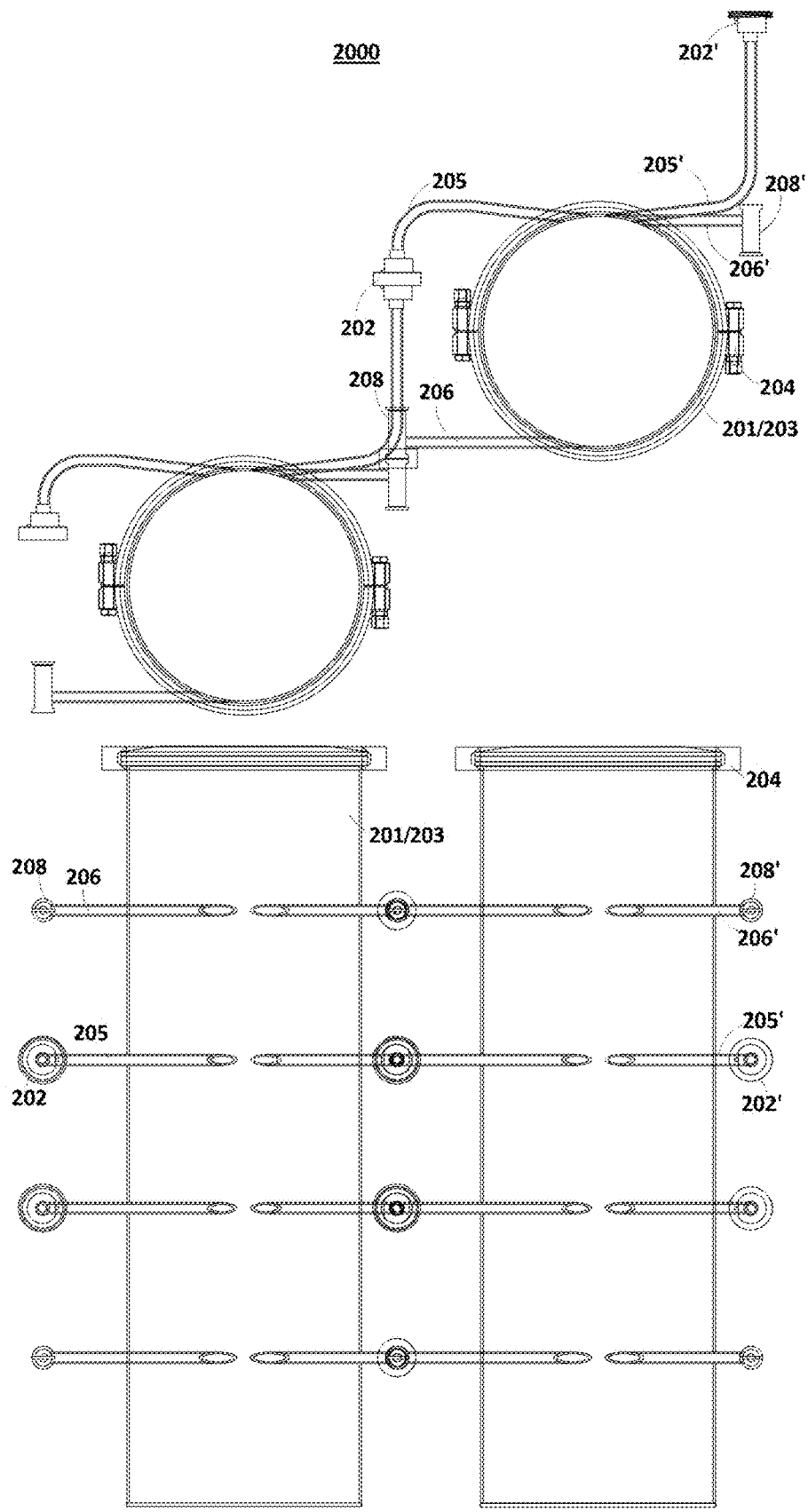
FIG. 10A shows an end view (top) and a top view (bottom) of a closed couplable extractor (2000), according to an embodiment, where two identical extracting chamber/solution receiver tubes (201/203) are combined to form the extractor where the draining of solution is controlled by the state of connectable ball valves (202/202') and connectable needle valves (208/208').

In an embodiment, FIG. 10A shows end and top views of a closed couplable extractor 2000 constructed from two extracting chamber/solution receiver tubes (201/203) connected through: a descending vapor transfer tube (205) to an isolation connectable valve (202) having the structure of connectable ball valves 1200 as shown in FIG. 8A; an ascending vapor transfer tube (205') with an isolation valve (202') having the structure of connectable ball valves 1200; a descending solution transfer tube (206) with an isolation connectable needle valve (208) having the structure of connectable needle valves 1400 as shown in FIG. 8B; and an ascending solution transfer tube (206') with an isolation needle valve (208'). The ascending vapor transfer tube 205' are sufficiently long such that the solution entrance to the top of the extracting chamber/solution receiver tube 201/203 is not immediately below the exit from the higher coupled extracting chamber 201/203 such that the descending solution transfer tubes 206 accommodates the deviation from linearity imposed by the connectable needle valves 208 and 208' in the orientation illustrated. The solution transfer tubes 206 and 206' are straight and nearly tangential to the extracting chamber/solution receiver tubes 201/203 as shown, although a downward slope can be employed to the extracting chamber/solution receiver tube 201/203 employed as a solution receiver tube. These components formed closed couplable extractor 2000 can be connected where sequential extractions can be controlled by the off/on positions of the connectable needle valves 208 and 208'. The extracting chamber/solution receiver tubes 201/203 are filled and emptied by removing sealing caps and clamps (204).

Figure 10B:
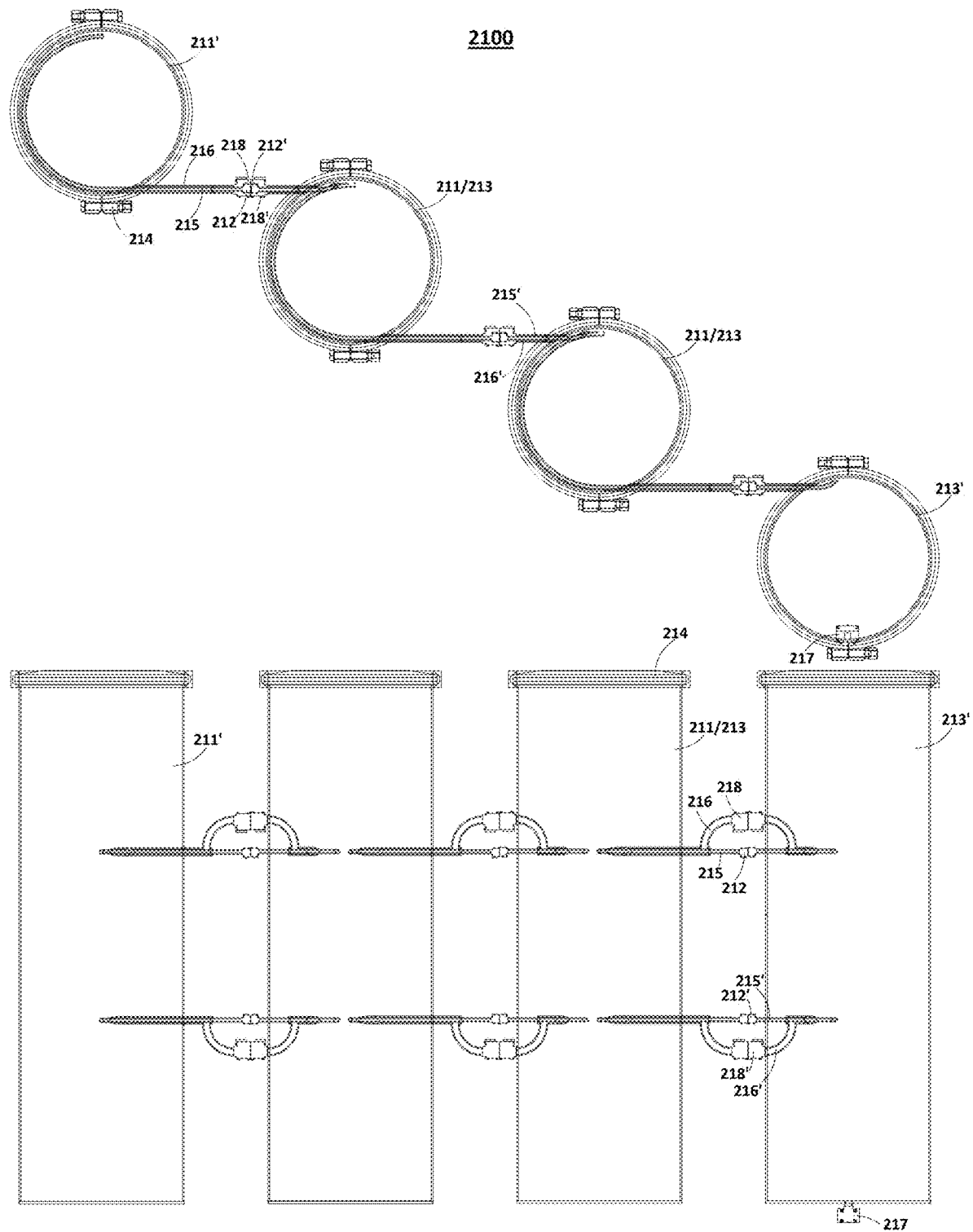
FIG. 10B shows end and top views of a multiple closed couplable extractor (2100), according to an embodiment, where two identical extracting chamber/solution receiver tubes (211/213) are combined with an extracting chamber tube (211') and a solution receiver tube (213') where vapor transfer tubes (215/215') reside partially within solution transfer tubes (216/216').

In an embodiment, as shown in FIG. 10B with end and top view, a multiple closed couplable extractor (2100) is constructed by connecting two extracting chamber/solution receiver tubes (211/213), extraction chamber tube (211') and solution receiver tube (213'). In this multiple closed couplable extractor 2100, the descending vapor transfer tube (215') and ascending vapor transfer tube (215) are smaller diameter tubes than the descending solution transfer tube (216') and ascending solution transfer tube (216) such that the vapor transfer tubes 215 and 215' can reside primarily within the solution transfer tubes 216 and 216', as a dual transfer tube where the difference in diameter can be chosen to achieve a desired cross-sectional difference for solution flow. Although dual transfer tubes 215/216 and 215'/216' are shown horizontally, a slope of either dual transfer tubes 215/216 and/or 215'/216' can be one that each lower extracting chamber/solution receiver tube 211/213 is definitively below that of the adjacent extracting chamber/solution receiver tube 211/213 from which the solution is flowing. The entire multiple closed couplable extractor 2100 can be tilted to promote flow. The solution transfer tubes do not allow a siphon and extraction is carried out from a top tube to a base tube. The position of the dual transfer tubes 215/216 and 215'/216' are shown bridging two extracting chamber/solution receiver tubes 211/213 near the center of the dual transfer tubes, however, they can be situated near the ends of the tubes or anywhere along the cylinders. The flows can be adjusted using the coupled isolation valves 212/212' and 218/218' illustrated to be couplable plug valves 1600, as is an optional valve 217 for connection of a solvent receiver/extract isolator (not shown). The extracting chamber/solution receiver tubes 211/213 are filled and emptied by removing sealing caps and clamps (214).

Figure 11:
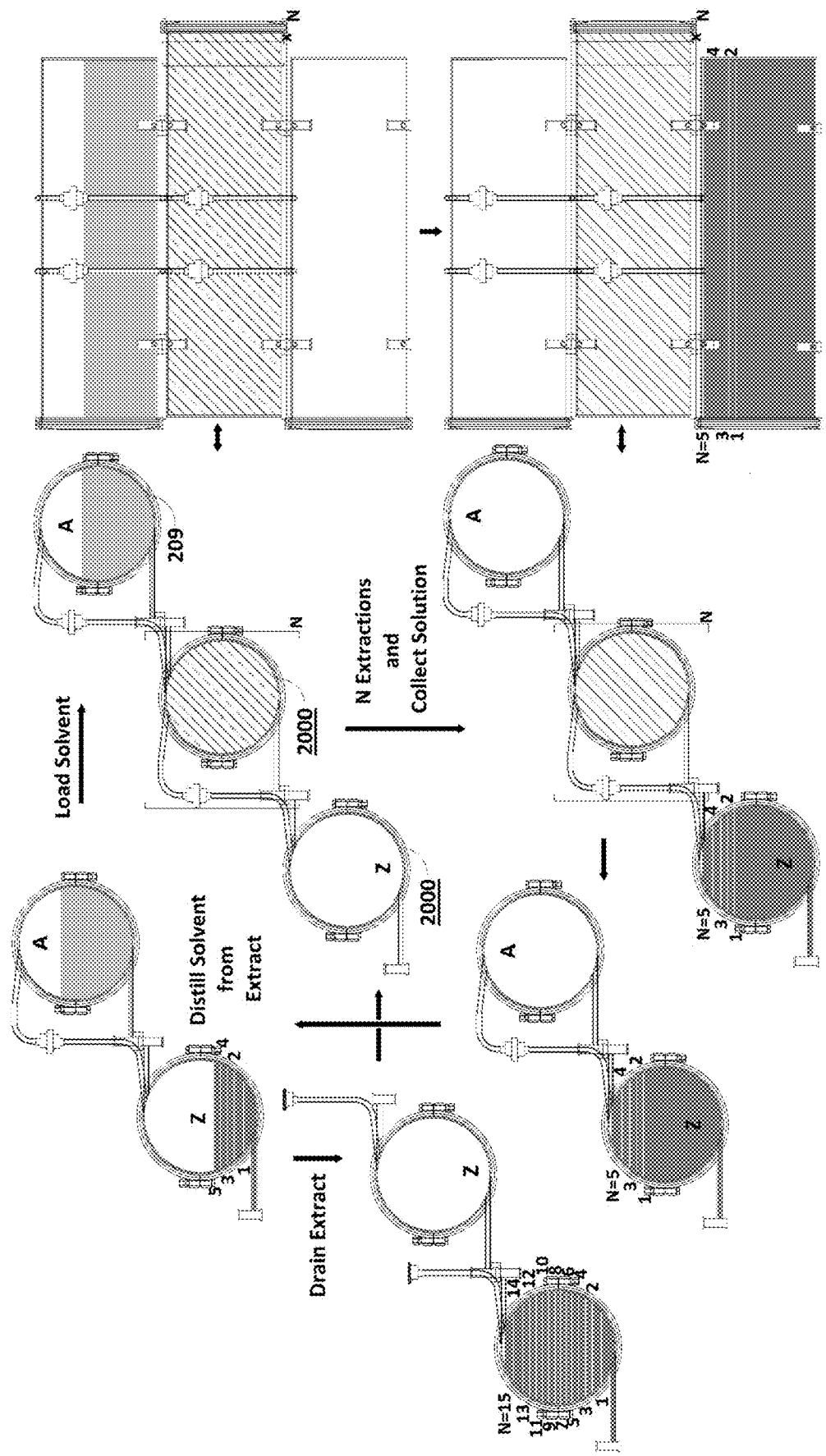
FIG. 11 illustrates an exemplary process, according to an embodiment, for performing multiple extractions employing a multiple closed couplable extractor 2000, shown in end view and side view.

FIG. 11 shows a process, according to an embodiment, where a plurality extracting chamber/solution receiver 201/203 are connected to form the multiple closed couplable extractor 2000, as shown in FIG. 10A, having a solvent reservoir tube (A), equivalent to a modified extracting chamber/solution receiver 201/203 lacking transfer tubes 205' and 206' for providing solvent to the top of a stack of descending extracting chambers/solution receivers 201/203 of a multiple closed couplable extractor. In this manner the solvent can be placed at the top solvent reservoir A at a desired temperature for extraction and transferred sequentially to a series of extracting chamber/solution receiver tubes 201/203 that are held at the desired temperature for extraction. The solvent or solution can be drained from the top through N+1 extractors 2000, where the base extracting chamber/solution receiver tube 201/203 is employed as a solution receiver tube Z that contains no plant matter or other extractable matter to collect extract solution. For illustration purposes, the plant matter has a relatively high twenty percent extractables and equal amounts of the plant matter is placed in each extracting chamber/solution receiver 201/203, filling about one third or less of the tubes' volume, the top tube A contains solvent that is two thirds of that tubes volume, and the tubes A and Z are of equal capacity. The intermediate tubes, N=1 through 5, have a length and capacity that range from equal to the base tube Z to about 1.27 times (1+0.067 (N−1) where N=5) the capacity of the base tube Z, such that the base solution receiver tube is partially to completely filled with solution depending upon N when the solution is fully drained. The empty solvent reservoir tube A is then directly connected to the solution receiver tube Z and the solvent is distilled into the solvent reservoir A. Alternatively, the distillation can be carried out without removal of these tubes from the multiple closed couplable extractor 2000. The collected solvent can be recycled into the system for either a further extraction or washing of the plant matter in the N tubes or for initiating a subsequent batch extraction. The distillation can be carried out with the base solution receiver tube Z heated to a temperature in excess of the desired extraction temperature, with the solvent reservoir tube A being cooled to the temperature desired for the extraction before reintroduction of solvent reservoir tube A into a multiple closed couplable extractor 2000 for further extraction. This is advantageous for cold ethanol extractions, where the extraction temperatures are very low, often less than −30° C., to avoid chlorophyll and lipids co-extraction with desired components. Base solution receiver tube Z can be drained into an extracting chamber/solution receiver 201/203, of the same capacity, as shown, or greater than solution receiver tube Z, which is used to collect extract from multiple batches, illustrated as ultimately containing the extract from fifteen extractions of plant matter with twenty percent extractables.

Figure 12:
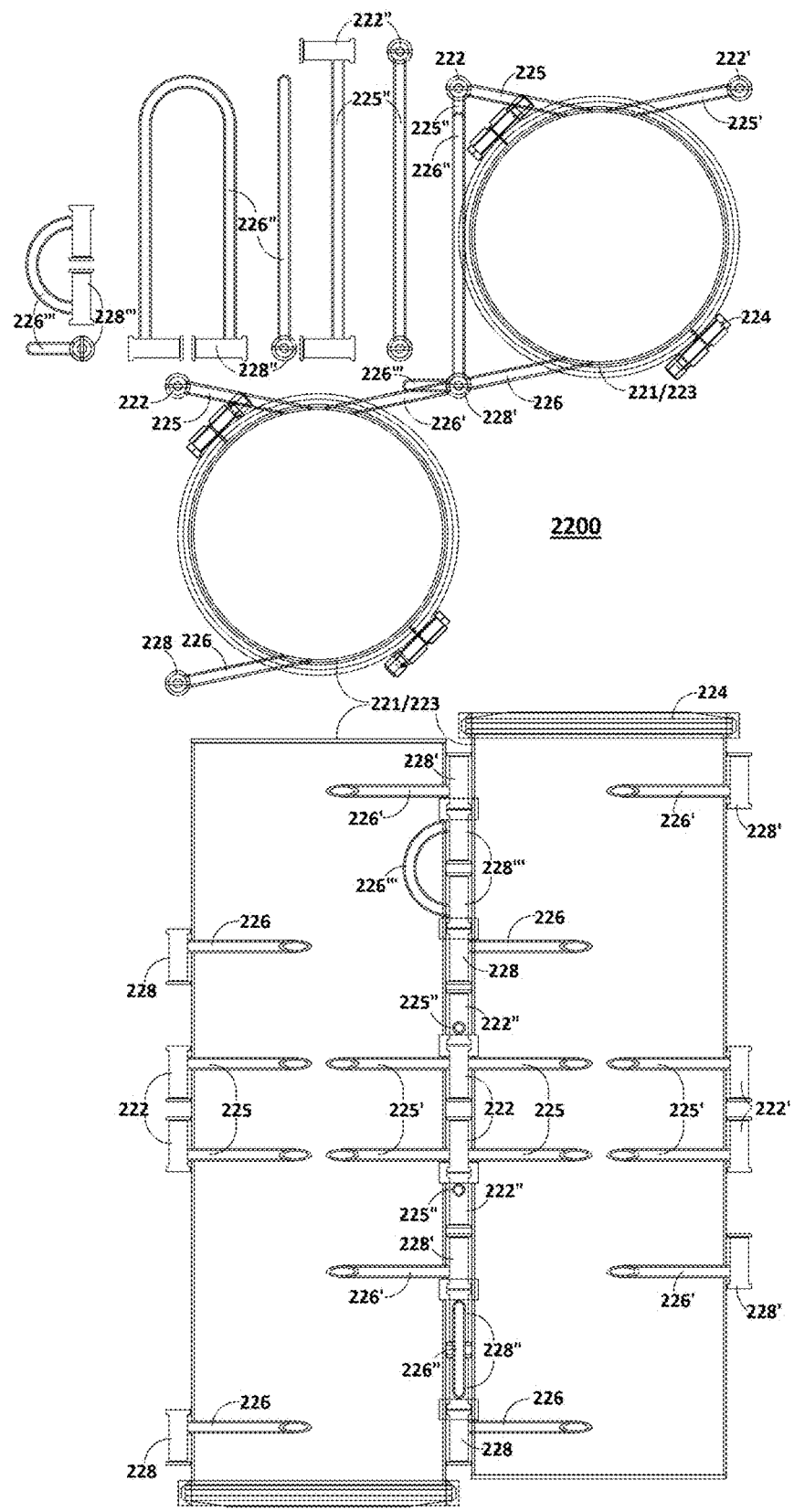
FIG. 12 shows an end view and top view of closed couplable extractor (2200), according to an embodiment, where two identical extracting chamber/solution receiver tubes (221/223) are combined via three-part vapor transfer tubes (225, 225', and 225") and two alternate three-part solution transfer tubes (226, 226', and 226" or 226''') to allow siphoning or draining, respectively.

FIG. 12 shows an end view and top view of closed couplable extractor (2200), according to an embodiment, where two identical extracting chamber/solution receiver tubes (221/223) are connected. The extracting chamber/solution receiver tubes (221/223) have a vapor transfer tube (225, 225', and 225") that is formed by combining: a descending vapor transfer tube (215) to an isolation connectable valve (222) having the structure of connectable needle valves 1400 as shown in FIG. 8B; an ascending vapor transfer tube (225') with an isolation connectable valve (222') having the structure of connectable needle valves 1400; and a connecting vapor transfer tube (225") with two isolation connectable valves (222") at both ends of a straight tube having the structure of connectable needle valves 1400. This three-part vapor transfer tube 225, 225', and 225" allows a close spacing of extracting chamber/solution receiver tubes 221/223 and can facilitate connecting and disconnecting any extracting chamber/solution receiver tube 221/223 from the closed couplable extractor 2200. The closed couplable extractor 2200 can include either one of two three-part solution transfer tubes (226, 226', and 226") or (226, 226', and 226''') for a process with siphoning or for a process with valve controlled draining, respectively, can be employed using common extracting chamber/solution receiver tubes 221/223 and selecting different connecting solution transfer tubes 226" and 226''', respectively. For siphoning, solution transfer is through: descending solution transfer tube 226 with an isolation connectable valve (228) having the structure of connectable needle valves 1400, as shown in FIG. 8B; an ascending solution transfer tube 226' with an isolation needle valve (228') having the structure of connectable needle valves 1400; and a long curved connecting solution transfer tube 226" that ends in two isolation needle valve (228") having the structure of connectable needle valves 1400. Alternatively, when a process employing draining, a short curved connecting solution transfer tube 226''' that allows orientation for equal elevation of the two isolation needle valves (228') having the structure of connectable needle valves 1400. In this manner, the connectivity can be selected for the nature of the extraction process desired.

Figure 13:
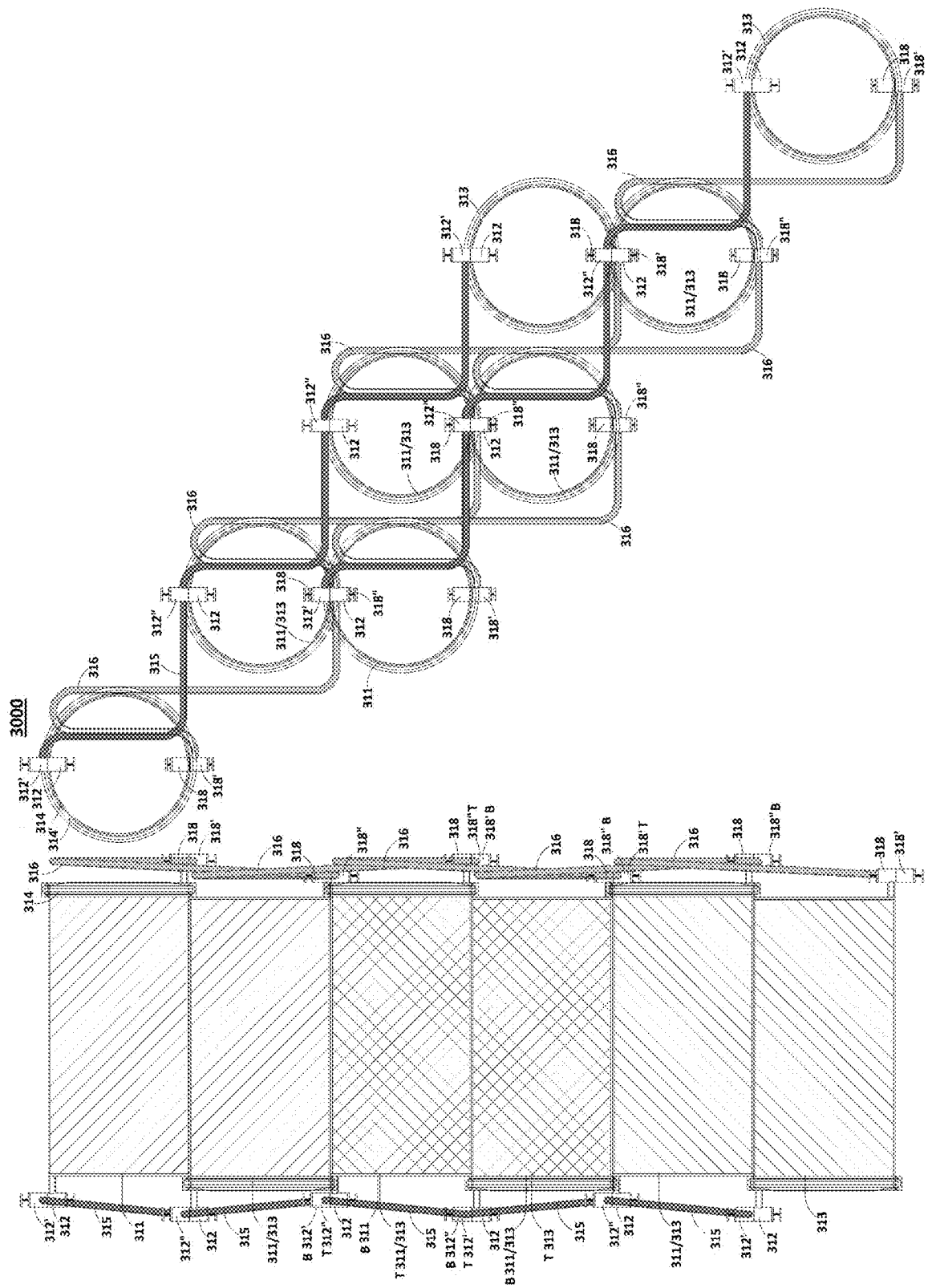
FIG. 13 shows a coupled extractor (3000) in a side view and an end view formed from two couped closed couplable extractors, according to an embodiment, where the vapor transfer tubes (315) and solution transfer tubes (316) are connected on opposing ends of the tubes where connectable needle valves (312/312', 312/312", 318/318', and 318/318") allows fluid transfer between any pair of tubes.

In an embodiment, FIG. 13 shows a side view and an end views of a coupled extractor (3000) formed from two closed couplable extractors that are constructed from a plurality of connectable tubes that are connected via connectable needle valves, where extracting chamber tubes (311), extracting chamber/solution receiver tubes (311/313) and solution receiving tubes (313) are connected via vapor transfer conduits (315) and solution transfer conduits (316) that contained connectable needle valves (312/312' or 312/312") and (318/318' or 318/318""), respectively. The extracting chamber/solution receiver tubes have connections for the vapor transfer conduits 315 and solution transfer conduits 316 through the ends at the base of the tubes and/or through the sealing caps (314) that are fixed by clamps (314'). In this manner, the portion of the connectable needle valves 312 and 318 directly fixed to the extracting chamber/solution receiver tubes 311/313, extracting chamber tubes 311, and solution receiver tubes 313 allow any configuration of a connected vapor transfer conduits 315 and solution transfer conduits 316 tube which are ended by the other portion of the connectable needle valves 312', 312", 318', or 318". The portion of the connectable needle valves 312' or 318' is a two-way valve or this portion of the connectable needle valves 312" or 318" is a three-way valve with two sites of connection to transfer tubes. In FIG. 13, the side view of connectable needle valves has indicators B or T to indicate that a foreground valve of a top or base closed couplable extractor obscures the view of connectable needle valve of a background of a base or top closed couplable extractor, respectively, where the tubes are stacked to promote proximally contact of pairs of tubes of the two closed couplable extractors. In this manner, the highest extracting chamber tube 311 of a multiple tube closed couplable extractors can be in fluid communication to a lowest solution receiving tubes 313. This allows vapor transfer from the lowest solution receiving tubes 313 to the highest extracting chamber tube 311 for condensation with formation of a solution therein and where individual pairs of tubes can be isolated via the portion of the connectable needle valves 312 and 318 directly attached to the extracting chamber/solution receiver tubes 311/313, extracting chamber tubes 311, and solution receiver tubes 313. As illustrated for coupled extractor 3000, the solution transfer conduits 316 are connected at the base of each extracting chamber/solution receiver tubes 311/313, extracting chamber tubes 311, and solution receiver tubes 313, however the extracting chamber/solution receiver tubes 311/313, and solution receiver tubes 313 can have the entry of solution occurring at the top of the tube, as illustrated in other embodiments. The number and orientations of the portions of the connectable needle valves 312 and 318 directly attached to the extracting chamber/solution receiver tubes 311/313, extracting chamber tubes 311, and solution receiver tubes 313 can be increased and exist on both end of the tubes to allow proximal contacting of the tubes in different modes in addition to that illustrated herein.

Figure 14:
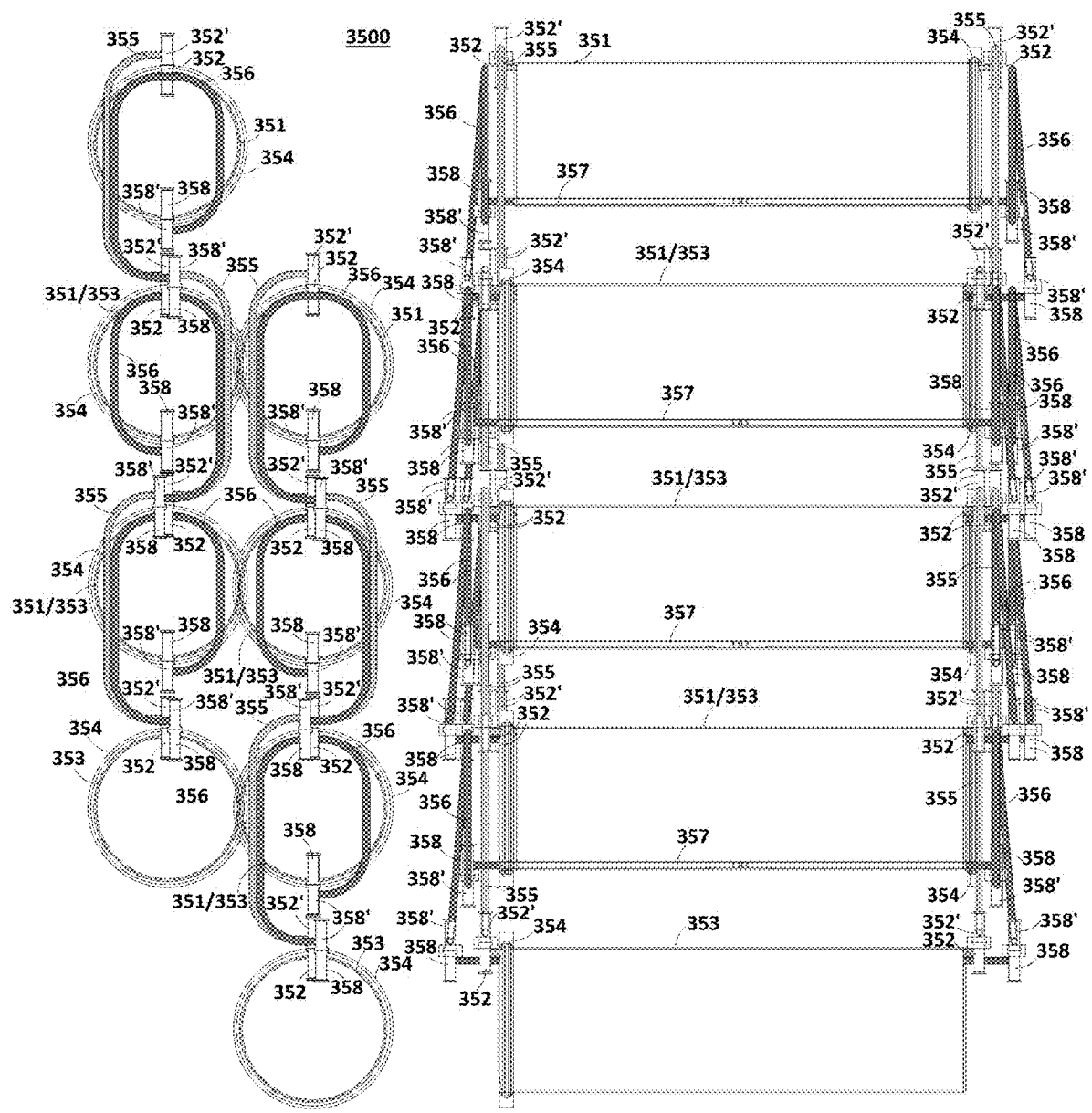
FIG. 14 shows a coupled extractor (3500) in an end view of two coupled closed couplable extractors and a side view of the horizontally aligned closed couplable extractors, according to an embodiment, where a cooled top left extracting chamber tubes (351) and a heated solution receiving tubes (353) promotes heat transfer within mid (M) extracting chamber/solution receiving tubes (351/353) for simultaneous extraction processing of the two closed couplable extractors.

FIG. 14 shows a coupled extractor (3500) in an end view of two coupled closed couplable extractors and a side view of the horizontally aligned closed couplable extractors, according to an embodiment, where a cooled top left extracting chamber tubes (351) and a heated solution receiving tubes (353) promotes heat transfer within mid extracting chamber/solution receiving tubes (351/353) for simultaneous extraction processing of the two closed couplable extractors. This vertical alignment of the multiple horizontal tubes in a closed couplable extractor allows a difference in height to allow proximal contacting of tubes for heat transfer while vapor distilling and solution siphoning is carried out in side-to-side contacted pairs of tubes of the coupled extractor 3500. The attachment of the vapor transfer tubes (355) and solution transfer tubes (356) is in the fixed end and sealing cap (354) to allow ready access to manually actuate the connectable needle valves (352/352') and (358/358'), respectively, and for ready inclusion and removal of individual tubes within any of the closed couplable extractors. The connectable needle valves 352' connected directly to the ends of a vapor transfer tube 355 can be a two-way valve at the extracting chamber tube 351 and the solution receiving tube 353 and a three-way valve at the extracting chamber/solution receiving tubes 351/353. The connectable needle valves 358 are connected to a drain tube (357) with central base openings to promote a draw of solution into the siphoning solution transfer tubes 256 from the center of the extracting chamber tubes 351 and extracting chamber tubes/solution receiving tubes 351/353.

Figure 15:
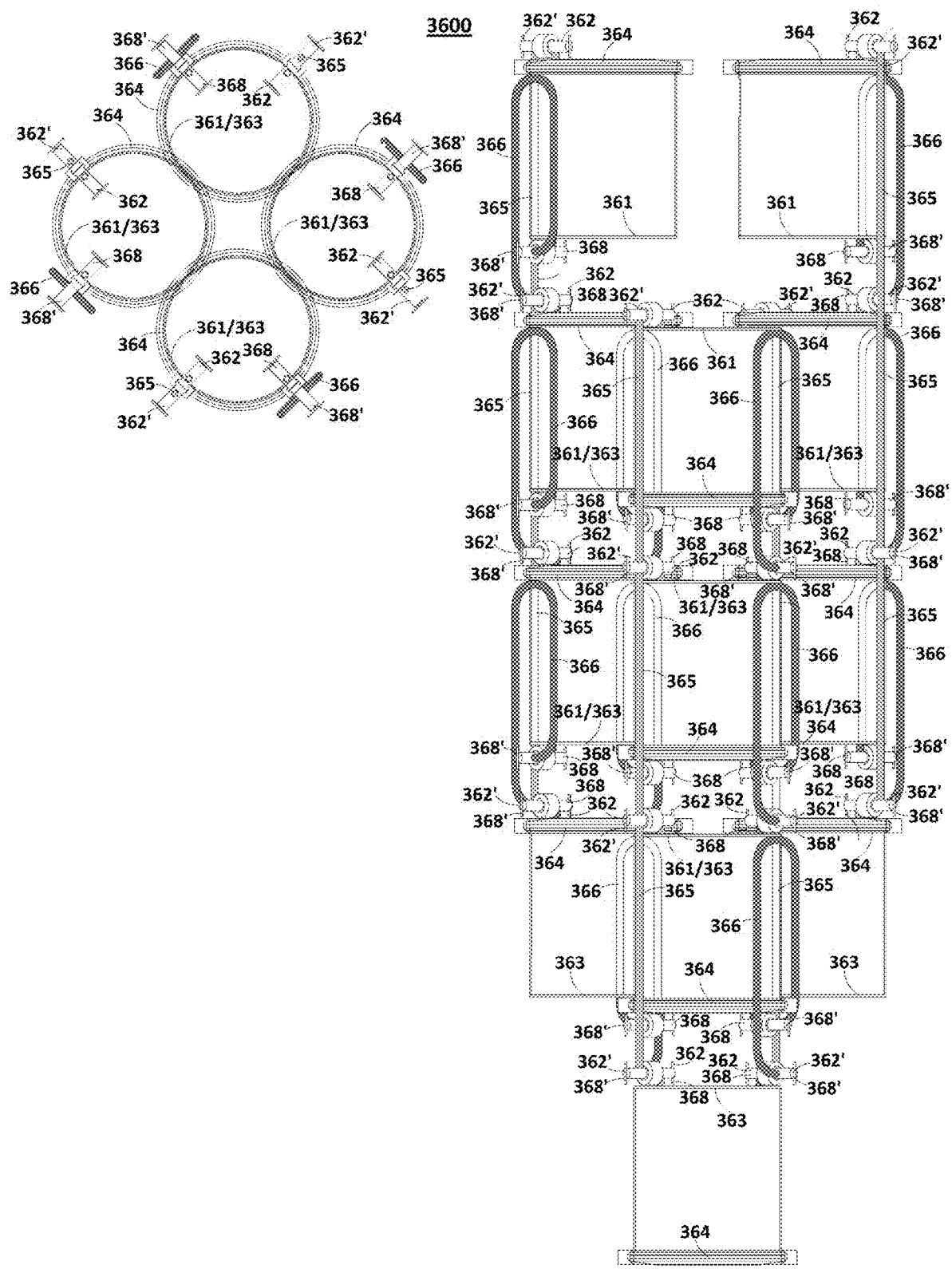
FIG. 15 shows a coupled extractor (3600) in a top and a side view of four coupled closed couplable extractors, according to an embodiment, where two top extracting chamber tubes (361), eight mid extracting chamber/solution receiving tubes (361/363), and two base solution receiving tubes (363) are oriented vertically and clustered in a square manner.

FIG. 15 shows a coupled extractor (3600) in a top view and a side view of four coupled closed couplable extractors and a side view with three facing closed couplable extractors and a mostly concealed lower elevation closed couplable extractors, according to an embodiment, where two top extracting chamber tubes (361), eight mid proximal contacting extracting chamber/solution receiving tubes (361/363), extracting chamber tubes 361, and solution receiving tubes (363), and two base solution receiving tubes 363 where all tubes are oriented vertically and clustered in a square manner, as illustrated in the top view. The extracting chamber tubes 361, extracting chamber/solution receiving tubes 361/363, and solution receiving tubes 363 tubes are aligned vertically with vapor transfer tubes (365) and solution transfer tubes (366) connected to the fused end of the tubes and through the sealing caps (364) for ready access to the connectable needle valves (362/362') and (368/368'), respectively; where the couplable needle valve 362' is a two-way valve for the top extracting chamber tube 361 and base solution receiving tube 363 and is a three-way valve for the extracting chamber/solution receiving tubes 361/363, allowing isolation of adjacent tubes of a closed couplable extractor or a connection between the top extracting chamber tube 361 and base solution receiving tube 363 for vapor transfer from the base to the top. The vertical stacking of the tubes of the closed couplable extractors allows proximal contacting side-to-side between four tubes of the four closed couplable extractors, particularly when adjacent tubes within each closed couplable extractor are isolated with solvent to carry out multiple extractions in pairs of tubes. The solution transfer tubes 366 need not be shaped for siphoning, but a valve-controlled draining can be performed when the solution transfer tubes 366 are otherwise shaped for a continuous downward draining. This vertical orientation of vertical tubes is readily adaptable for extractions in the manner illustrated in FIG. 11.

Figure 16:
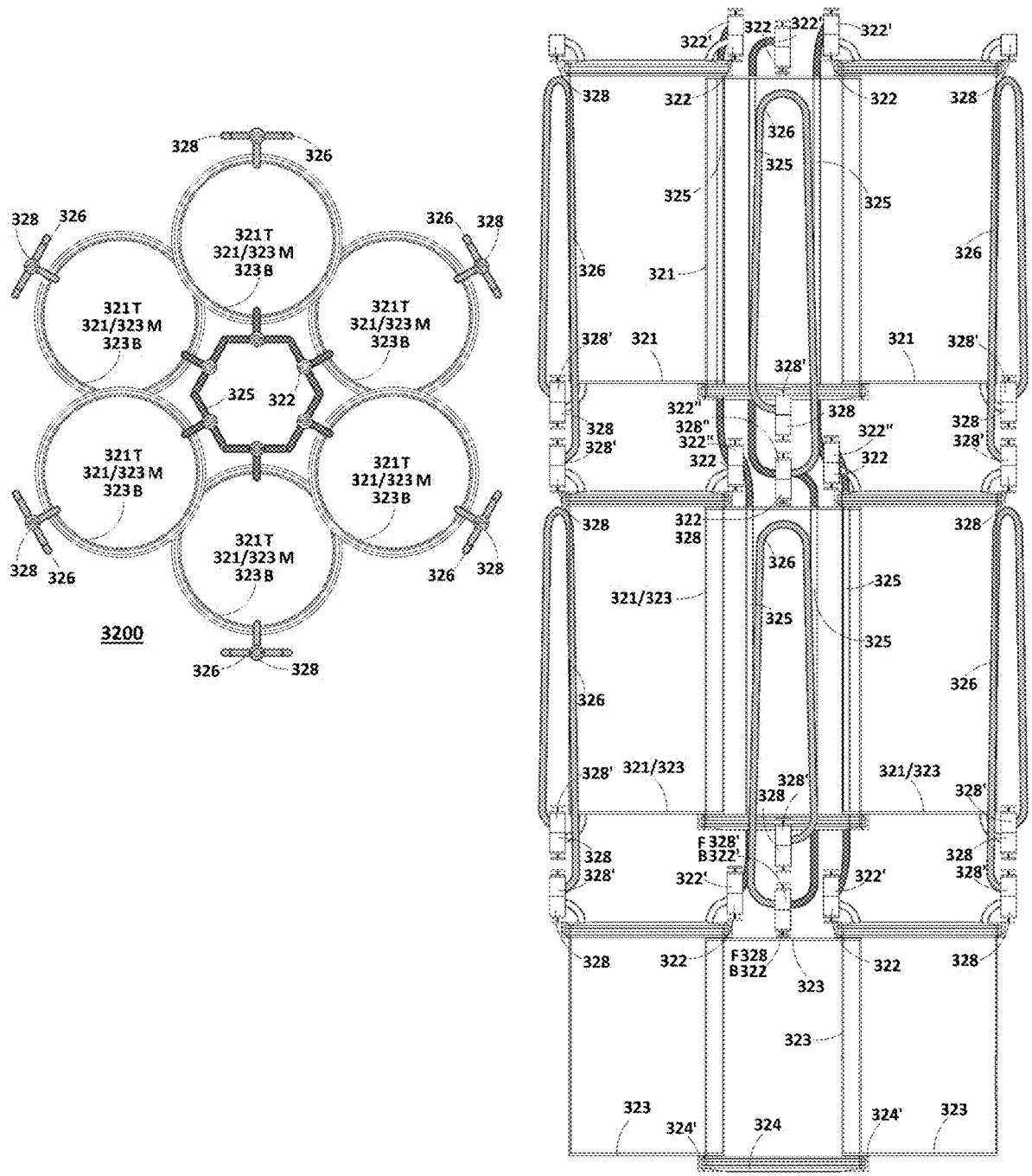
FIG. 16 shows a coupled extractor (3200) in a top view of six coupled closed couplable extractors and a side view of the facing three closed couplable extractors, according to an embodiment, where the top (T) extracting chamber tubes (321), mid (M) extracting chamber/solution receiving tubes (321/323), and solution receiving tubes (323) are oriented vertically and clustered in a hexagonal manner.

FIG. 16 shows a top view (left) and a side view of a coupled extractor (3200), according to an embodiment, having a plurality of closed couplable extractors that have top extracting chamber tubes (321), mid extracting chamber/solution receiver tubes (321/313) and base solution receiving tubes (323) connected via vapor transfer conduits (325) and solution transfer conduits (326) that contained connectable needle valves (322/322' or 322/322") and (318/318'), respectively. The tubes have connection of the vapor transfer conduits 325 and solution transfer conduits 326 through the ends at the base of the tubes and/or through the sealing caps (324) that are fixed by clamps (324') where these conduits are employed that results in a vertical connectivity of the tubes as opposed to the horizontal connectivity illustrated in other embodiments, above. Six closed couplable extractors are proximally contacted in a hexagonal closest packing orientation, as indicated in the top view, allow selective transfer of fluid between any two pairs of tubes or for vapor transfer from a lower solution receiving tubes 323 to any higher extracting chamber tube 321 as the portion of the mid tubes connectable needle valves 322" are three-way valves connected to the vapor transfer conduits 325. The portion of the connectable needle valves 322 and 318 that are fixed to the tube's base or the sealing cap 324 is shown through a curved conduit rather than the straight conduit that shown in FIG. 13, though a straight conduit can be employed for an extraction process as that illustrated in FIG. 11 where the draining of solution from tube to tube is controlled by the connected needle valves 322 and 328, which, though illustrated as manual valves, can be computer controlled automated valves.

Generally, the removal of air from the extracting chamber and solution receiving tubes is carried out by evacuation with a one-stage, two-stage, or multi-stage pump. In some cases, a water aspirator can be employed where a modest vacuum is desired. When higher vacuums are needed, a second pump, such as, but not limited to, a diffusion pump, can be included as desired or needed to achieve a desired pressure. The pressures employed can be from high vacuum, for example, but not limited to, $1 \times 10^{-6}$ Torr or less, to moderately high pressures of, for example, but not limited to, more than 300 PSI, as dictated by properties of the solvent employed and allowed by the dimensions and nature of the extracting tubes and solution receiving tubes of the closed couplable extractors.

Temperatures can be controlled by cooling baths, heating baths, chilling coils, heating coils, infrared heaters, vortex tubes or any other method. Typical, non-limiting, warm temperatures can be those achieved with room temperature to boiling water achieved with warm water baths, jackets, or pads, and room temperature to water-ice baths, salt-water-ice baths, dry ice baths, cooling jackets, cooling pads, achieved using a chiller. Cooling and heating sources using physical, radiative, electrical, or mechanical means can be used. The temperature and pressure conditions an appropriate mode of achieving and maintaining the temperature is readily appreciated by one of ordinary skill in the art. Final removal of solvent from the extraction system is facilitated by cooling a solvent storage container, for example, but not limited to, cooling with dry ice or liquid nitrogen. Cooling to −78° C. or lower can generate a vacuum within the closed extractor system using many solvents, even solvents with boiling points below −20°.

The tubes can be of any material, including plastics, glass, ceramic, metals, and composites of these materials, where the material is chosen depends upon the extract and solvent employed and the temperatures and pressures employed. For extracts for human ingestion, materials and polishes that meet established standards for these devices are often required. In like manner, any gaskets, filters, and couplers often require that the materials and polish conform to standards. For example, metals can include 304 and 316 stainless steels, brass, or any other metal that is inert to the extract and solvent and approved for the extracts use. Transparent windows may be included in an end, side or top of a tube for viewing the state of fill in the tubes. Internal surfaces of the components may be coated for effects such as the altering of the hydrophobicity or lipophilicity of one or more components and its compatibility with the extract or solvent to facilitate drainage, adherence, heat transfer, ease of cleaning, or any other factor. The internal surface may be rendered hydrophobic, oleophobic, superhydrophobic and/or superoleophobicity by choice of the surface material and texture, as can be appreciated by those of skill in the art. External surfaces may be coated of one or more components to facilitate heat transfer, ease of cleaning, aesthetic qualities, or any other factor. Heat transfer and extraction rates can be enhanced by, for example, heat pipes, piezo electric actuators, ultrasonic actuators, vortex tubes, or any other devices included to function internally or externally to the tubes and conduits of the extraction system.

Solvents that can be used include water, ammonia, or organic solvent, which can be selected from alcohols, hydrocarbons, ethers, fluorinated or other halogenated hydrocarbons, esters, amines, carboxylic acids, or any other solvents that are in a vapor state at temperatures of about 25° C., or below, to about 150° C., or above, when at pressures from about 0.1 mm Hg, or below, to about 760 mm Hg, or above. All extracts must be considered with respect to the extracts compatibility or the desirability of a possible transformation by reaction with the solvent, among the solvents that can be used include, but are not limited to, methane, ethane, n-propane, n-butane, isobutane, pentane, isopentane, neopentane, cyclopentane, acetaldehyde, dimethyl ether, diethyl ether, ethyl bromide, methylene chloride, carbon disulfide, acetone, methyl acetate, chloroform, methanol, tetrahydrofuran, hexane, heptane, carbon tetrachloride, ethyl acetate, ethanol, benzene, cyclohexane, propanol, ethylene dichloride, heptane, dioxane, water, formic acid, toluene, butanol, octane, ethylene bromide, acetic acid, chlorobenzene, propionic acid, xylene, bromobenzene, turpentine, furfural, butyric acid, dimethyl formamide, dimethyl acetamide, dimethyl sulfoxide, phenol, aniline, propylene glycol, ethylene glycol, acetonitrile, pyridine, any other solvent, and any combination of two or more solvents.

Advantageous solvents that can be used include fluorocarbons, which, advantageously, are often non-toxic, non-carcinogenic and non-flammable. By proper use of the extraction systems herein, all these solvents can be maintained and collected in solvent reservoirs without release to the atmosphere. Useful fluorocarbons include, but not limited to, trifluoromethane, difluoromethane, fluoromethane, pentafluoroethane, pentafluorodimethyl ether, 1,1,2,2-tetrafluoroethane, 1,1,1,2-tetrafluoroethane, Bis(difluoromethyl) ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, 1,1,2,2,3-pentafluoropropane, pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, 1,1,3-trifluoropropane, 1,1,1,3,3-pentafluorobutane, 1,3-difluoropropane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,3-trifluoropropane, 1,3-difluoropropane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,2,2,3-pentafluoropropane, 1,1,1,3,3-pentafluoropropane, 1,1,3-trifluoropropane, 1,1,3-trifluoropropane, 1,3-difluoropropane, 2-(difluoromethyl)-1,1,1,2,3,3-hexafluoropropane, 1,1,2,2,3,3,4,4-octafluorobutane, 1,1,1,2,2,4-hexafluorobutane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1,2,3,3,4,4-octafluoro-2-(trifluoromethyl) butane, 1,1,1,2,2,3,3,4,4,5,5-undecafluoropentane, 1,1,2,2-tetrafluorocyclobutane, 1,1,1-trifluoropentane, 1,1,1,2,2,3,4,5,5,5-decafluoropentane, 1,1,1,2,2,3,3,5,5,5-decafluoropentane, 1,1,1,4,4,4-hexafluoro-2-(trifluoromethyl) butane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 1, 1,1,2,2,3,3,4,4,5,5,6,6-tridecafluorohexane, 1,1,1,2,2,5,5,5-octafluoro-4-(trifluoromethyl) pentane, 1,1,1-trifluoroethane, 3,3,4,4,5,5,6,6-nonafluoro-1-hexene, 2,3,3,3-Tetrafluoropropene, trans-1,3,3,3-tetrafluoroprop-1-ene or any mixture thereof and any mixture with non-fluorinated solvents.

The solvent can be a mixed solvent comprising more than one chemical compound. Depending on the use of the extract produced, the solvent should be carefully considered for the effect of any residual amounts of solvent may affect the appropriateness of its use. Mixtures of solvents may be employed. A mixture of solvents with similar volatilities, or in a composition where they form an azeotrope, can be used. Mixtures of solvents may be employed, where one of significantly lower volatility can resides in the extract in an intermediate state where it can be removed from the extract in a second removal step within the extractor or in a subsequent process that is carried outside of the extractor. A solvent intended or acceptable for inclusion for the use of the extract can be included. For example, if the extract is to be used when dissolved or suspended in a vegetable oil or ethanol, for example, this liquid can be included in an extraction chamber. In embodiments an extract solvent can be included in the extracting chamber tube with the extractable material or in the solution receiver tube, where the solvent is non-volatile under the temperatures and pressures employed in the extractor. Exemplary non-volatile solvents can be ethanol, coconut oil, or olive oil that can be retained with the extract, or a substance which can be readily remove, such as, but not limited to, a glyme or other polyethylene oxide oligomer or polymer, or other water-soluble solvent where it can be removed from a water insoluble extract by water washing. The solvent may be treated after isolation from an extract by treatment with molecular sieves, absorbent carbon, ion exchange resins, or other solid materials placed in a post extractor system to absorb non-desired components of any solvent to be recycled. Analysis of the extracts can be by gas or liquid chromatography (GC or LC) methods. The detector can be coupled to a mass spectrometer, GCMS and LCMS, to distinctly identify the extracts components, including any residual solvents.

The extractable material, for example, but not limited to, plant matter including but are not limited to: Acaica *Catechu* Heart Wood; *Acidanthera; Adenophora; Adhatoda vasica*; Adulsa; Agarwood; *Agave sisalana*; Agrimory; Aiye; *ajowan* Garom; *Akebia caulis*; Alfalfa; *algae; Alisma*; Almond; *Aloe* Veraract; *Aloe* Vera; Alpine *Herb*; *Althaea Officinalis*; American *Ginseng*; Amicaract; Amlaract; *Ammi Visnaga; Amyris; Andrographis Paniculata*; Anemarhenae Asphodeliodes; *Angelica; angelicae pubescentis; ani* Seed; *anise*; Annatto (Seed); Apricot; Apple (Peel); *Arjuna*; Armoise; *Artemisia* Absinthum; *Artemisia Annua*; Artichoke; *asafoetida*; Ashwagandha; Asian *ginseng*; Asiasari *radix; Asparagus; Astragalus*; Avocada; Avocadoract; Augustiflora Hill; *Azelia; Bacopa monnieri*; Baheda; *bala*; Balsam Popular (Buds); Banabaract; Barberry; Barley *grass*; Basibolol; Basil; *bay; Belladonna*; Bergamote; *Beta*-Carotene; *Betulae folium*; Bhringraj; Bilberry; Birch; Bitter Melon; Bitter *Sophora*; Black Bean; Black Cohosh; Black Mustard (Seed); Black Pepper (Corns); Black Sesameract; Black Tea (Dry Leaf); Blackberry; Borage; *Boswellia Serrata; brahmi*; Brussel Sprout; Buchu; *Bufonis* Venenum; Bulgarian *Tribulus; Bupleurum*; Burdock; *Butea Superba*; Cabbage; *Cabreuva*; Cajuput; *Calamus; Calendula Officinalis*; Camomile; *Cannabis; Cananga java*; Capcicum; *Caralluma fimbriata*; Caraway; *cardamom*; Carline Thistle; Carnations; Carrot; *Carum Carvi; Caryophylli*; Cascara Sagrada; *Cascarilla; Cassia*; Cat Mint; Cat's Claw; *caulis spatholobi*; Cayenne; Cedar; Celery; Celery (Seed); *Centella asiatica; cepae*; Chamomile; Chasteberry; Cherry; Chicory; Chilli (Seed); Chilli (Whole Pod); Chinese wolfberry; Chives; *Chlorella* Powder; *Chrysanthemum*; Chocolate; Chrysin; Cinamomi *cortex*; Cinidium; Cinnamon; *Cistanche Deserticola ma*; Cistanchis *herba; Cistus* Spain; *Citrata; Citronella; Citriodora; Citrus* Aurantinum; Civet; Clary Sage; Clementine; Cloves; *Coccinia indica*; Coconut; Cocoa (Powder); *Cocos Nucifera; Codonopsis*; Coffee (*Arabica*); Coffee (*Robusta*; Cola; *Coleus aromaticus; Coleus Forskohlii; Commiphora* Myrrh; *Copaiba; Coptis*; Cordycepsract; Coriander (Cilantro); Coriander (Seed); *Coriolus* Mushroom; Cornsilk; *Corus* Officinals; *Corydalis yanhusuo; Costus*; Cranesbill; Cucumber; Cumin; Cumin (Seeds); Curcumin; *cuscutae* Seed; Cypress; Cypriol; Dahurian Rhodoendron; Damiana; *dandelion; Datura; Davana*; Devil's Claw; Dill; Dill (Seed); *Dryopteris; Echinacea Angustifolia; Echinacea Purpurea Herb*; Elder Berries; Elder Flower; Elecampane; Elemi; *Epilobium; Epimedium; Eucalyptus; Eucommia; Eurycoma Longifolia*; Evening primrose; *Evodia*; Eyebright *Herb*; Fennel; Fennel (Seed); Fenugreek; Fenugreek (Seed); Fever Few; Fig leaves; Flaxseed Hullract; *Forsythia* su*spensa; Freesia; Fucus vesiculosus; Galbanum; Garcinia Cambogia*; Garden Pinks (Clove Pinks); Garlic; *Gastrodia rhizoma*; Gentian; *Geranium*; Ginger; Ginger (Root); Gingergrass; *gingko Biloba*; Ginseng Root; Glucomannan; *Glycyrrhiza glabra*; Gokhru; Golden rod; Golden Seal Root; Gotu *kola herb*; Grape; Grapefruit; Green Bell Pepper; Green Tea; *Griffonia Simplicifolia; guarana*; Guayacwood; Guduchi; Guggul; Gurjum; *Gymnema Sylvestre; Gynostemma*; Harda; Hawthorn; Hazel Nut; *Hedyotis diffusa*; Heena; Heliotrope; Hemp; *Hibiscus*; Honey Suckle; *Hoodia* Gordonit; Hop; Hop Pellets "Wye Target"; Horny Goat Weed; Horse Chest Nut; Horsetail; *Houttuynia; Huperzia Serrata*; Hyacinth; *Hydrangea*; Hysoop; *Iberis Amara; Inula racemosa; Isatis indigotica* Fort; *Isatis*; Ivy; Jaiphal; Jamun; Jasmine; Jatamasi; Javitri; Jethimadhu; *jojoba*; Jonquil; *juniper*; Juniperis *Communis* L.; Kale; Kalonji *Nigella*; Kapoor Kachari; Karanj; Karela; *kashmiri* Sounff; Kaua *Piper; kawa*; Kawach; *kiwi; kola* Nut; Kalonji *Nigella* Korean *Ginseng*; Kudzu; Laminana Sacchanina; *laurel*; Lavender; *Lavendula*; Leek; Lemon; Lemon Blossom; Lemon *geranium*; Lemongrass; Lichens; *Ligustrum*; Lily (Regale); Lily of the Valley; Lime; Lipia *Citriodora*; Liquorice; *Litsea Cubeba; Lobelia* Intiata; *longan* Aril; *Lonicera japonica; loquat; Lotus*; Lovage; Lovage Seed; Luo Han Guo; *Lycium*; Lycopene Tomato; *Lycoris Radiata herb; Ma* Huang; *Macadamia*; Mace; *Macleaya Cordata; Magnolia* Bark; Maitake Mushroom; Majoram Spain; *Malva Verticillata; mandarin*; Mangosteenract; Manjistha; Marigold; Marijuana; Marjoram; Meadow Sweet; *Medicago; Melissa Officinalis; Melissa; Mentha Arvensis; Mentha Piperita; Mentha usa* Willamette; Meswak; Methi; *Methysticum* Root; Mignionetire; Milk Thistle; *Morinda Citrifolia; Morinda; Moringa*; Motherwort; *Moutan* Black; *Mucuna Pruriens*; Mugwort; Mulberry; Mustard; Myrrh; Myrtle; Nardostachytis; *Narcissus*; Neem; Neem (*Azadirachta indica* Seed); Neroli; Nettle; *niaouli; Nicotiana; Nicotiana* Tobacum; Nirgundi; *Notoginseng; Notopterygium; Nuphar Pumilum*; Nutgrass; Nutmeg; Oat Straw; *Ocimum sanctum*; Oleoresin *Capsicum*; Olibanum; Olive; Onion; Oolong Tea; *ophiopogonis; Opoponax*; Orange; Orange Blossom; Oregano; *Origanum* Carvacrol; *orris* Root; *Paeonia Lactiflora* Pall; Palmarosa; Papain; *Papaya*; Paprika; Parsley; *Passiflora Incarnata*; Passion Flower; Patchouli; Peach; Peanut; Pennyroyal; Pepper; Peppermint; *Perilla*; Petitgrain; *petroselini Radix; Phaseoli* Percarpium; *Philadelphus; Phyllanthus Emblica; pimento* Berry *pimento*; Pine; Pineapple; Pinelliae; *Piper Longum; Piper Nigrum; Plantago*; Plantain; Podophyllotoxin; *Podophyllum hexandrum*; Pomegranate; *Poncirus*; Poppy Seed; *Poria Cocos; Portulaca* Oleracia; *Primulae*; Prune; Pu Erh; Pumpkin; Punnello Blossom; *Pygeum Africanum; Pyrethrum; Quararibea Funebris*; Quercetin; *Rabdosia Japonica Hara; Radix platycodi; Radix stemonae*; Raspberry; Rauwolfia *Serpentina*; Red Clover; Red Peony; Red Wineract; *reishi* Mushroom; *rhizoma Drynaria*; Rhodiola; Rhubarb; Roses (>30 varieties); Rosehip; Rosemary; Rosewood; Rue; Sage; Sage *Officinalis*; Sage Spain; *Salacia Reticulata; Salvia*; Sandalwood; Sarsaparilla; Sassafras; Saullea Vaginate; Savory; Saw Palmetto; *Sceletium; schizandra*; Schizenepeta; *Scopolia*; Scultellaria; Sea Weed; *Semen* Coiois; *Semen cuscutae*; Senegae; *Senna; sesame*; Shatavari; Shavegrass; Sheelajit; Shiitake Mushroom; Shikakai; Siberian *Ginseng*; Siberian Milkwort; *Sida Cor*-

*difolia; Siler; Silybum Marianum*; Sinomenine; Soy; *soya* Bean; Spearmint; Spikenard; Spinach; *Spirulina* Powder; St. John Wort; Star Aniseed; *stemonae; Stephania* Cepharantha *Hayata; Stevia*; Strawberry; Sty Rax; Suma Root; *summa*; Sunflower; Tagar; Tagete; Tarragon; Tart Cherry; Tea (Black Leaf); Tea Saponin; Tea Tree; Teasel; *Terminalia* Billerica; *Terminalia chebula*; Theaflavins; *Thuja*; Thyme; *Thymus; Tinospora Crispa*; Tobacco Leaves; Tomato; *Torilis Japonica; Tribulus Terrestris*; Triphala; *tuberose*; Tulips; *tulsi*; Turmeric; Turpentine; *Uva Ursi; valerian; Vanilla; Verbena Morocco*; Vetiver; *Vitex Agnus-castus; Vitex; Vitis* Idaeae Follum; Wall Flower; Walnut; Watermelon; Wheat *Grass*; Wheatgerm; White Atractrylodes; White Peony; White Pepper; White Tea; Wild Yam; Willow; Wintergreen; Witch Hazel; Wormwood; Yarrow; Yerbamate; Yew Nettles; Ylangra; Yohimbe; Zeodary; and *ziziphi*.

The forgoing description is provided for illustration and description and is not limiting of the disclosure, its applications, or uses. It is not intended to be exhaustive or to limit the disclosure. Elements are interchangeable and combined in embodiments that are not specifically shown or described.

I claim:
1. A closed couplable extractor, comprising:
   a plurality of tubes, wherein each tube is an extracting chamber tube and/or a solution receiver tube;
   a sealable port or cap in at least one tube of the plurality of tubes for accepting er and removing an extractable material;
   at least one valve for isolating at least a portion of the closed couplable extractor; and
   at least two transfer conduits connecting each pair of adjacent tubes, wherein adjacent tubes are position-able as a higher extracting chamber tube and a lower solution receiver tube, wherein at least one of the transfer conduits allows liquid transfer from the extracting chamber tube to the solution receiver tube and at least one transfer conduit allows vapor transfer between the solution receiver tube and the extracting chamber tube, with the extracting chamber tube positioned higher than the solution receiver tube, and wherein a shape and a connectivity of the transfer conduits permit proximal contacting at one or more points of a surface of the at least one extracting chamber tube of a first closed couplable extractor and at one or more points of the surface of a paired at least one solution receiver tube of a second closed couplable extractor.
2. The closed couplable extractor according to claim 1, wherein the adjacent tubes are fixed by the transfer conduits.
3. The closed couplable extractor according to claim 1, wherein the solution transfer conduit comprises a curved tube, wherein the solution transfer conduit is attached at or near the low point of the extracting chamber tube and at or near the high point of the solution receiving tube, with the extracting chamber tube positioned higher than the solution receiver tube and with the extracting chamber tube and solution transfer tubes aligned horizontally or vertically, and wherein the top of the solution transfer conduit is at or above a low point of the higher extracting chamber tube.
4. The closed couplable extractor according to claim 1, wherein the vapor transfer conduit is connected to or near the high point of the lower solution transfer conduit and at or near the high point of the extracting chamber tube when positioned higher than the lower solution receiving tube.
5. The closed couplable extractor according to claim 4, wherein at least a portion of the vapor transfer conduit resides within the solution transfer conduit or wherein at least a portion of the solution transfer conduit resides within the vapor transfer conduit.
6. The closed couplable extractor according to claim 1, wherein at least one transfer conduit comprises at least one isolation valve separating a first tube and a second tube of at least one of a pair of adjacent tubes of the plurality of tubes.
7. The closed couplable extractor according to claim 6, wherein the isolation valve is a ball valve, plug valve or needle valve.
8. The closed couplable extractor according to claim 6, wherein a plurality of the isolation valves reversibly connects the extracting chamber tube and the solution receiver tube to control transfer in the transfer conduits and/or isolate at least a portion of the closed couplable extractor.
9. The closed couplable extractor according to claim 8, wherein the isolation valve comprises a pair of connectable valves.
10. The closed couplable extractor according to claim 9, wherein each of the pair of connectable valves comprises a first port for connecting with a connector comprising a connecting valve and a plurality of complimentary second ports to connect with the first ports.
11. The closed couplable extractor according to claim 9, wherein the pair of connectable valves comprises a pair of quick-connect valves, connectable ball valves, connectable plug valves, or connectable needle valves.
12. The closed couplable extractor according to claim 11, wherein connectable ball valves, couplable plug valves, or couplable needle valves comprise facing surfaces for contacting balls of the ball valves, plugs of the plug valves, or needles of the needle valves and a sealing feature to fix contacting of the facing surfaces with exclusion of air, solvent, or solution therebetween.
13. The closed couplable extractor according to claim 1, wherein the plurality of tubes comprises three or more tubes.
14. A coupled extractor, comprising a plurality of closed couplable extractors according to claim 1, wherein one or more of the solution receivers of one of the closed couplable extractors proximal contacts one or more of the extracting chambers of an adjacent closed couplable extractors.
15. The coupled extractor according to claim 14, wherein each of the plurality of closed couplable extractors comprise an even number of tubes wherein a first closed couplable extractor resides at the base of the plurality of closed couplable extractors with subsequent higher closed couplable extractors residing with their solution receiver tube proximally contacting the extracting chamber tubes of precedingly lower closed couplable extractors.
16. The coupled extractor according to claim 14, wherein each of the closed couplable extractors comprise four or more tubes.
17. The coupled extractor according to claim 15, wherein the closed couplable extractors comprises isolation valves in at least the solution transfer conduits.
18. A method of extraction, comprising:
   providing one or more closed couplable extractor according to claim 1;
   loading the one or more closed couplable extractors with an extractable material;
   evacuating the at least one closed couplable extractor;
   optionally coupling a plurality of the closed couplable extractors by proximally contacting at least one tube as an extracting chamber tube of at least one closed couplable extractor to at least one tube as a solution receiver tube of at least one adjacent closed couplable extractor;

transferring a solvent to at least one of the extracting chamber tubes by:
distilling a vapor or by dispensing a liquid from at least one solvent reservoir tube connected to or within the closed couplable extractor; or
distilling a vapor from at least one solvent receiver tube within the closed couplable extractor or from a fluidly connected second closed couplable extractor;
soaking the extractable material in the solvent to form an extract solution;
transferring the extract solution from the at least one extracting chamber tube into at least one adjacent solution receiver tube in a common closed couplable extractor through at least one solution transfer conduit;
distilling a portion of the solvent from the extract solution in the at least one solution receiver tube and condensing the liquid solvent in:
the at least one extracting chamber tube in the common closed couplable extractor, wherein the portion is an entire volatile portion and wherein the steps of soaking, transferring, and distilling are repeated one or more times; or
at least one solvent receiver tube; or
draining the extract solution from the at least one solution receiver tube to at least one extract isolator, wherein the extract isolator is optionally a portion of the solution receiver tube, the solvent receiver tube, or is a separate extract isolator; and
removing at least a portion of the solvent from an extract solution to form an extract.

19. The method of extraction according to claim 18, wherein loading is of one to all of the extracting chamber tubes and one to all of solution receiving tubes of the closed couplable extractors.

20. The method of extraction according to claim 18, wherein distilling comprises heating at least one solution receiver tubes and/or cooling at least one extracting chamber tube.

21. The method of extraction according to claim 18, wherein proximally contacting comprises placing the extracting chamber tube of at least one closed couplable extractor and the solution receiver tube of at least one adjacent closed couplable extractor in a common bath or a common jacket containing a fluid for heat transferring the heat of condensation from the extracting chamber tube to the solution receiver tube in the common bath or jacket for evaporating the solvent.

22. The method of extraction according to claim 21, wherein proximally contacting comprises contacting at least one heat pipe with the extracting chamber tube of at least one closed couplable extractor and the solution receiver tube of at least one adjacent closed couplable extractor.

23. The method of extraction according to claim 18, wherein draining the extract solution further comprises filtering the extract solution.

24. The method of extraction according to claim 18, wherein draining the extract solution comprises siphoning.

25. The method of extraction according to claim 24, wherein one of the at least one solvent reservoir is connected to one of the extracting chamber tubes of the at least one closed couplable extractor for dispensing, wherein the solvent, solvent reservoir(s), and extracting chamber tube(s) are at a temperature for extracting.

\* \* \* \* \*